US012137075B1

(12) United States Patent
McNulty, Jr.

(10) Patent No.: US 12,137,075 B1
(45) Date of Patent: Nov. 5, 2024

(54) SYSTEM AND METHOD FOR RECIPE SHARING AND MANAGEMENT

(71) Applicant: CGS, Inc., Robbinsdale, MN (US)

(72) Inventor: George Francis McNulty, Jr., Robbinsdale, MN (US)

(73) Assignee: CGS, Inc., Robbinsdale, MN (US)

( * ) Notice: Subject to any disclaimer, the term of this patent is extended or adjusted under 35 U.S.C. 154(b) by 77 days.

(21) Appl. No.: 17/322,026

(22) Filed: May 17, 2021

Related U.S. Application Data

(63) Continuation of application No. 15/818,200, filed on Nov. 20, 2017, now Pat. No. 11,012,402.

(51) Int. Cl.
| | |
|---|---|
| *H04L 51/52* | (2022.01) |
| *G06F 3/0484* | (2022.01) |
| *G06Q 50/00* | (2024.01) |
| *H04L 67/01* | (2022.01) |
| *G06F 3/04817* | (2022.01) |
| *G06F 3/0482* | (2013.01) |
| *H04L 67/306* | (2022.01) |

(52) U.S. Cl.
CPC ............ *H04L 51/52* (2022.05); *G06F 3/0484* (2013.01); *G06Q 50/01* (2013.01); *G06F 3/04817* (2013.01); *G06F 3/0482* (2013.01); *H04L 67/01* (2022.05); *H04L 67/306* (2013.01)

(58) Field of Classification Search
CPC ....... H04L 51/52; H04L 67/01; H04L 67/306; G06F 3/0484; G06F 3/04817; G06F 3/0482; G06Q 50/01
See application file for complete search history.

(56) References Cited

U.S. PATENT DOCUMENTS

| | | | |
|---|---|---|---|
| 8,676,913 | B1 | 3/2014 | Roche |
| 2002/0147748 | A1 | 10/2002 | Huang |
| 2009/0198689 | A1* | 8/2009 | Frazier ................... G06F 16/13 |
| 2010/0036694 | A1* | 2/2010 | Schroeder .......... G06Q 30/0256 |
| | | | 705/14.54 |
| 2012/0023072 | A1 | 1/2012 | Garg |
| 2012/0096087 | A1 | 4/2012 | Curcelli |
| 2015/0221017 | A1 | 8/2015 | Oguro |
| 2016/0307128 | A1* | 10/2016 | Herman ............... G06Q 20/202 |
| 2017/0149906 | A1 | 5/2017 | DeMaris |

OTHER PUBLICATIONS

Food Network http://www.foodnetwork.com/saves/ as accessed on Sep. 27, 2018.
Allrecipes https://www.allrecipes.com/recipe/34116/roast-chicken-with-thyme-and-onions/?internalSource=rotd&referringId=201&referringContentType=Recipe%20Hub as accessed on Sep. 27, 2018.

* cited by examiner

*Primary Examiner* — Abdulkader M Alriyashi
(74) *Attorney, Agent, or Firm* — Merchant & Gould P.C.

(57) ABSTRACT

A plurality of distributed service components and experience clients forming a social networking platform to provide user interfaces for recipe sharing and interaction between users about food and recipes. System and methods provide user interfaces allowing users to save, manage, and share their own recipes and stories about food and other food-related content. Further, user interfaces allow users to view content of other users within shared circles, as well as clip recipes from other digital sources.

16 Claims, 62 Drawing Sheets

(Screenshot: "Create Your Recipe" form — Title: Potato Salad; Category: Salads; Gluten Free; Vegetarian; Nutritional Information: Calories per Serving; Preparation Time: 10; Cooking Time: 15; Serving: 8; Description: Simple and Easy)

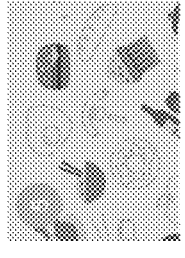
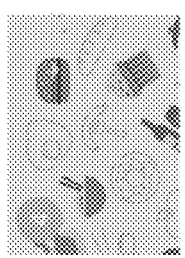
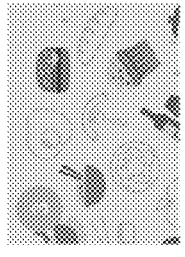
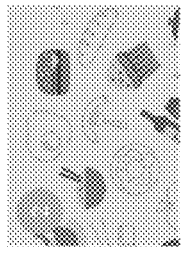
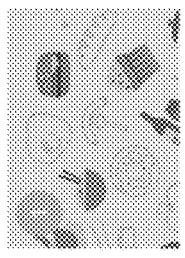
FIG. 21

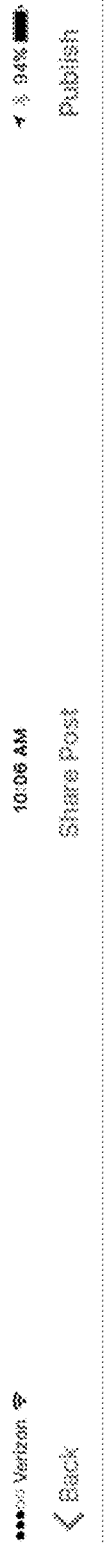
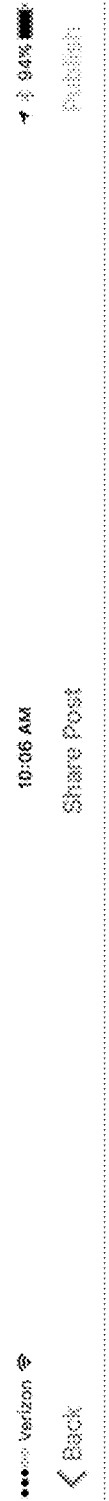
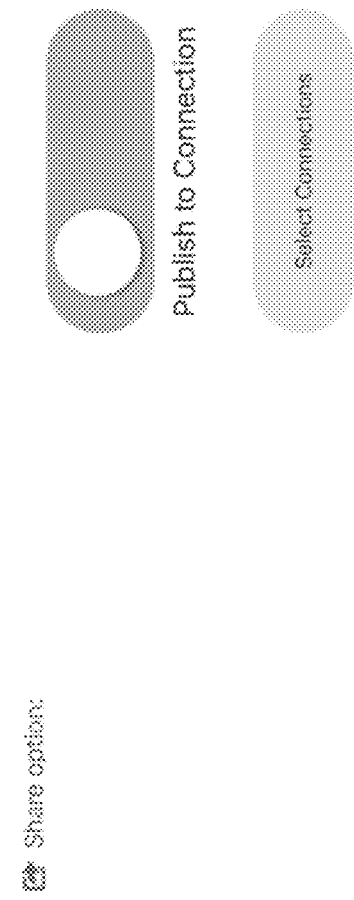
FIG. 28A
FIG. 28B

Potato Salad

Simple and Easy

★ ★ ★ ★ ★

25 min

Prep: 15min
Cook: 15min

Directions — 554

- Place the potatoes and two tablespoons of salt in a large pot of water.
- Bring the water to a boil, then lower the heat and simmer for 10 minutes until the potatoes are barely tender when pierced with a knife.
- Drain the potatoes in a colander, then place the colander and the potatoes over the empty pot and cover with a clean, dry kitchen towel. Allow the potatoes to steam for 15-20 minutes.
- Meanwhile in a small bowl, whisk together the mayonnaise, buttermilk, Dijon mustard, whole grain mustard, dill, 1 tsp of salt and 1 tsp of pepper. Set aside.
- When the potatoes are cool enough to handle, cut them in quarters or in half depending on size.

George McNulty

FIG. 36

SYSTEM AND METHOD FOR RECIPE SHARING AND MANAGEMENT

CROSS-REFERENCE TO RELATED APPLICATION

This application is a continuation of U.S. patent application Ser. No. 15/818,200 filed Nov. 20, 2017 issued as U.S. Pat. No. 11,012,402 on May 18, 2021, which is fully incorporated by reference herein.

TECHNICAL FIELD

Embodiments relate generally to social networking platforms, and, more particularly, to systems and methods for recipe sharing and interaction between multiple users about food and recipes.

BACKGROUND

Many food and recipe-based apps and websites exist today. Some provide content such as recipes and food preparation instructions. Almost all of these follow the same pattern of a content-provider service, where a user signs up, views various recipes, and saves the recipes to a folder or list. For example, at FOODNETWORK.COM, a user can mindlessly scroll through hundreds of recipes without much context, other than perhaps a celebrity chef's endorsement. Once he has found something he likes, the user can save the recipe to a list for later viewing. However, food and food preparation is much more about the community in which it is shared than the mechanics of the preparation. Existing apps and websites provide no community for sharing, other than a "click to email" link or "post" to TWITTER or FACEBOOK.

Existing social networking platforms provide insufficient architecture for users to interact around food because talking about and sharing food experiences is more than a fleeting post in an activity stream. Platforms like TWITTER and FACEBOOK are not suitable for storing recipes, as they are focused on the day-to-day activity of users. No repository is available for storing and managing desired content, or for sharing within groups.

Further, existing food and recipe-based apps and websites offer little for the aggregation of recipes and food-based content. Existing food-oriented sites such as FOODNWETWORK.COM or ALLRECIPES.COM do not allow a user to add or store his own recipes. The user can view only recipes provided by that particular site and cannot add or save his own recipes.

Therefore, there is a need for systems and methods that can more efficiently integrate recipes and food-related content for sharing between users.

SUMMARY

Embodiments described herein meet the aforementioned needs. In embodiments, systems comprise a plurality of distributed service components and experience clients forming a social networking platform to provide a user interface for recipe sharing and interaction between users about food and recipes. For example, supported experience clients can include mobile native apps, such as iOS and Android, a desktop website accessible by a desktop web browser, and a mobile website accessible by a mobile web browser. Methods provided by the systems allow user interaction on experience clients about food, recipes, and other related content. In particular, user interfaces provide users the ability to save, manage, and share their own recipes, stories about food, and other food-related content that is important to them. Further, user interfaces provide the ability for users to view content of other users and collect and view other users' content in a single place.

In an embodiment, a social networking system comprises a server including computing hardware of at least one processor, a memory operably coupled to the at least one processor and configured to store instructions invoked by the at least one processor, and input/output facilities; a database communicatively coupled to the server via the input/output facilities and configured to store user group data; instructions that, when executed on the server, cause the computing platform to implement: a visual interface configured to present a group creation interface and a recipe viewing interface; a logic subsystem configured to: receive a request to create a group from one of a plurality of user experience devices accessing the group creation interface, the request to create a group including a group identifier and a plurality of users to add to the group, the request generated by an initiating user, transmit a notification to each of the users to add to the group, receive at least one acceptance responding to the notification from at least one of the users to add to the group, each acceptance corresponding to an accepting user, store the group identifier and an identifier of each of the accepting users in the database, wherein after the group is created, receive digital recipe data from at least one of the accepting users or the initiating user via at least one of the user experience devices accessing the visual interface, and transmit the digital recipe data to all other users in the group, wherein each user accesses the digital recipe data with at least one of the user experiences devices using the recipe viewing interface.

In an embodiment, a method for sharing digital recipe data comprises presenting a graphical user interface including a group creation interface and a recipe viewing interface; receiving a request to create a group from one of a plurality of user experience devices accessing the group creation interface, the request to create a group including a group identifier and a plurality of users to add to the group, the request generated by an initiating user, transmitting a notification to each of the users to add to the group, receiving at least one acceptance responding to the notification from at least one of the users to add to the group, each acceptance corresponding to an accepting user, storing the group identifier and an identifier of each of the accepting users in a database, wherein after the group is created, receiving digital recipe data from at least one of the accepting users or the initiating user via at least one of the user experience devices accessing the visual interface, and transmitting the digital recipe data to all other users in the group, wherein each user accesses the digital recipe data with at least one of the user experiences devices using the recipe viewing interface.

In an embodiment, a digital recipe clipping engine comprises at least one processor and a memory operably coupled to the at least one processor and configured to store instructions invoked by the at least one processor; instructions that, when executed, cause the at least one processor to implement: a social networking system interface comprising a URL input field, a mini-browser embedded within the social networking system interface and configured to present digital recipe data on a third-party website specified by the URL input, and an XML importer configured to parse the digital recipe data and save the digital recipe data to a database, wherein each field of the digital recipe data corresponds to a separate XML element.

In a feature and advantage of embodiments, a plurality of distributed service components provides several user interfaces to an experience client. In an embodiment, a "Discover" interface is provided in which a user can view featured chefs' recipes, regular contributor content, popular recipes, and friends' posts. In an embodiment, an "Add Content" interface allows a user to post his own recipes, food-related articles, and import recipe and food-related content. In an embodiment, a "My Circle" interface allows a user to view and interact with friends' notification and messages from other users. In an embodiment, a "Me" interface lows a user to view and interact with his personalized recipe box, content that has been liked, and users he is following and user that follow him. In all of the interfaces, a user is presented with searching capability so he can quickly search for desired content, and not have to return to a main or search page.

In a feature and advantage of embodiments, a virtual community can be created by the social networking platform. In an embodiment, users of the platform can be communicatively coupled in various groups and subgroups according to the desires of the users. For example, an initiating user can form a virtual circle, name the circle, and add other users to the circle. Those other users who "accept" their grouping can then be communicatively coupled to the other users of the group. The platform thereby establishes a user-level ad-hoc grouping, instead of a network-level ad-hoc network that is restricted to the particular hardware of the user. Users can be identified by a unique user ID, network ID, or computer hardware ID, in certain embodiments. Content can then be shared at varying levels of groups and subgroups.

In a feature and advantage of embodiments, a recipe clipping engine provides an interface and parsing logic to "clip" a recipe and import the recipe to the social networking platform. Digital content can therefore be imported into the system from other digital sources. For example, a user can input a recipe URL or navigate to a third-party website into via a mini browser integrated into the recipe clipping engine. Recipe clipping engine logic can then navigate to that URL and parse the recipe and store it in a database on the platform. In another embodiment, a user can paste recipe text into the interface and the recipe clipping engine logic can parse the recipe and store it in a database on the platform. In another embodiment, a recipe clipping engine is integrated into a web browser to allow a user to "clip" a recipe from any website and import the recipe to the platform. Embodiments of the recipe clipping engine can utilize an XML schema to import the recipe to the platform.

In a feature and advantage of embodiments, data permanence solutions meld the permanence of recipe box data with the transitory properties of activity stream data to overcome problems of existing data storage solutions. For example, activity stream data is typically transitory, in that no "instance" of the data is stored longer than a single viewing. Traditional activity stream data is relevant at the moment, but doesn't have any permanence for historical viewing. At the same time, recipe box data is typically permanent, in that at least one instance of recipe box data is stored for a user for repeated viewings. Embodiments described herein meld these two concepts using selectively-generated instances of particular data.

In an embodiment, a user's "Home" page presents activity stream (transitory) data, while a user's personal "Me" page presents permanently-stored data as a collection of items the user has collected and written himself. Accordingly, the data model utilized for the social networking system passes certain data through with no permanence, and stores other data with permanence. One skilled in the art will readily understand that this type of data model can easily get very complex, which has been solved by embodiments herein.

In an example, a first user can post a recipe, which is stored as a first instance of the data for the first user. A second user can see the transitory posting in the second user's activity stream (not permanent on the second user's side). The second user can choose to save a version for later viewing. Accordingly, a second instance is then instantiated for the second user that is wholly separate from the first instance. Then, if the first user deletes the first instance, the second instance remains. The data model accounts for the unique relationship between users and data to establish what is transient and what is permanent. An important aspect of the data model is making permanent or creating another instance of any data that a user modifies or saves. The instance is then linked to the modifying or saving user such that modification (including deletion) of the first instance leaves the second instance unchanged.

In embodiments, specific and structured graphical user interfaces described herein provide certain prescribed functionality directly related to the structure of the graphical user interfaces. Embodiments therefore solve the problem of the standalone nature of food and recipe-based apps and websites and the insufficient architecture for sharing and aggregating content provided by existing social networking platforms. The graphical user interfaces providing for the generation of circles and the corresponding content sharing, as well as the browser-integrated recipe clipper are just two examples of embodiments that have not existed in the art.

Further, embodiments provide a solution that is not merely the routine or conventional use of the Internet. Rather, the solutions described herein address technological problems particular to the Internet by implementing a solution specific to the Internet environment and different from the manner suggested by routine or conventional use within the field.

In particular, the solutions described herein are rooted in multi-contributor networked computer technology to overcome a problem specifically arising in this technology. The embodiments described herein are manifested only in the computing realm and over a computer network. For example, architectures described herein allow a user to create various communities of interest so that users are virtually communicatively coupled together via embodiments of the system. Content can be shared and individually stored by each user in one of the communities. No such community coupling or personalized storage is provided by existing food and recipe-based apps and websites or existing social networking platforms, as this is traditionally done via email, where a user's unorganized email account acts as the repository. Further, the unique browser-integrated and mini-browser clipping solutions provided embodiments of the system allow simple, intuitive aggregation of content across multiple third-party websites, which are not provided by existing web browsers or food and recipe-based apps and websites, and are manifested only in the computing realm. Additionally, data permanence solutions melding the permanence of recipe box data and transitory properties of activity stream data overcome problems of existing data storage solutions.

Moreover, the embodiments described herein require particular and meaningful system components, graphical user interfaces, and network-based interaction so as to not preempt all applications of social networking platforms.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 7 is a screenshot of a personalized activity stream for a user experience device on a social networking system, according to an embodiment.

FIG. 14 is a screenshot of a personalized activity stream with an Add Content selection for a user experience device on a social networking system, according to an embodiment.

FIGS. 16A and 16B are screenshots of a recipe creation interface for a user experience device on a social networking system, according to an embodiment.

FIG. 21 is a screenshot of a recipe summary for a user experience device on a social networking system, according to an embodiment.

FIGS. 28A-28B are screenshots of publication options for a post entered with a user experience device on a social networking system, according to an embodiment.

FIG. 36 is a screenshot of a recipe with recipe directions on a user experience device on a social networking system, according to an embodiment.

Figure 1:
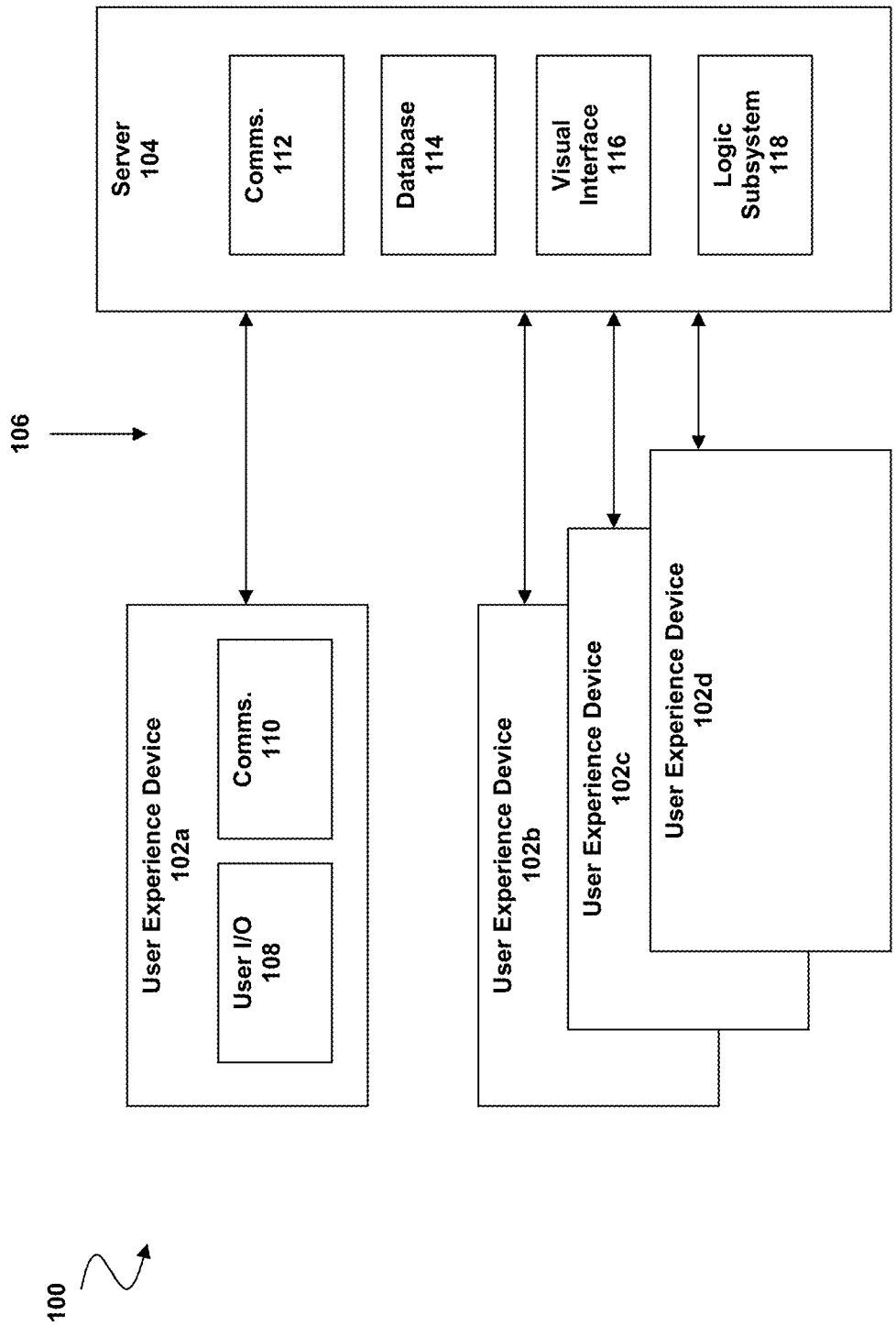
FIG. 1 is a block diagram of a social networking system for recipe management, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a social networking system 100 is depicted, according to an embodiment. Social networking system 100 generally comprises a plurality of user experience devices 102 and a server 104 operable coupled over a network 106.

As will be described, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

Each of the plurality of user experience devices 102 generally comprises a user input/output engine 108 and a communications engine 110. In an embodiment, user experience device 102 can be a desktop computer having access to specialized software for interfacing with server 104. For example, user experience device 102 can comprise a web browser configured to access server 104. In another embodiment, user experience device 102 can be a mobile device such as a smartphone or tablet configured to access server 104. For example, user experience device 102 (and particularly, user input/output engine 108 and communications engine 110) can include specialized software for the mobile device.

User input/output engine 108 is configured to receive inputs from a user of user experience device 102 related to system 100 content; particularly, recipes or recipe sharing. For example, user input/output engine 108 can comprise a visual user interface for interacting with the user of user experience device 102.

Communications engine 110 is configured to transmit and receive information related to system 100. In particular, communications engine 110 can transmit and receive data specific to the application for which server 104 is configured, such as recipe or food-related data or recipe or food-related sharing interfaces. In embodiments, communications engine 110 can comprise communications software and transceiver circuitry. Transmitter circuitry can comprise one or more electronic elements configured to transmit and receive data related to system 100. For example, wireless transceiver circuitry can be configured for radio frequency (RF) communications, WIFI communications, BLUETOOTH communications, or near-field communications (NFC). Wired transceiver circuitries can likewise be utilized, such as CAT-5 and CAT-6.

Server 104 generally comprises communications engine 112, a database 114, a visual interface 116, and a logic subsystem 118.

Communications engine 112 is configured to transmit and receive information related to system 100. In particular, communications engine 112 is configured to allow access to visual interface 116 by user experience devices 102. In an embodiment, user experience devices 102 and server 104 can be operably coupled by a network 106, including an intranet network or the Internet.

Database 114 is configured to store the transmitted and received information related to system 100. In particular, database 114 comprises a database configured to the generally-tailored data associated with recipes and the sharing of recipe data among groups and subgroups. Database 114 can be a general purpose database management storage system (DBMS) or relational DBMS as implemented by, for example, Oracle, IBM DB2, Microsoft SQL Server, PostgreSQL, MySQL, SQLite, Linux, or Unix solutions, in embodiments.

Visual interface 116 comprises an engine for delivering server content stored in database 114 over communications engine 112 to user experience devices 102. In an embodiment, visual interface 116 can comprise a web browser-based HTML or XML interface. In another embodiment, visual interface 116 can comprise a software application configured to the unique hardware of the respective devices 102. As will be readily understood by one of skill in the art, portions of the content of visual interface 116 can be delivered by server 104 to user experience devices 102 for display on the respective devices through device-specific software running on the respective devices. In other embodiments, visual interface 116 can be viewed on server 104 using Internet-capable browser software.

Logic subsystem 118 comprises an engine for managing the data of server 104 and presentation of that data via visual interface 116 for user experience devices 102. For example, as will be described further with respect to FIG. 3, logic subsystem 118 can provide system administration, circles management, and recipe data management. Accordingly, logic subsystem 118 can interface to communications engine 112, database 114, and visual interface 116.

Each of the plurality of user experience devices 102 can interface to server 104 in a synchronous or asynchronous manner. In a synchronous example, user experience device 102a can interact with user experience device 102b when both user experience device 102a and user experience device 102b are actively interfacing with server 104. For example, a recipe can be shared by a first user operating user experience device 102a in real-time with a second user operating user experience device 102b, who views and comments on the recipe, which are then transmitted back to user experience device 102a. In an asynchronous example, the first user operating user experience device 102a can post recipe data to server 104, which is stored in database 114 and can be viewed later by the second user operating user experience device 102b. In embodiments, a user can modify (edit, delete, etc.) his previous comments to correspondingly modify that comment data on the server and subsequent display via the user experience device.

Figure 2:
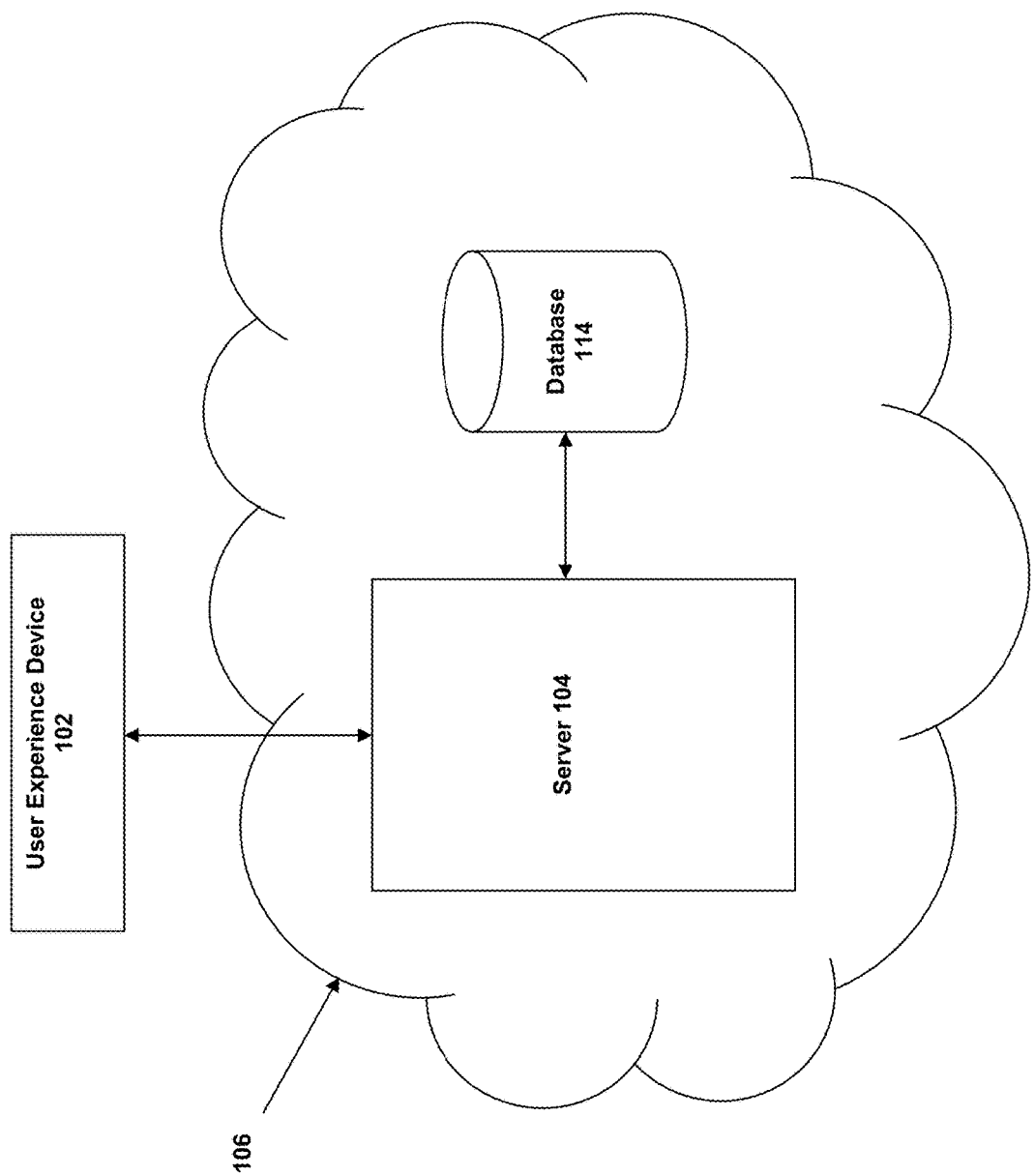
FIG. 2 is a block diagram of a social networking system for recipe management, according to an embodiment.

Referring to FIG. 2, another block diagram of social networking system 100 is depicted, according to an embodiment. As depicted, embodiments of system 100 can be performed in cloud computing, client-server, or other networked environment, or any combination thereof. The components of system 100 can be located in a singular "cloud" or network, or spread among many clouds or networks. End-user knowledge of the physical location and configuration of components of system 100 is not required.

Network 106 is shown as a singular "cloud," with server 104 and database 114 as discrete components within network 106. However, server 104 can comprise a plurality of distributed service components throughout network 106. Likewise, database 114 can comprise a plurality of storage devices throughout network 106.

Figure 3:
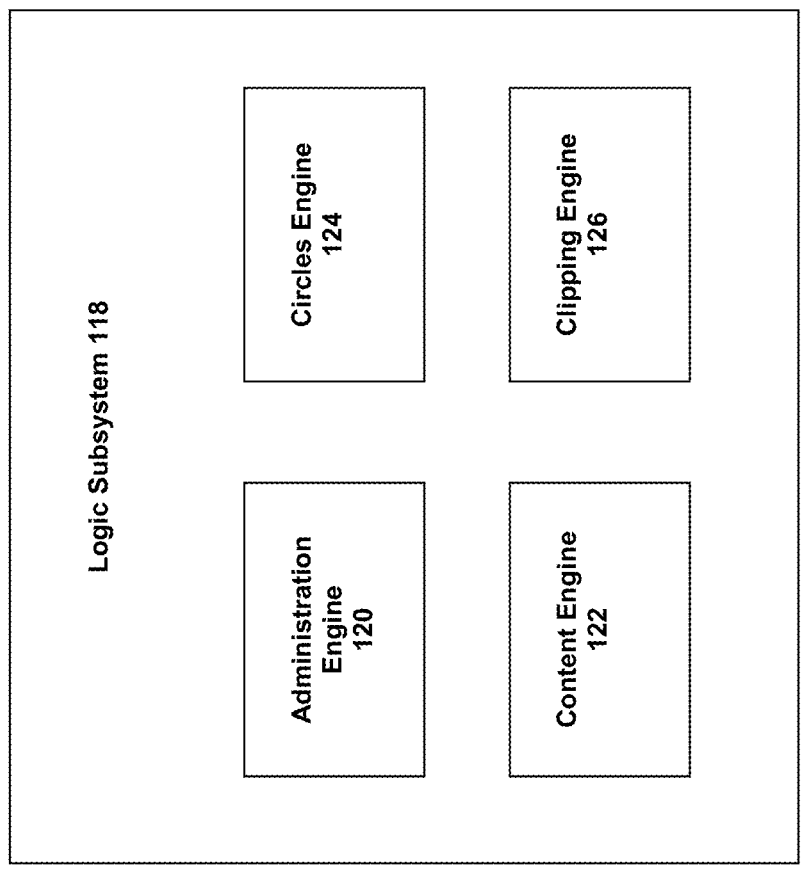
FIG. 3 is a block diagram of a logic subsystem of a social networking system, according to an embodiment.

Referring to FIG. 3, a block diagram of logic subsystem 118 is depicted, according to an embodiment. Logic subsystem 118 generally comprises an administrative engine 120, a content engine 122, a circles engine 124, and a clipping engine 126. In embodiments, as will be described, each of administrative engine 120, content engine 122, circles engine 124, and clipping engine 126 can be communicatively coupled to each other within logic subsystem 118. Further, each of administrative engine 120, content engine 122, circles engine 124, and clipping engine 126 can utilize the components of server 104, such as communications engine 112, database 114, and visual interface 116 to provide a unique user experience to user experience devices 102.

Figure 4:
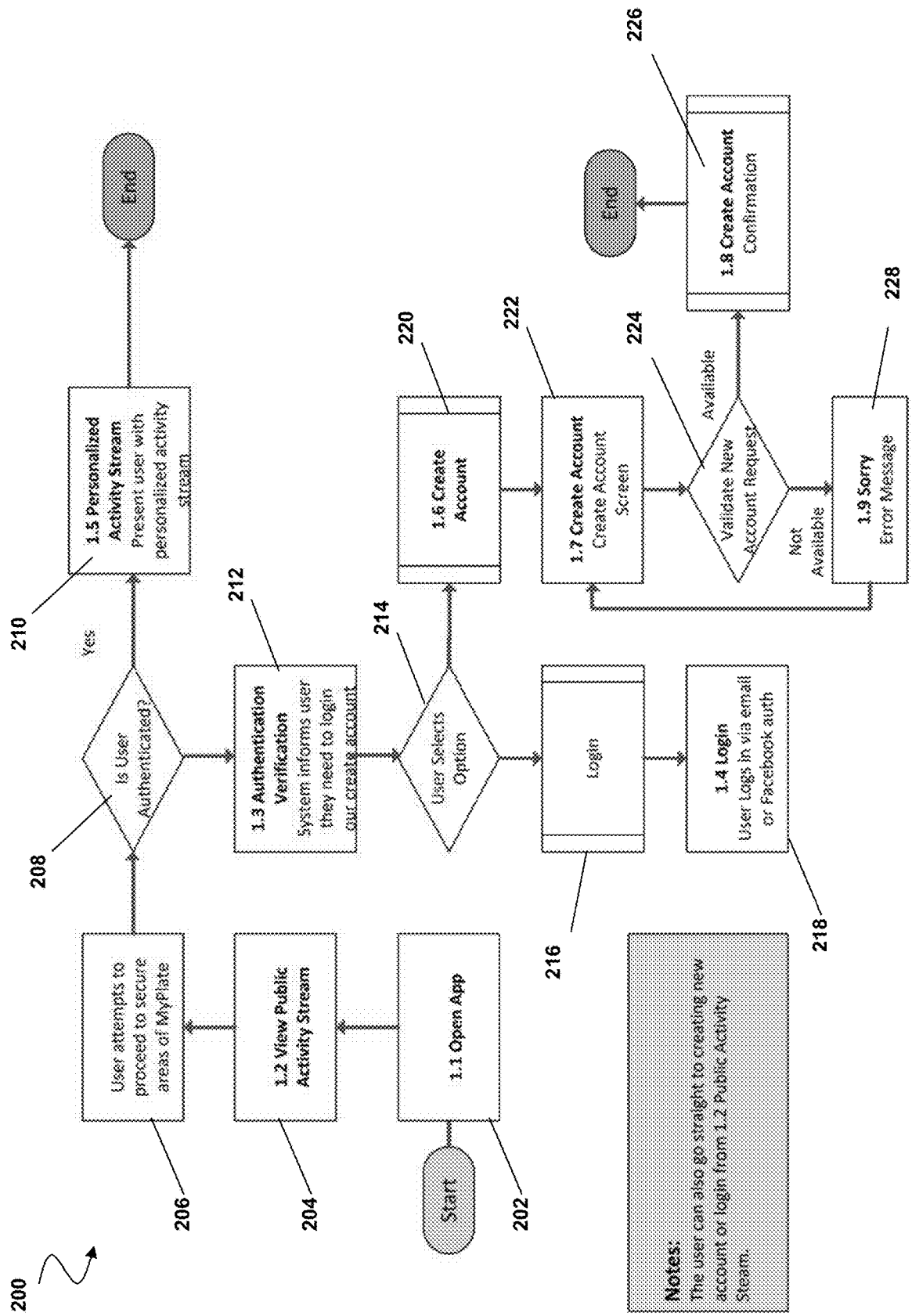
FIG. 4 is a flowchart of a method for account creation on a social networking system, according to an embodiment.

Administrative engine 120 is configured to manage the administrative functions of logic subsystem 118; for example, the opening of an app on a user experience device 102, account creation, verification, and login, and error messaging. Referring to FIG. 4, a flowchart of a method 200 for account creation on a social networking system is depicted, according to an embodiment. Method 200 can be implemented by, for example, administrative engine 120.

Figure 5:
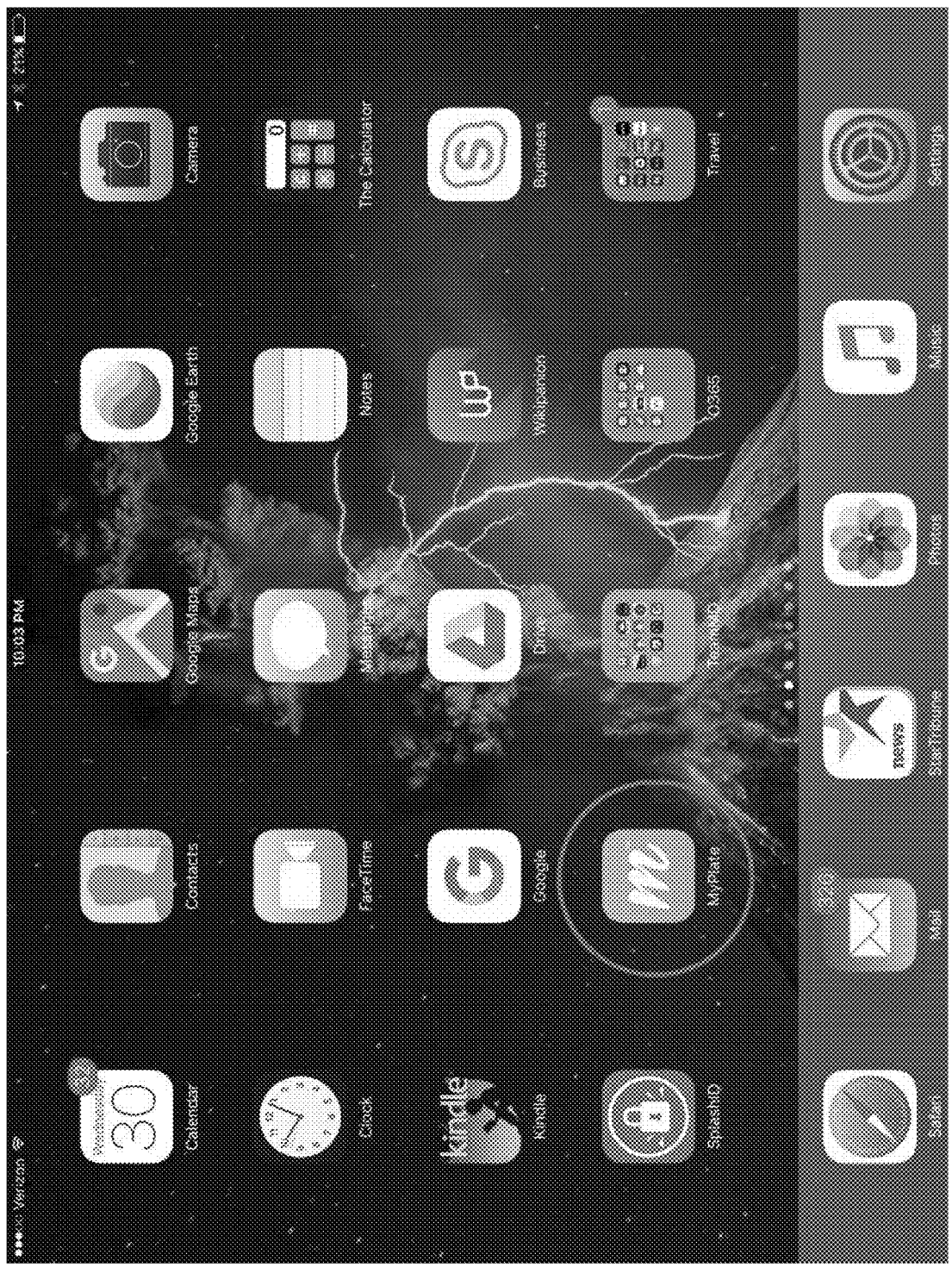
FIG. 5 is a screenshot of a social networking system icon on a user experience device, according to an embodiment.

Method 200 generally comprises opening an app at 202 on a user experience device, such as user experience device 102. Referring to FIG. 5, a screenshot of a social networking system icon on a user experience device is depicted, according to an embodiment. Tapping the MYPLATE app icon allows a user operating a user experience device to access the social networking system, such as social networking system 100.

Figure 6:
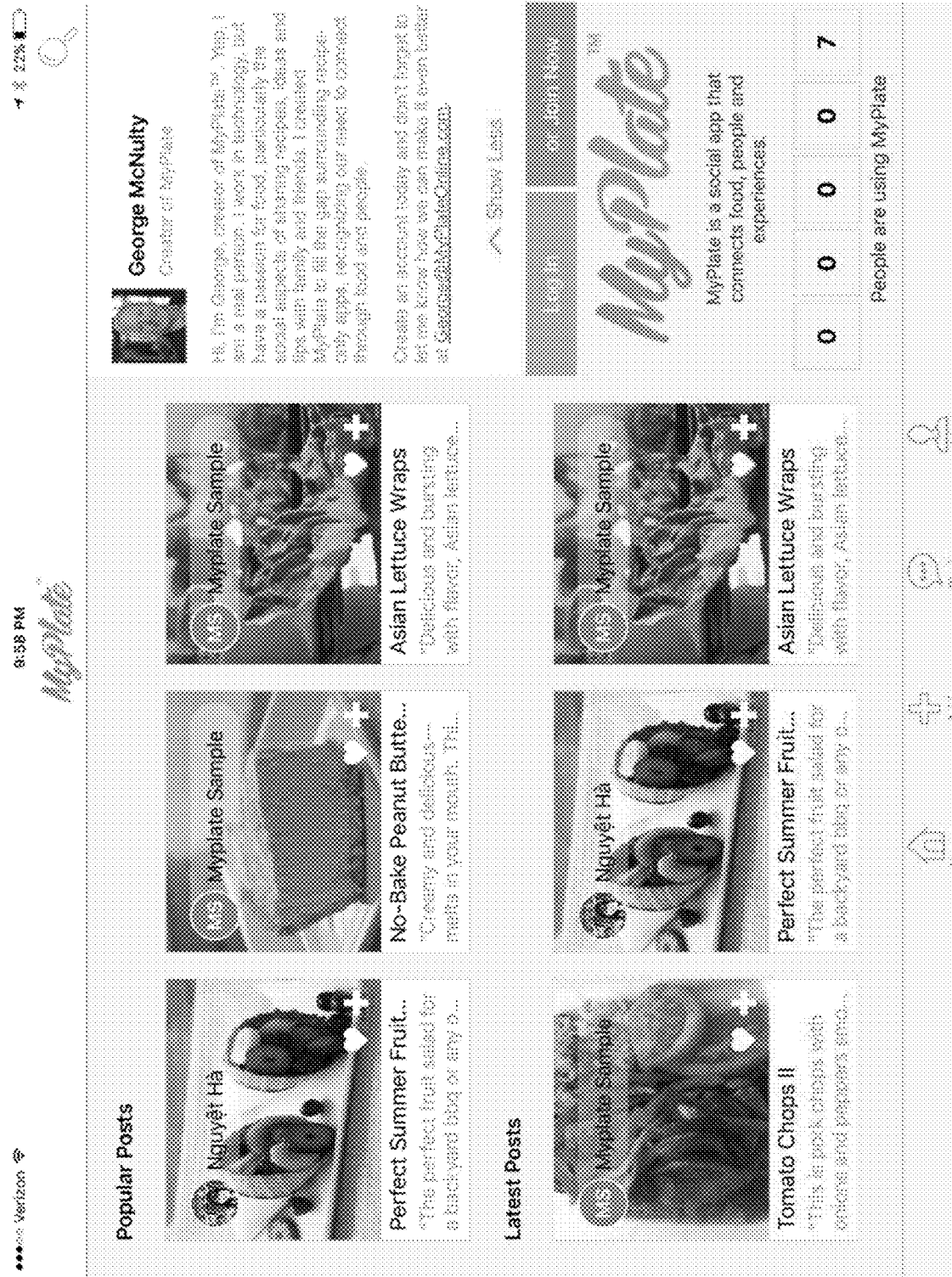
FIG. 6 is a screenshot of a public activity stream for a user experience device on a social networking system, according to an embodiment.

At 204, a public activity stream can be viewed by a user operating user experience device. For example, referring to FIG. 6, a screenshot of a public activity stream for a user experience device on a social networking system is depicted, according to an embodiment. The public activity stream can include content that other users of the social networking system have made public, as well as generic content available to all users. In embodiments, contributing editors' stories are posted as public to all public activity streams, including recipe and non-recipe data.

At 206, a user then attempts to navigate to secure areas of the social networking system. Method 200 then enters a check 208 to determine if the user is authenticated. At 210, if the user is already authenticated, a personalized activity stream is presented.

Figure 7:
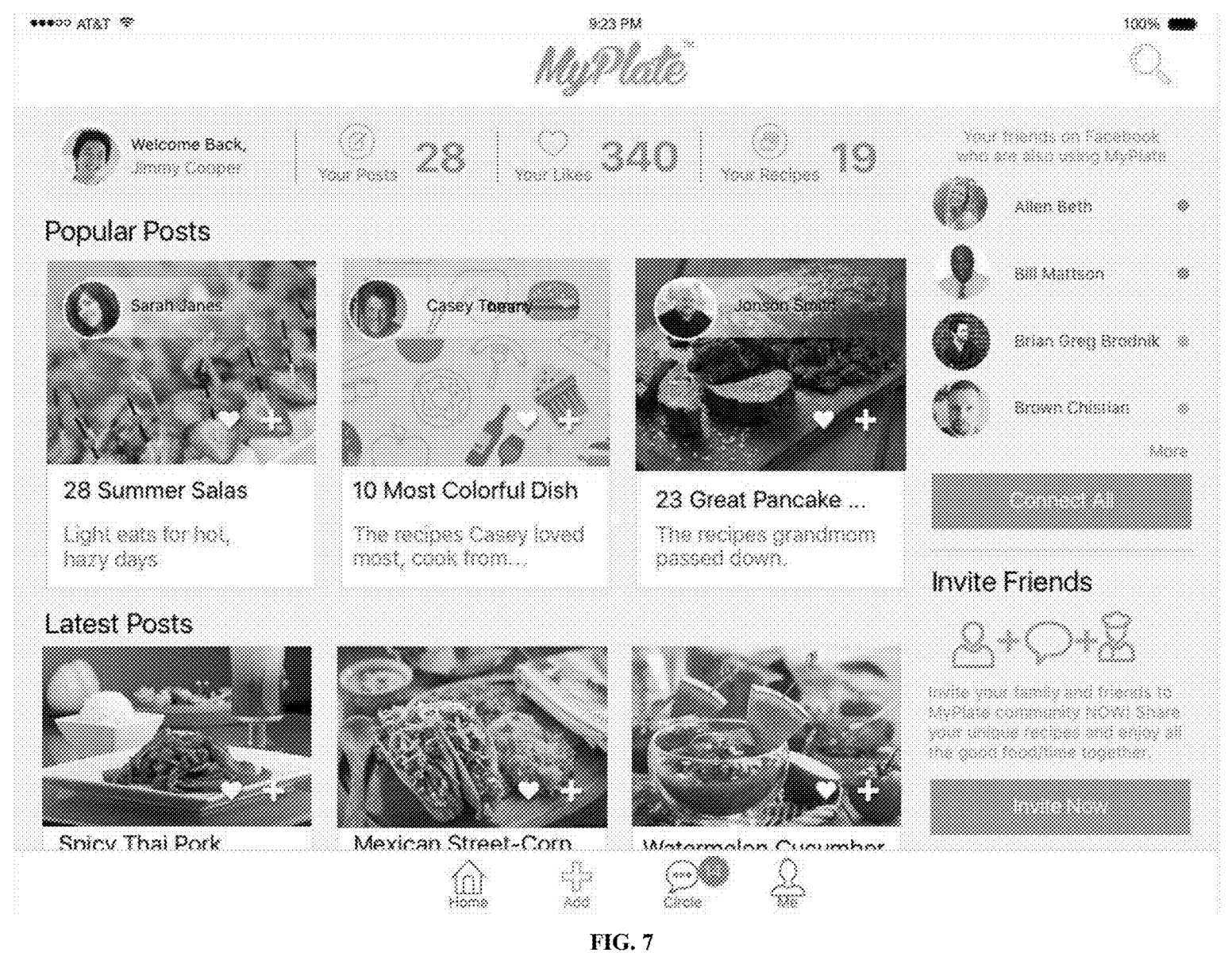

For example, referring to FIG. 7, a screenshot of a personalized activity stream for a user experience device on a social networking system is depicted, according to an embodiment. In embodiments, the personalized activity stream can include content made available by users in a common circle with the authenticated user, as well as social networking system status information unique to the authenticated user. Accordingly, the activity stream feed can be provided by other users instead of a content provider. In an embodiment, when a user is making a recipe at that moment, he can select "Making This Now" and push that recipe data immediately to other users' activity stream. In embodiments, once the personalized activity stream is presented, method 200 ends. In embodiments, the personalized activity stream can include specific contributing editors that a user has followed, or specific channels or content (gluten free, vegan recipes, chicken meals, etc.) In other embodiments, trending content, such as content that multiple other users are viewing or interacting with, is pushed to those users' activity streams who have not yet viewed the content. Trending content is thus presented in personalized activity streams according to relevancy and frequency. In other embodiments, the personalized activity stream can include notifications that other users have "liked" a recipe or other non-recipe content. In an embodiment, any content that is specifically shared with the user by his circle connections is presented in the personalized activity stream. In an embodiment, any content that the user has shared is also presented in that user's personalized activity stream so he can readily see everything he has posted.

Figure 8:
FIG. 8 is a screenshot of an authentication error for a user experience device on a social networking system, according to an embodiment.

Returning to 212, method 200 enters an authentication sub-process if the user is not authenticated based on check 208. In an embodiment, an error or status message can be presented to the user. For example, referring to FIG. 8, a screenshot of an authentication error for a user experience device on a social networking system is depicted, according to an embodiment.

Figure 9:
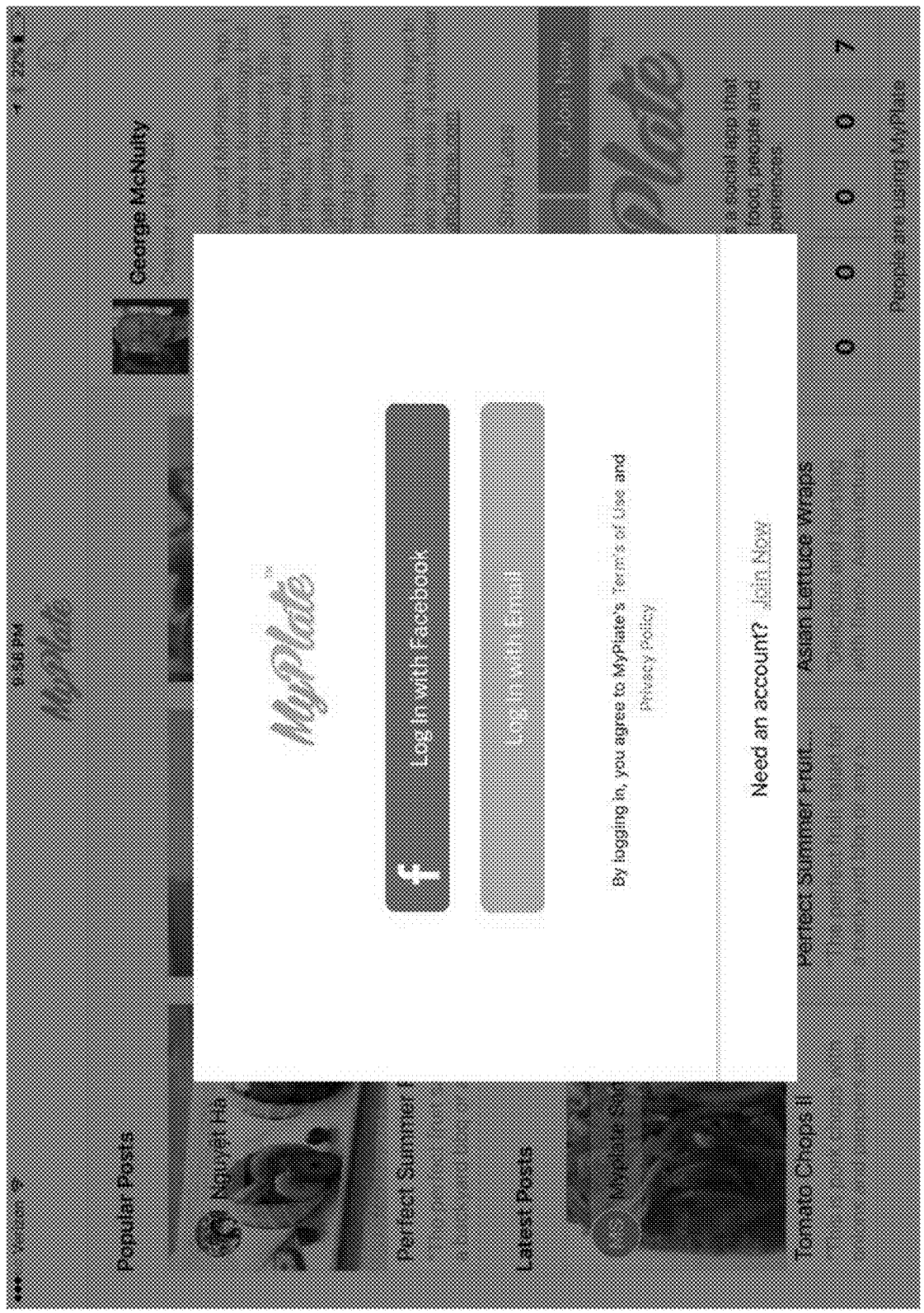
FIG. 9 is a screenshot of a login prompt for a user experience device on a social networking system, according to an embodiment.

At 214, a user is presented login options. For example, referring to FIG. 9, a screenshot of a login prompt for a user experience device on a social networking system is depicted, according to an embodiment. As shown, the user can log in with FACEBOOK or via email. Alternatively, the user can create an account.

If the user selects a login option at 216, the user can enter identifying information such as a previously validated FACEBOOK username and password or previously validated email address and password. At 218, the user is authorized to access the social networking system.

Figure 10:
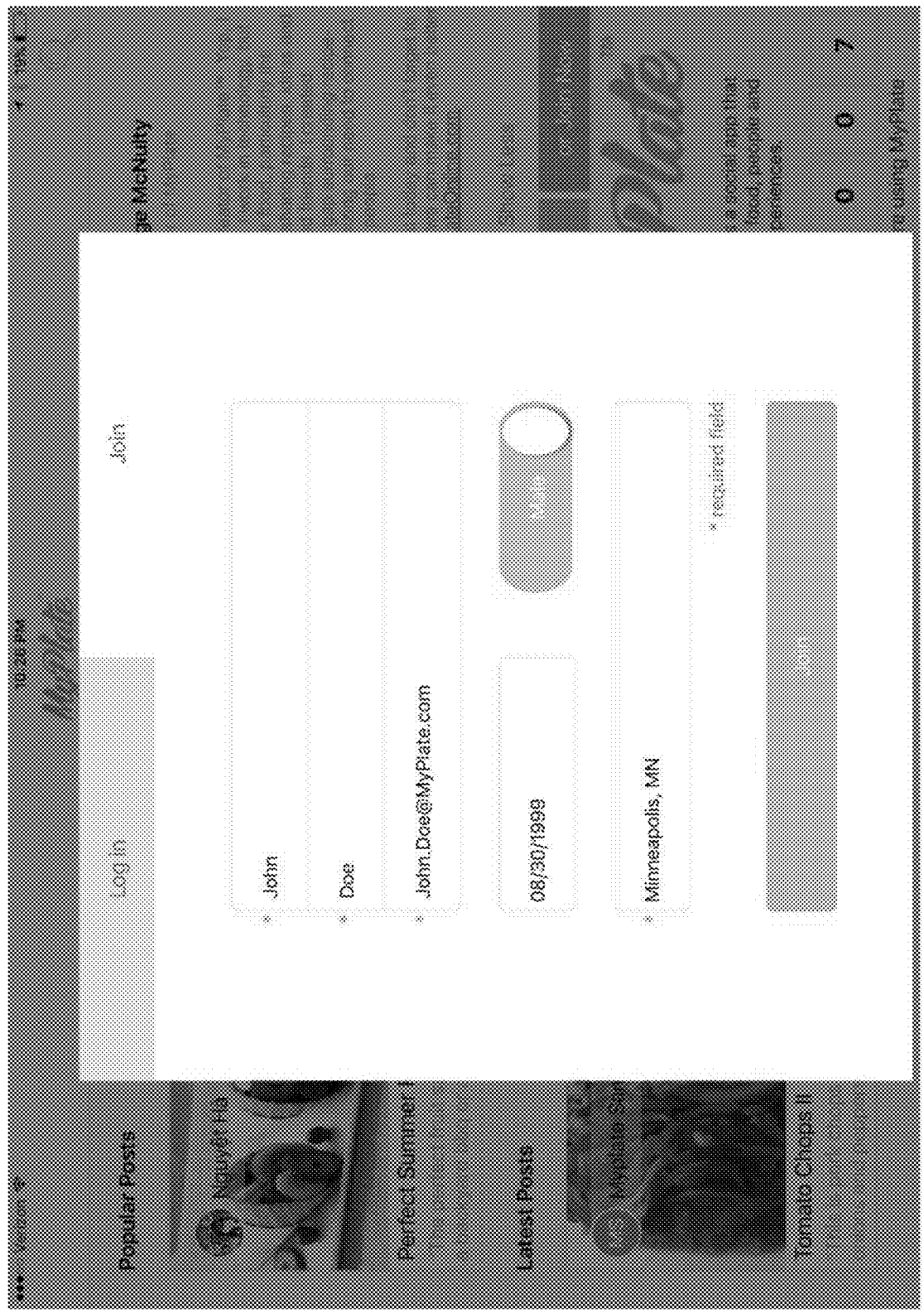
FIG. 10 is a screenshot of an account creation prompt for a user experience device on a social networking system, according to an embodiment.
Figure 11:
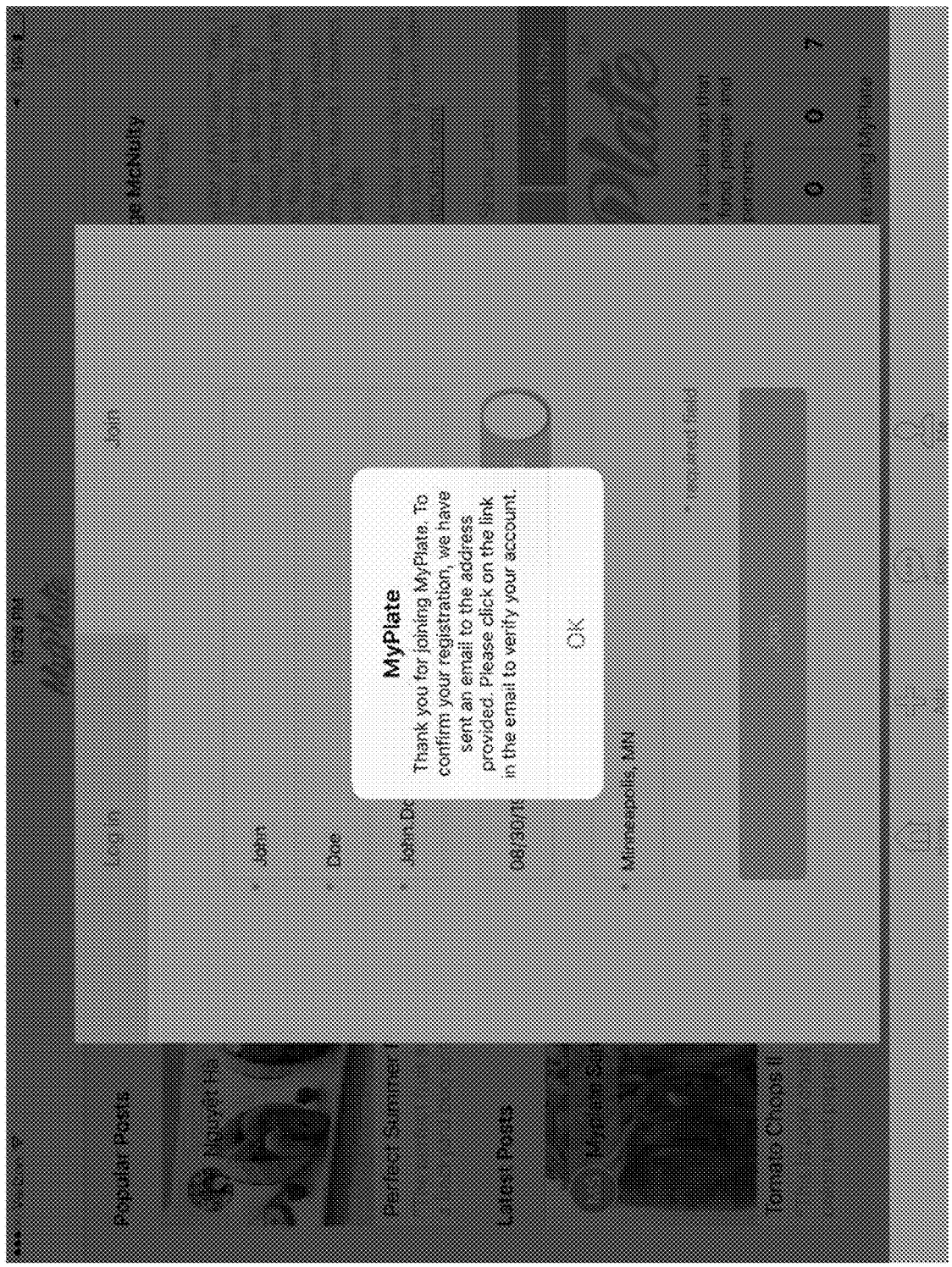
FIG. 11 is a screenshot of an account validation prompt for a user experience device on a social networking system, according to an embodiment.

Alternatively, the user can create an account at 220. At 222, a create account screen is presented. For example, referring to FIG. 10, a screenshot of an account creation prompt for a user experience device on a social networking system is depicted, according to an embodiment. The user can enter name, email, and other identifying information to create an account. At 224, the account can be validated. For example, referring to FIG. 11, a screenshot of an account validation prompt for a user experience device on a social networking system is depicted, according to an embodiment. In particular, at 224, the user is instructed to confirm registration via the email address he entered. Once confirmed, the account is created at 226 and method 200 ends. In an embodiment, once the account is created, the user is returned to the login prompt of FIG. 9 for easy login. In an embodiment, once a user is logged in, the user-level security controls of the MYPLATE app, for example, keep the user logged in until the user specifically selects to log out. This way, the user can quickly toggle back and forth between the MYPLATE app and other content on his device while cooking.

Figure 12:
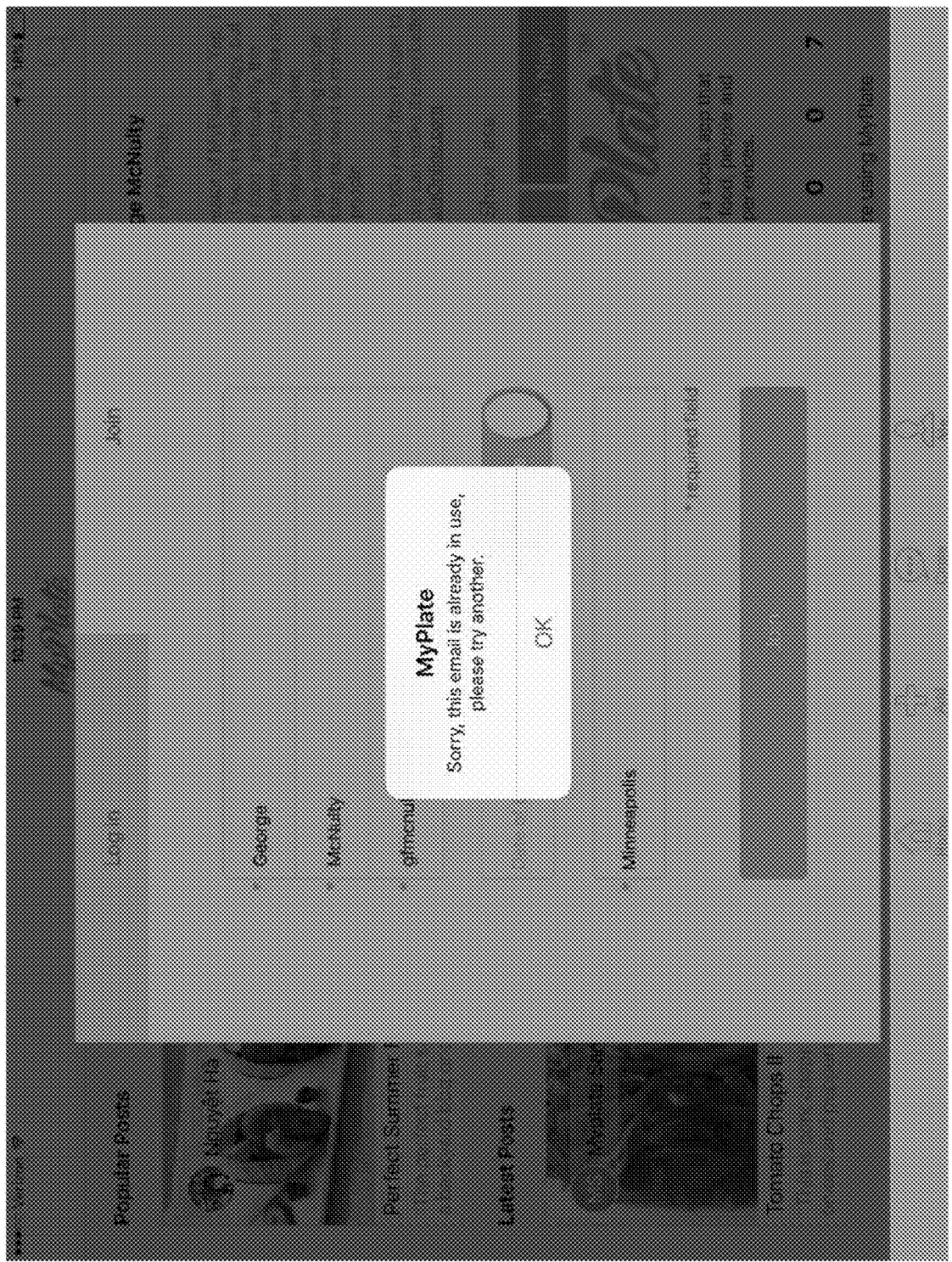
FIG. 12 is a screenshot of an error prompt for account validation for a user experience device on a social networking system, according to an embodiment.

Alternatively, at 228, a user is presented an account creation error. For example, referring to FIG. 12, a screenshot of an error prompt for account validation for a user experience device on a social networking system is depicted, according to an embodiment. The user is given the opportunity to return to 222 and enter different information to satisfy the account creation validation at 224.

In an embodiment, the user experience workflow also allows a user to go from viewing the public activity stream at 204 to account creation at 220 or login at 216 (not shown).

Content engine 122 is configured to manage the content recipe handling of logic subsystem 118; for example, recipe adding and viewing and post adding and viewing for a user experience device.

Figure 13:
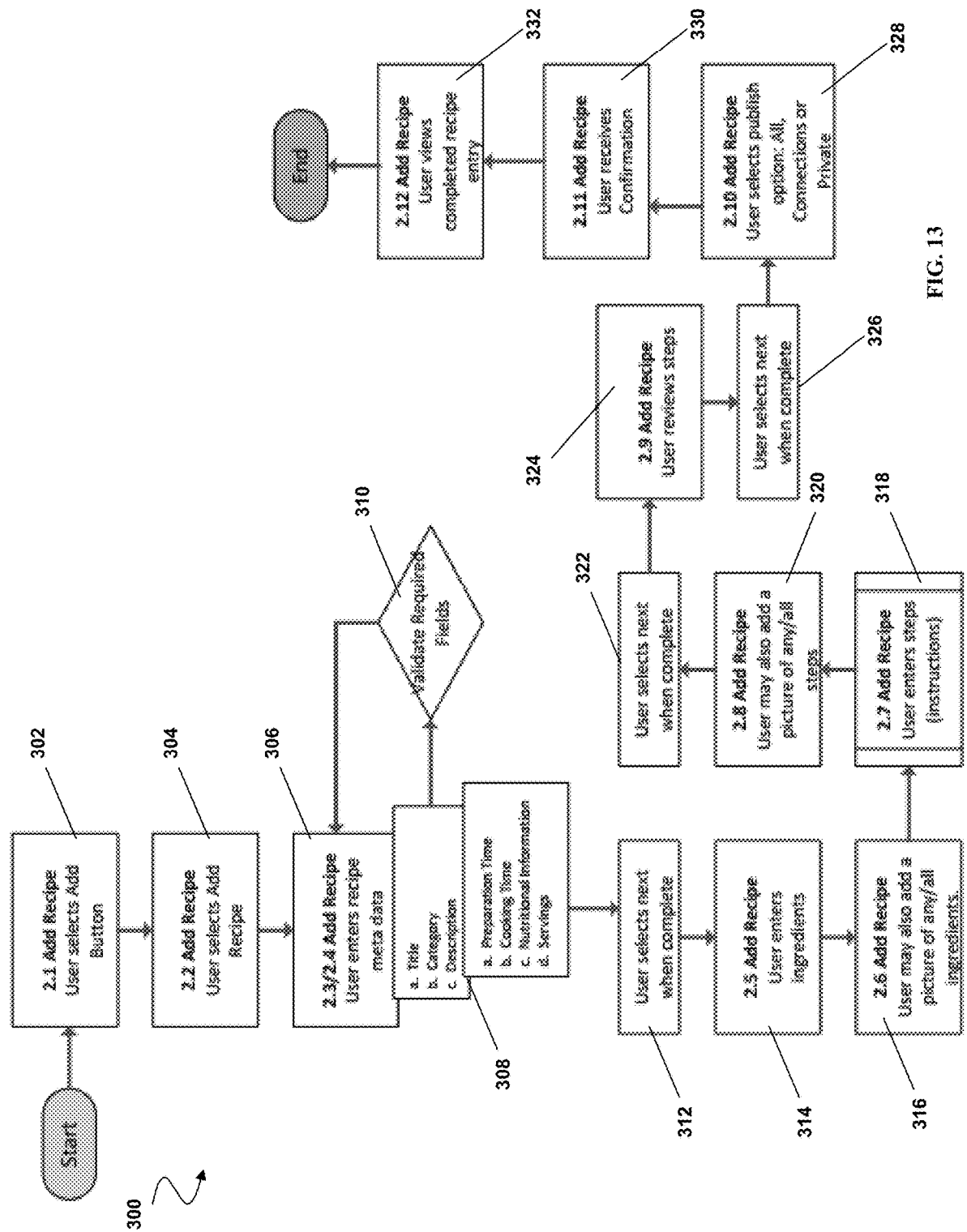
FIG. 13 is a flowchart of a method for adding a recipe on a social networking system, according to an embodiment.

Referring to FIG. 13 a flowchart of a method 300 for adding a recipe on a social networking system is depicted, according to an embodiment. Method 300 can be implemented by, for example, content engine 122.

Figure 14:
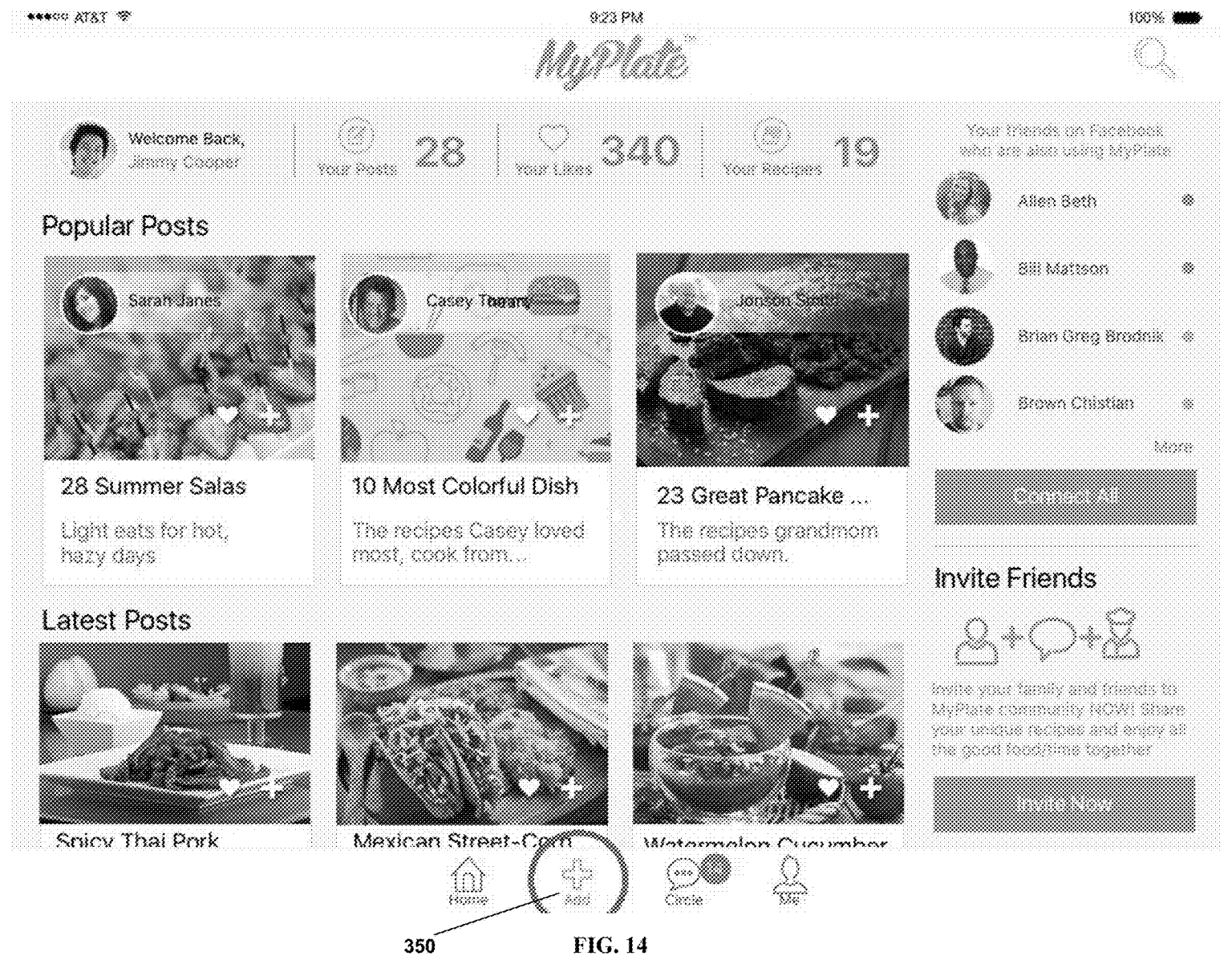

At 302, a user interfaces with a user experience device, such as user experience device 102a, to select an "Add" icon. For example, referring to FIG. 14, a screenshot of a personalized activity stream having an Add selection icon 350 for a user experience device on a social networking system is depicted, according to an embodiment.

Figure 15:
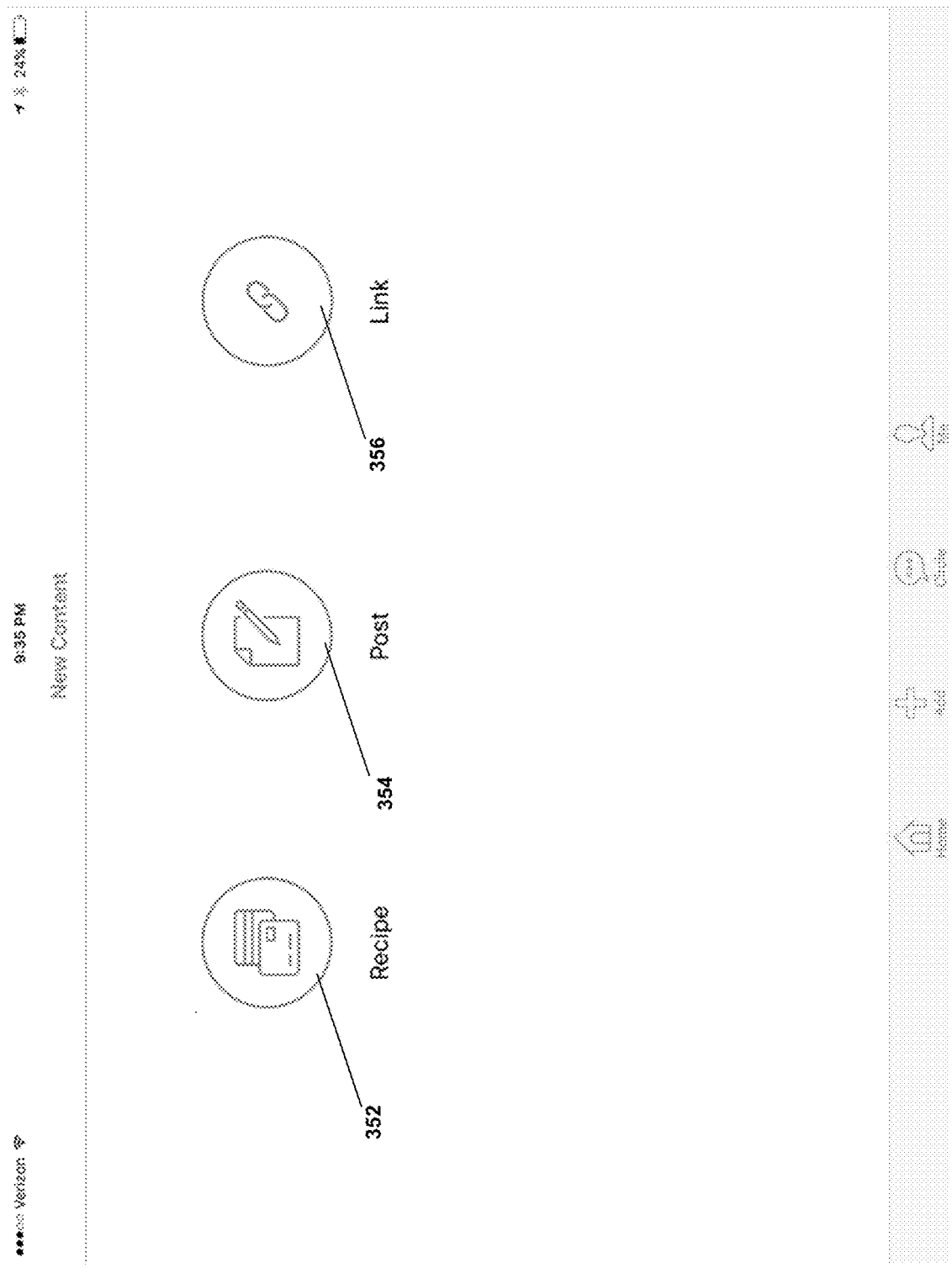
FIG. 15 is a screenshot of content selection options for a user experience device on a social networking system, according to an embodiment.

From the Add selection at 304, a user is presented with an interface to select an option for the type of content he would like to add. For example, referring to FIG. 15, a screenshot of content selection options for a user experience device on a social networking system is depicted, according to an embodiment. A user can select recipe content 352, post content 354, or select a link 356 to clip recipe content. According to method 300, content engine 122 receives a selection of recipe content by a user tapping, clicking, or otherwise selecting recipe content 352.

Figure 16A:
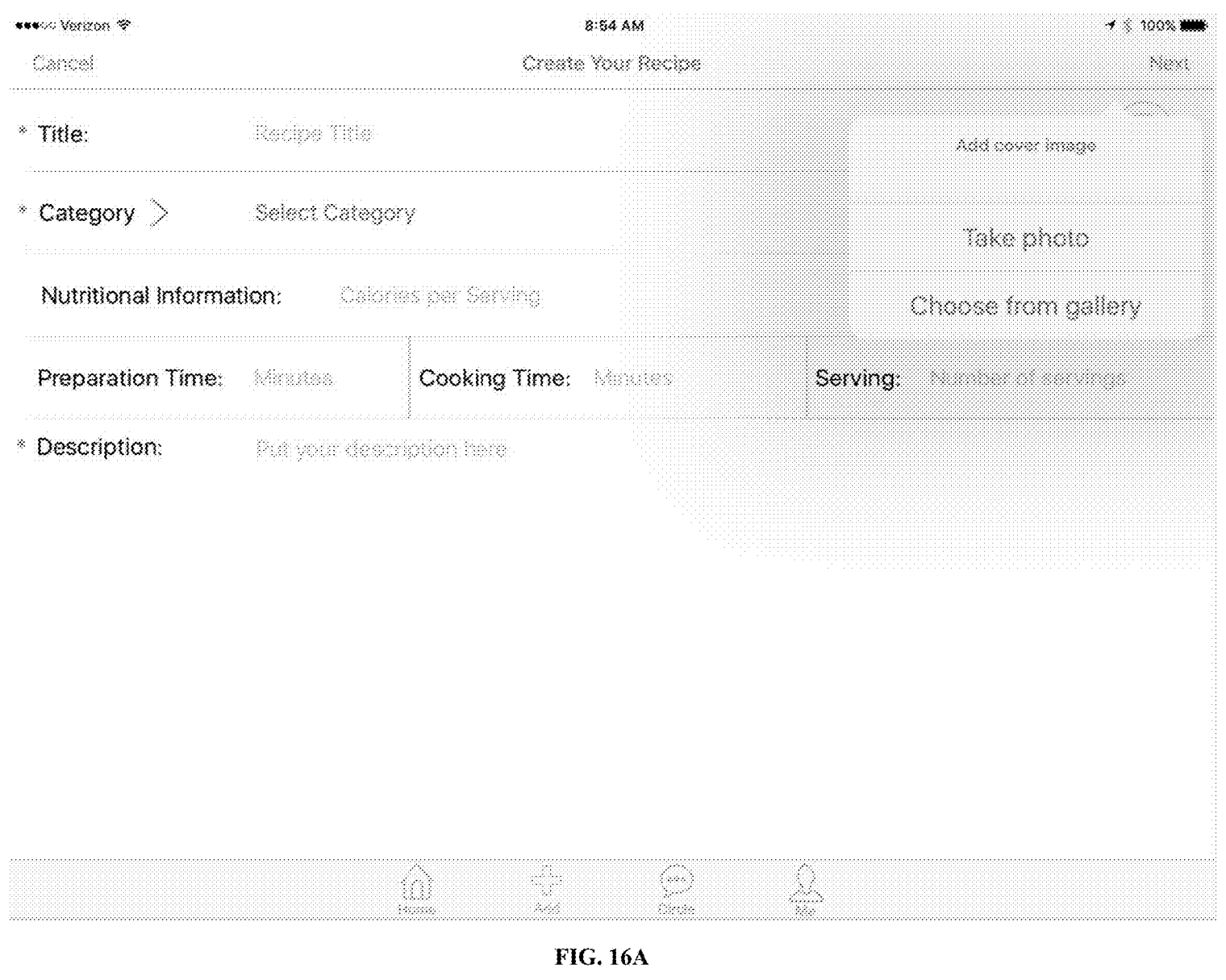

At 306, a user is presented with an interface to enter recipe information metadata, such as the recipe title, category, description, preparation time, cooking time, nutritional information, and servings at 308. For example, referring to FIGS. 16A-16B, screenshots of a recipe creation interface for a user experience device on a social networking system are depicted, according to an embodiment. The fields provided in FIG. 16A have been populated by a user in FIG. 16B. The metadata entered in the recipe creation interface of FIG. 6B can be used to classify and populate the recipe throughout the social networking system. Accordingly, by allowing the user control over the metadata entries, the user has control over the internal classifications of the recipe compared to existing technologies, which typically rely on an automated parser that can often misclassify or misinterpret recipe data.

At 310, a check of required fields is conducted and validated for the recipe information metadata. If the required fields validation check 310 fails, method 300 returns to the metadata entry screens of FIGS. 16A-16B.

At 312, if the required fields validation check 310 passes, method 300 receives a user selection indicating he has finished entering recipe information metadata. In FIG. 16B, the user can select "Next Step."

Figure 17:
FIG. 17 is a screenshot of an ingredient entry interface for a user experience device on a social networking system, according to an embodiment.

At 314, the user is presented with an interface to enter ingredients for the recipe. For example, referring to FIG. 17, a screenshot of an ingredient entry interface for a user experience device on a social networking system is depicted, according to an embodiment. In an embodiment, a user is presented with a unit converter to easily translate metric units to "American" units, and vice versa.

Figure 18:
FIG. 18 is a screenshot of a photo selection interface for individual ingredients for a user experience device on a social networking system, according to an embodiment.

At 316, the user is further presented with an interface to add a picture or photo of the ingredient. For example, referring to FIG. 18, a screenshot of a photo selection interface for individual ingredients for a user experience device on a social networking system is depicted, according to an embodiment. A photo for any or all ingredients can be added from by using the camera or an already-existing picture on the device gallery.

Figure 19:
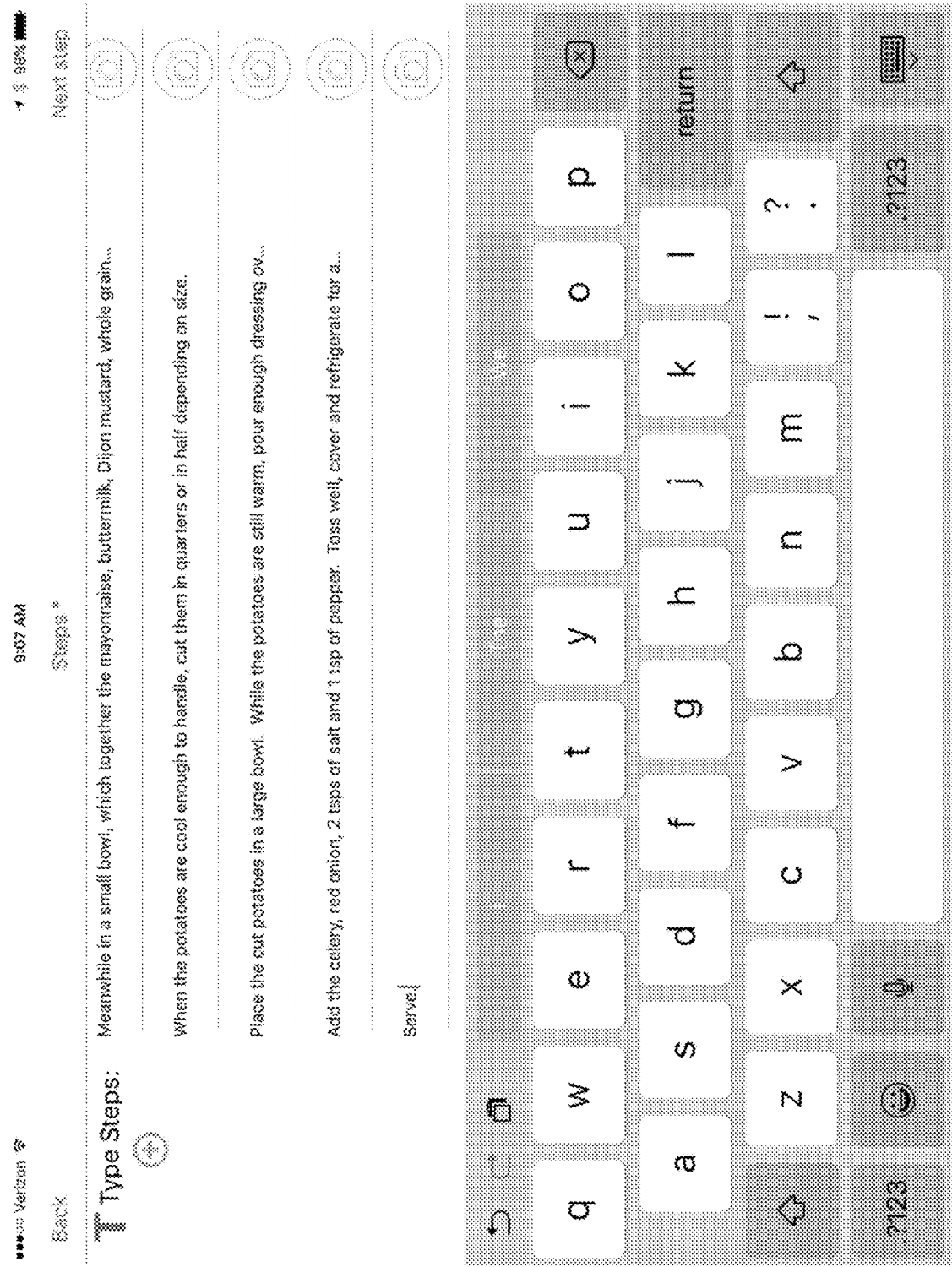
FIG. 19 is a screenshot of a virtual keyboard and recipe instruction steps for a user experience device on a social networking system, according to an embodiment.

At 318, the user is presented an interface to enter the recipe instruction steps. For example, referring to FIG. 19, a screenshot of a virtual keyboard and recipe instruction steps for a user experience device on a social networking system is depicted, according to an embodiment.

At 320, the user is further presented with an interface to add a picture or photo of each of the recipe instruction steps. For example, referring to FIG. 20, a screenshot of a photo selection interface for individual instructions steps for a user experience device on a social networking system is depicted, according to an embodiment. A photo for any or all instructions steps can be added from by using the camera or an already-existing picture on the device gallery.

Figure 20:
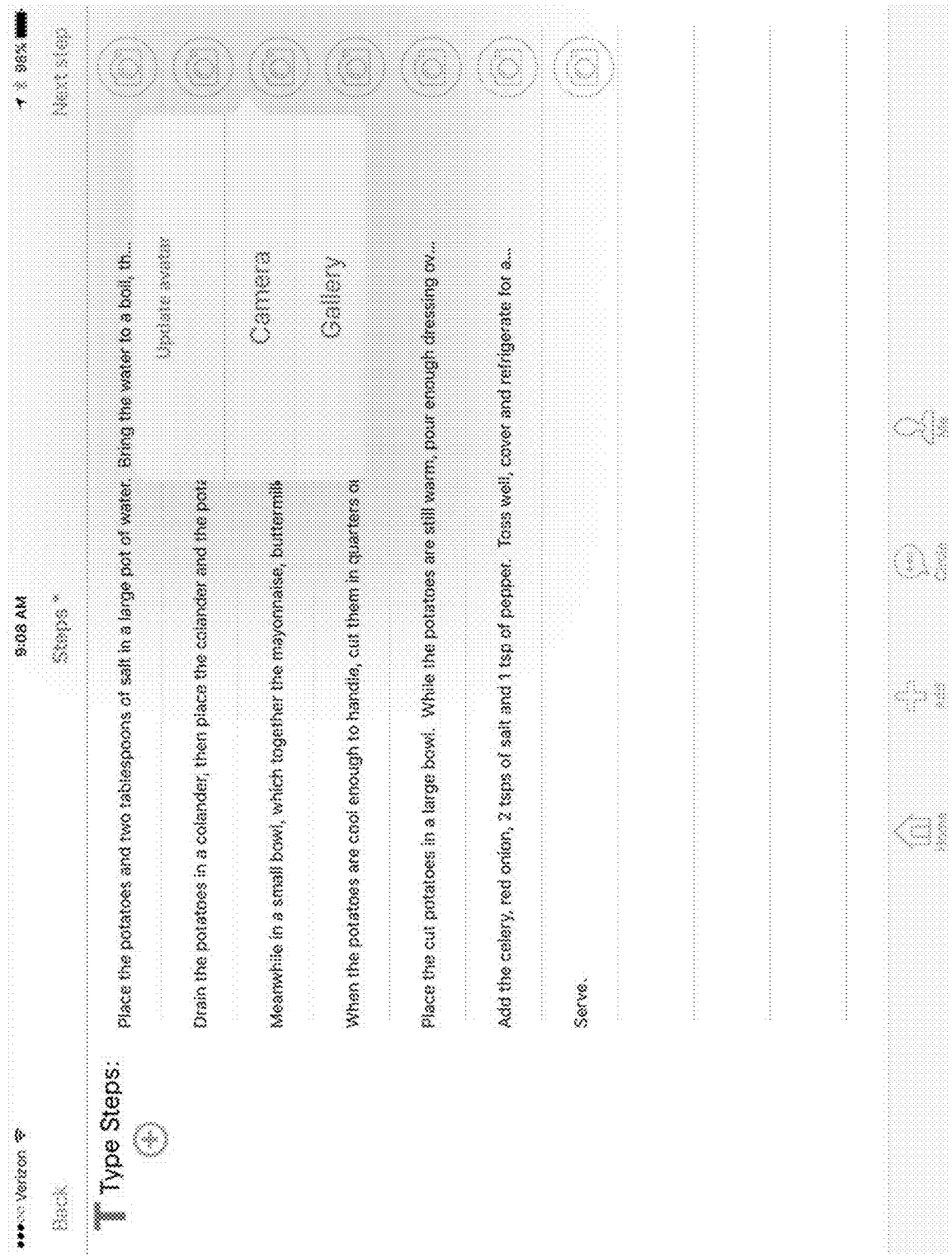
FIG. 20, a screenshot of a photo selection interface for individual instructions steps for a user experience device on a social networking system, according to an embodiment.

At 322, method 300 receives a user selection indicating he has finished entering recipe ingredients and instructions steps. In FIG. 20, the user can select "Next Step."

At 324, the user is presented a summary of the steps and any photos of the steps he has entered. For example, referring to FIG. 21, a screenshot of a recipe summary for a user experience device on a social networking system is depicted, according to an embodiment.

At 326, method 300 receives a user selection indicating he has finished reviewing the recipe summary. In FIG. 21, the user can select "Next Step." In an embodiment, a user is presented a preview of the recipe (which can be edited) before it is published.

Figure 22A:
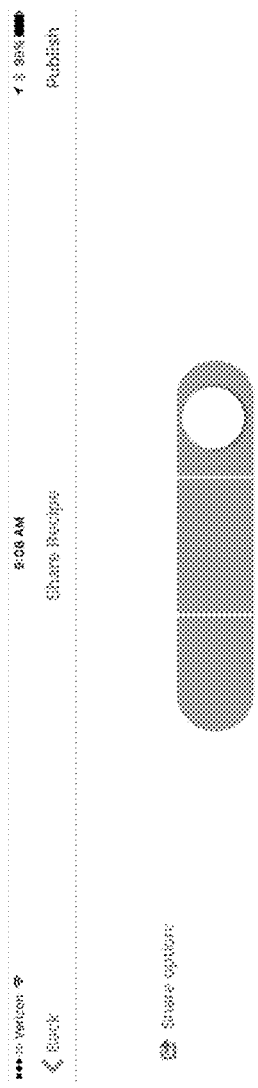
FIGS. 22A-22C are screenshots of publication options for a recipe entered with a user experience device on a social networking system, according to an embodiment.
Figure 22B:
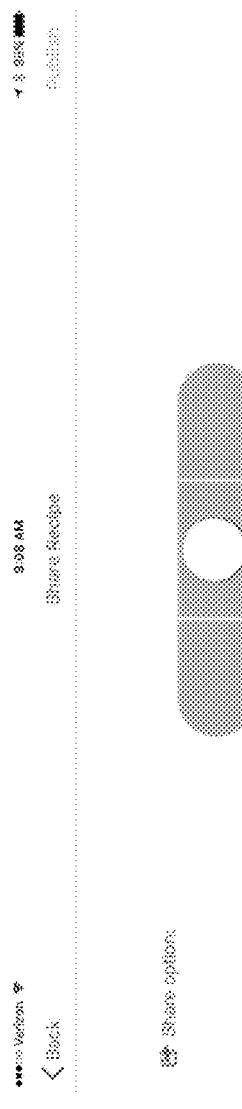
Figure 22C:
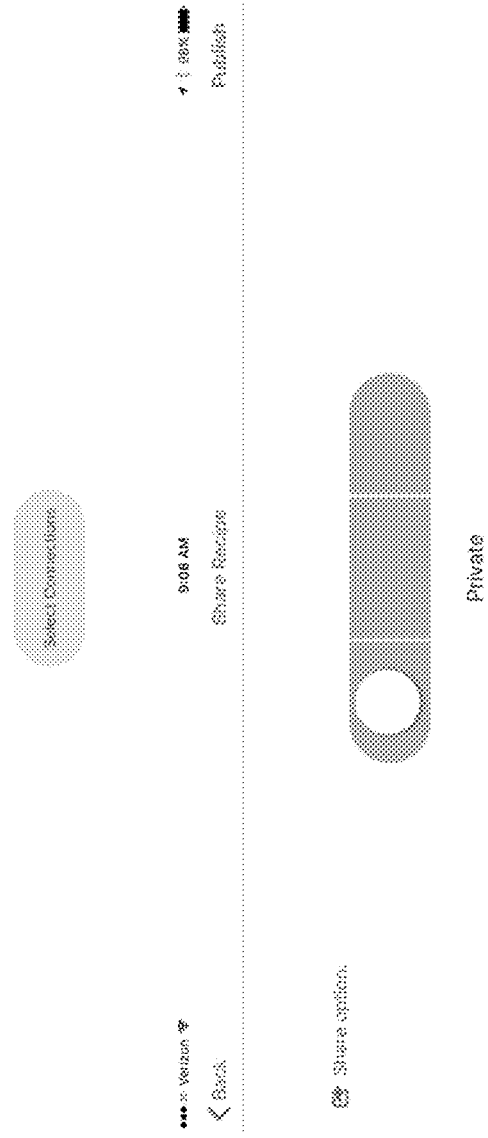

At 328, the user is presented publication options for the recipe he has just entered. For example, referring to FIGS. 22A-22C, screenshots of publication options for the recipe entered with a user experience device on a social networking system are depicted, according to an embodiment. In FIG. 22A, the user is able to manipulate a slider bar to indicate the recipe is to be made public, or be published to all users. In FIG. 22B, the user is able to manipulate a slider bar to indicate the recipe is to be published to certain connections (groups or friends). The user is further presented the option to select those connections or groups of connections. In FIG. 22C, the user is presented the option to make the recipe private so that only the user who has entered the recipe can view the recipe. The content shared according to the publication options at 328 is accordingly viewable by other users in one of the public or personalized activity streams, referring to FIGS. 6-7. Further, the ability to make recipes private allows the flexibility for users to have a single repository for all recipes and choose with whom those recipes are shared (if any). Recipe content can be posted to one or more friends, circles, or all users (public). A recipe can be marked "private" so it the content-level security ensures no access or viewing by other users.

Figure 23:
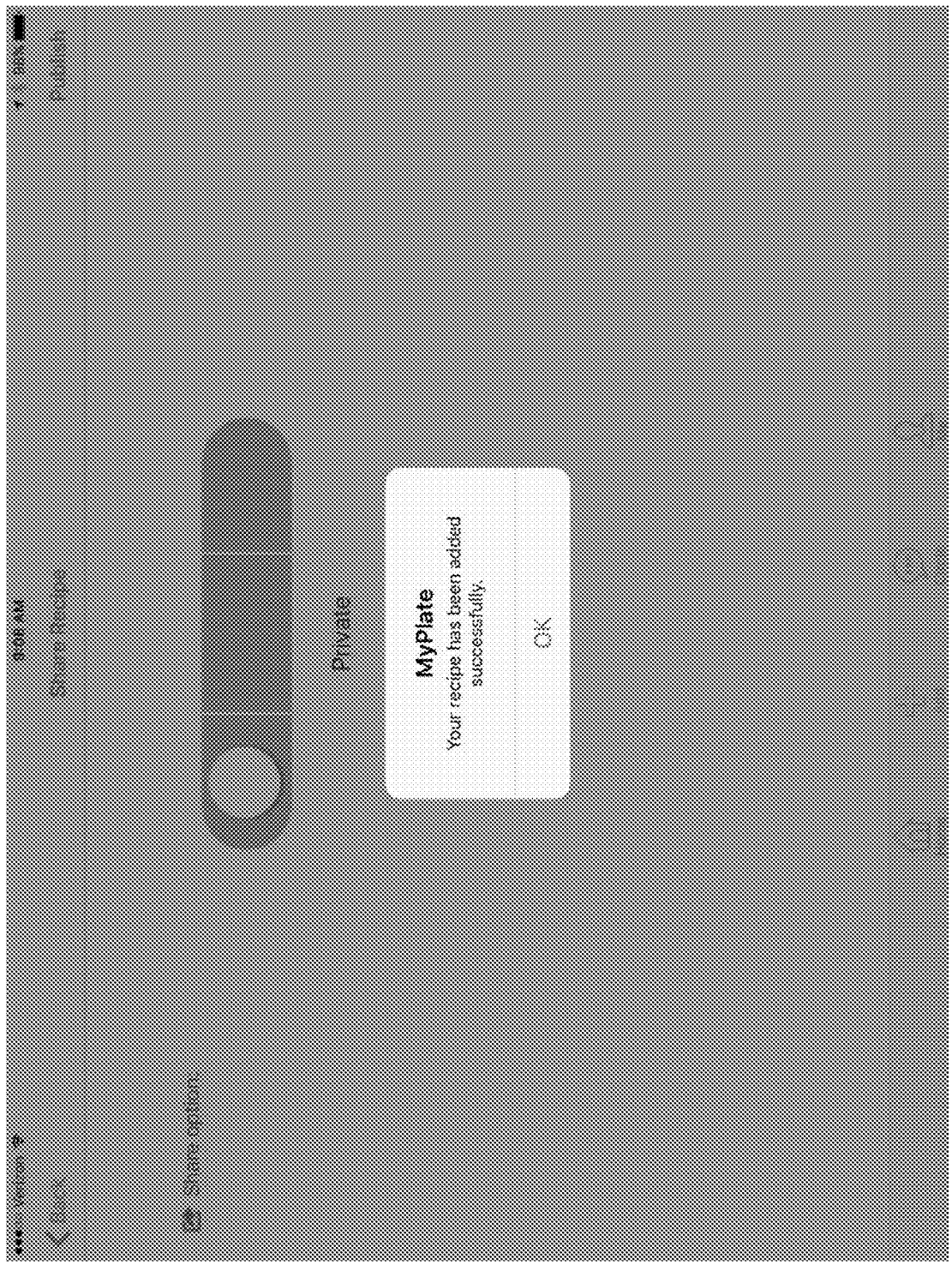
FIG. 23 is a screenshot of a recipe saved prompt for a user experience device on a social networking system, according to an embodiment.

At 330, the user is presented a prompt indicating that the recipe has been successfully added to server 104. For example, referring to FIG. 23, a screenshot of a recipe saved prompt for a user experience device on a social networking system is depicted, according to an embodiment.

Accordingly, content engine 122 can import the data received from the user and store the data in database 114. In an embodiment, a markup language can be utilized for recipe importing. For example, an enhanced XML template can be utilized to handle each user entry of the various ingredients and instruction steps. In embodiments, each ingredient and each direction step is stored as a separate XML element, which in turn is stored as a separate database entry. This contrasts with traditional solutions which typically have a single field for all ingredients and a single field for all direction steps. Accordingly, the recipe can be displayed to other users of the system at varying levels of granularity, in contrast to the coarse display of traditional solutions. Further, such refined fields can also be advantageous in database storage. Because of the smaller storage required for each field, a single recipe can be stored across multiple distributed components, wherein a single component individually may not be able to store the entire recipe, or if it would be advantageous (e.g. more efficient) to store portions of the recipe on a different component.

Figure 24:
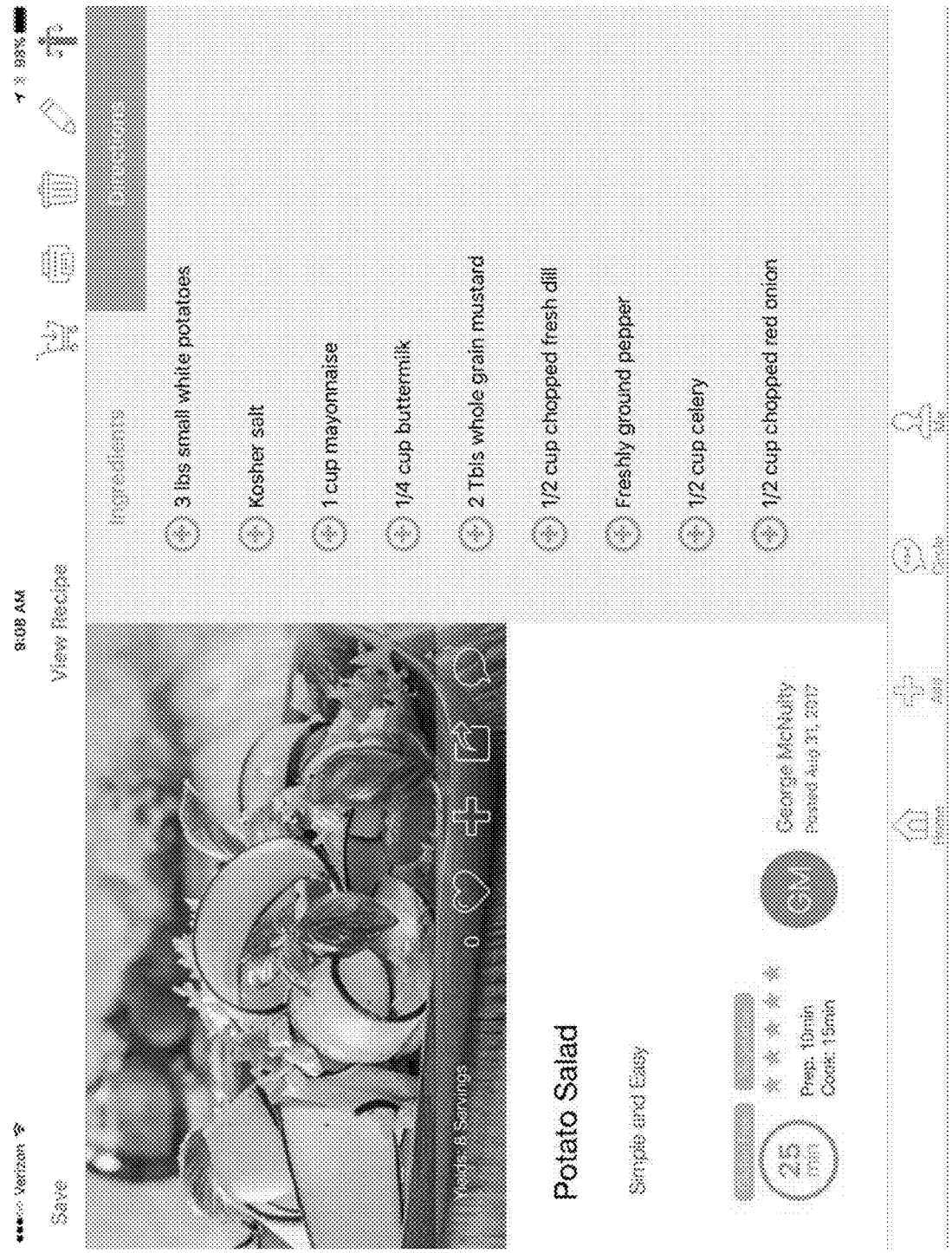
FIG. 24 is a screenshot of a recipe viewed on a user experience device on a social networking system, according to an embodiment.

At 332, the user is presented with the completed recipe entry. For example, referring to FIG. 24, a screenshot of a recipe viewed on a user experience device on a social networking system is depicted, according to an embodiment. In embodiments, if the user cancels the "add recipe" workflow at any time, the system does not save partially-entered content. Rather, the system deletes the recipe instance and any data for that instance. In embodiments, the user can view the entire recipe and subsequently delete a step. Step deletion can likewise be conducted during the entering of steps, as well.

Accordingly, method 300 is tailored to the individual user experience device 102 and its functionality. For example, if the particular user experience device 102 does not allow photo storage or does not have a camera, no photo selection interface is presented, thereby streamlining the recipe entry process. Similarly, the graphical user interface is configured to dynamically relocate textual information of the underlying window to become automatically viewable to the user according to the particular user experience device. For example, referring to FIG. 19, in order to present the virtual keyboard, the entry being modified is positioned on the screen above the keyboard so that both the keyboard and the entered text are viewable to the user. In embodiments of devices where screen space is limited, this type of entry is valuable so the user does not need to pop up the keyboard and then scroll to the entry. Likewise, when the user adds a step, the entire list of previously-entered steps is positioned so the keyboard and new step are visible together.

In an embodiment, the user is presented data in an easily-viewed vertical scrolling format instead of a horizontal scrolling format. In embodiments, a user can select and toggle between horizontal and vertical scrolling. Accordingly, the graphical user interface must be structured to be limited to only the screen width of a user's particular device. Further, when adding a recipe, the user can resize a picture to fit the format of the user interface or content-specific field.

In one embodiment, all posts and recipes are presented as a single group without any subcategories. In such embodiments, the screen on a user device is formatted for vertical scrolling.

In embodiments, adding or editing a step can be by a user posting a picture or video with data entry by automated speech recognition and/or character recognition. For example, a handwritten recipe can be "read" by character recognition to convert the recipe to digital recipe data.

Figure 25:
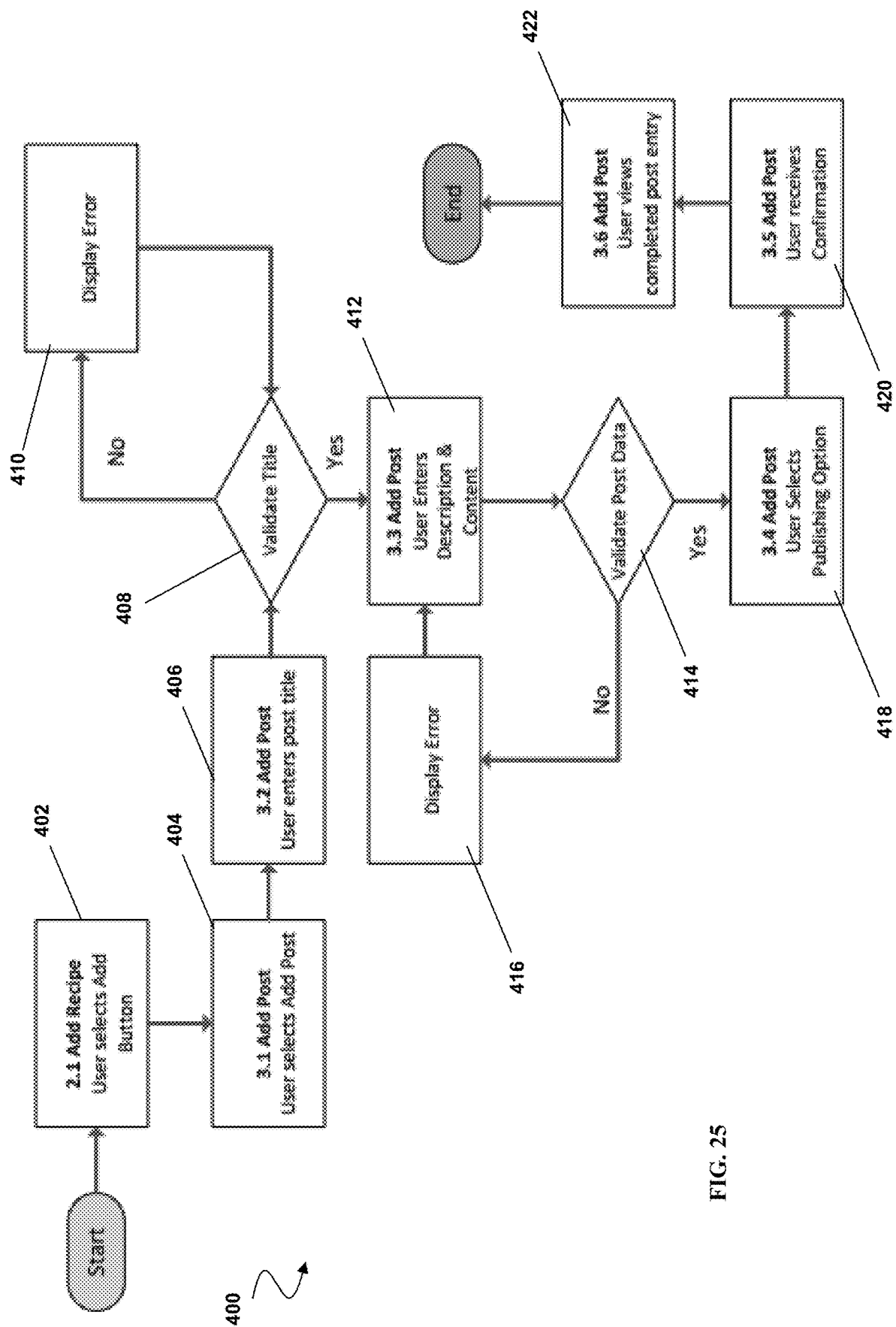
FIG. 25 is a flowchart of a method for adding a post on a social networking system, according to an embodiment.

Referring to FIG. 25, a flowchart of a method 400 for adding a post on a social networking system is depicted, according to an embodiment. A post can be published to all users of the system or a subset of users, which can be specified by the posting user. Method 400 can be implemented by, for example, content engine 122. Non-recipe content can be posted to one or more friends, circles, or all users (public)

At 402, referring again to FIG. 14, a user interfaces with a user experience device, such as user experience device 102a, to select "Add" icon 350.

At 404, referring again to FIG. 15, content engine 122 receives a selection of post content by a user tapping, clicking, or otherwise selecting post content 354 (non-recipe content).

Figure 26:
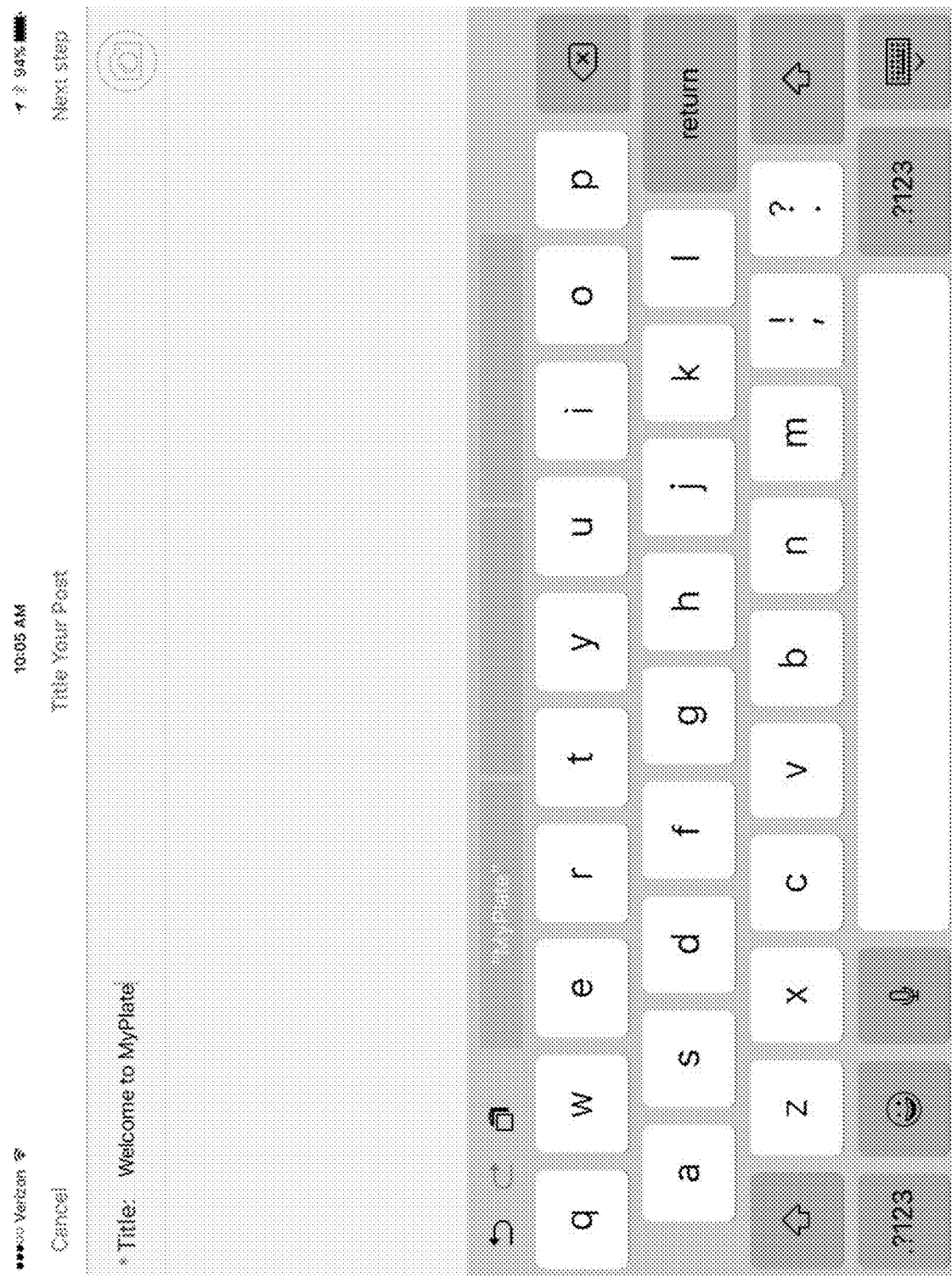
FIG. 26 is a screenshot of a post title interface for a user experience device on a social networking system, according to an embodiment.

At 406, a user is presented with an interface to enter a post title. For example, referring to FIG. 26, a screenshot of a post title interface for a user experience device on a social networking system is depicted, according to an embodiment. The user can enter a desired post title via the interface.

At 408, the post title is validated by content engine 122. If the post title is not allowed based on a set of predetermined criteria (e.g. length, appropriateness, descriptiveness), an error is displayed at 410 and method 400 returns to 406.

Figure 27:
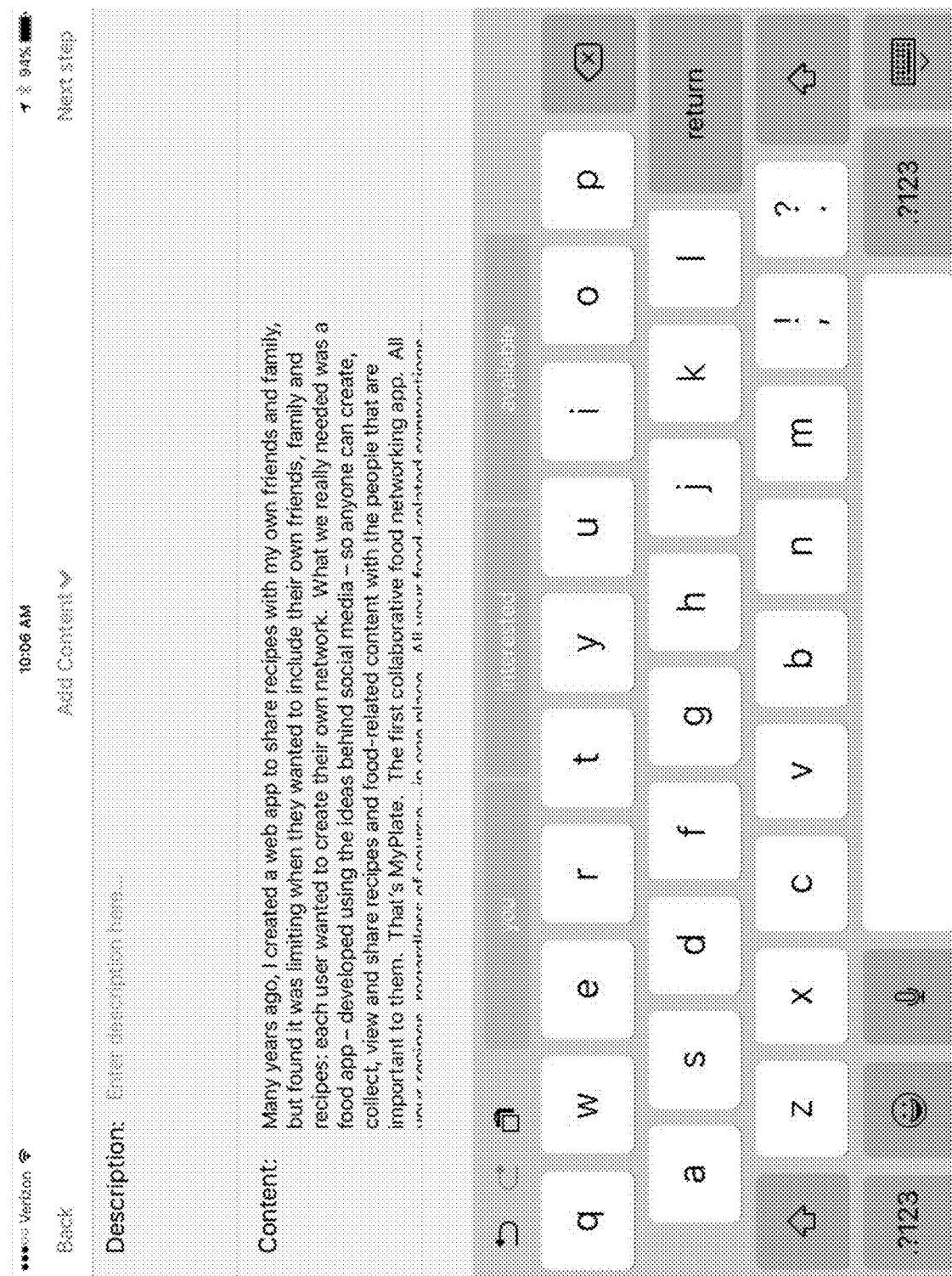
FIG. 27 is a screenshot of a post content interface for a user experience device on a social networking system, according to an embodiment.

At 412, a content interface for the post titled at 406 is presented to the user. For example, referring to FIG. 27, a screenshot of a post content interface for a user experience device on a social networking system is depicted, according to an embodiment. The user can use a virtual keyboard to enter text or images for the post.

At 414, the post content data is validated by content engine 122. If the post content is not allowed based on a set of predetermined criteria (e.g. length, appropriateness, descriptiveness), an error is displayed at 416 and method 400 returns to 412.

At 418, the user is presented publication options for the post he has just entered. For example, referring to FIGS. 28A-28B, screenshots of publication options for the post entered with a user experience device on a social networking system are depicted, according to an embodiment. In FIG. 28A, the user is able to manipulate a slider bar to indicate the recipe is to be made public, or be published to all users. In FIG. 28B, the user is able to manipulate a slider bar to indicate the recipe is to be published to certain connections (groups or friends). The user is further presented the option to select those connections or groups of connections. In an embodiment, a user is presented a preview of the post (which can be edited) before it is published.

Figure 29:
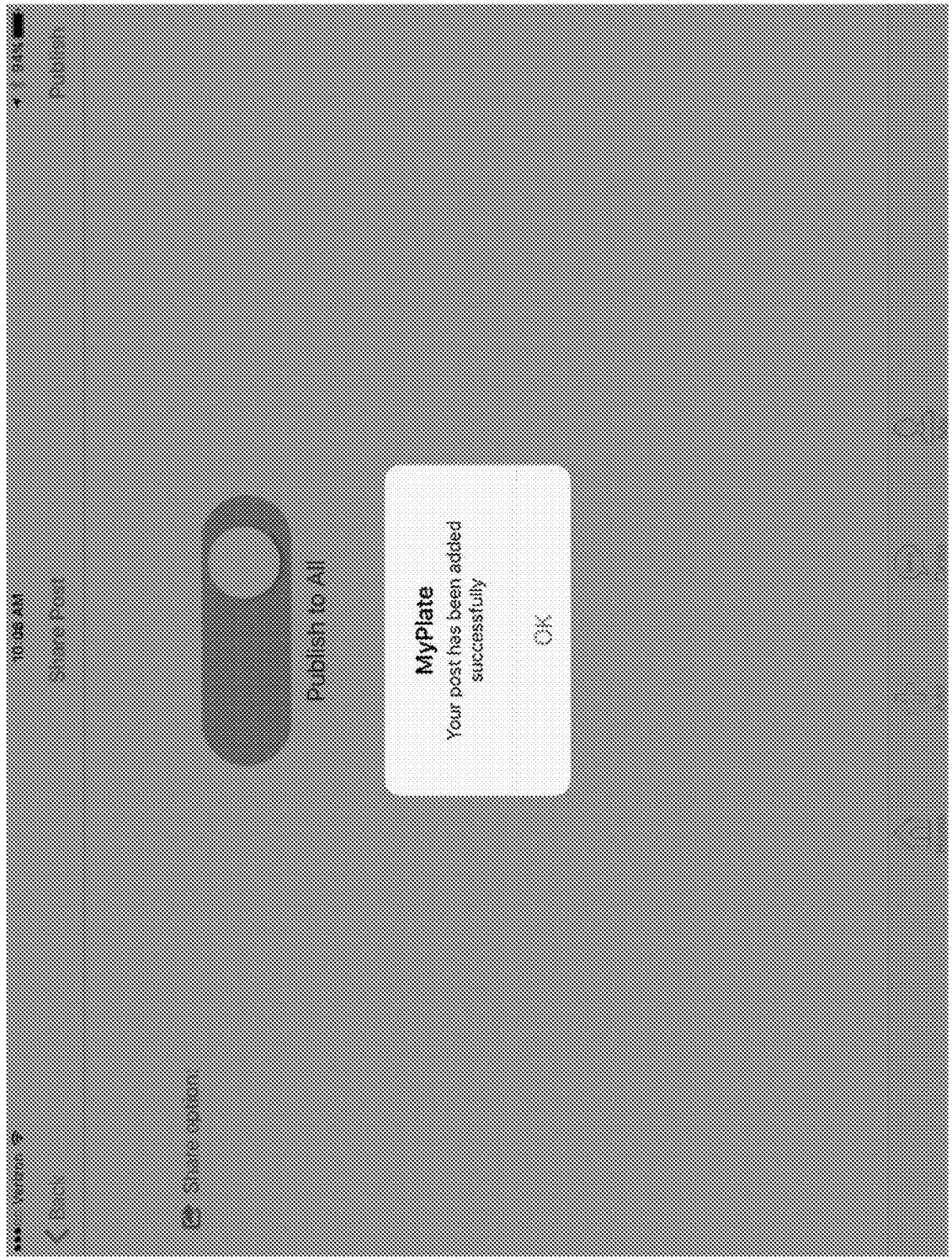
FIG. 29 is a screenshot of a post saved prompt for a user experience device on a social networking system, according to an embodiment.

At 420, the user is presented a prompt indicating that the post has been successfully added to server 104. For example, referring to FIG. 29, a screenshot of a post saved prompt for a user experience device on a social networking system is depicted, according to an embodiment. On server 104, the post data can be saved to database 114.

Figure 30:
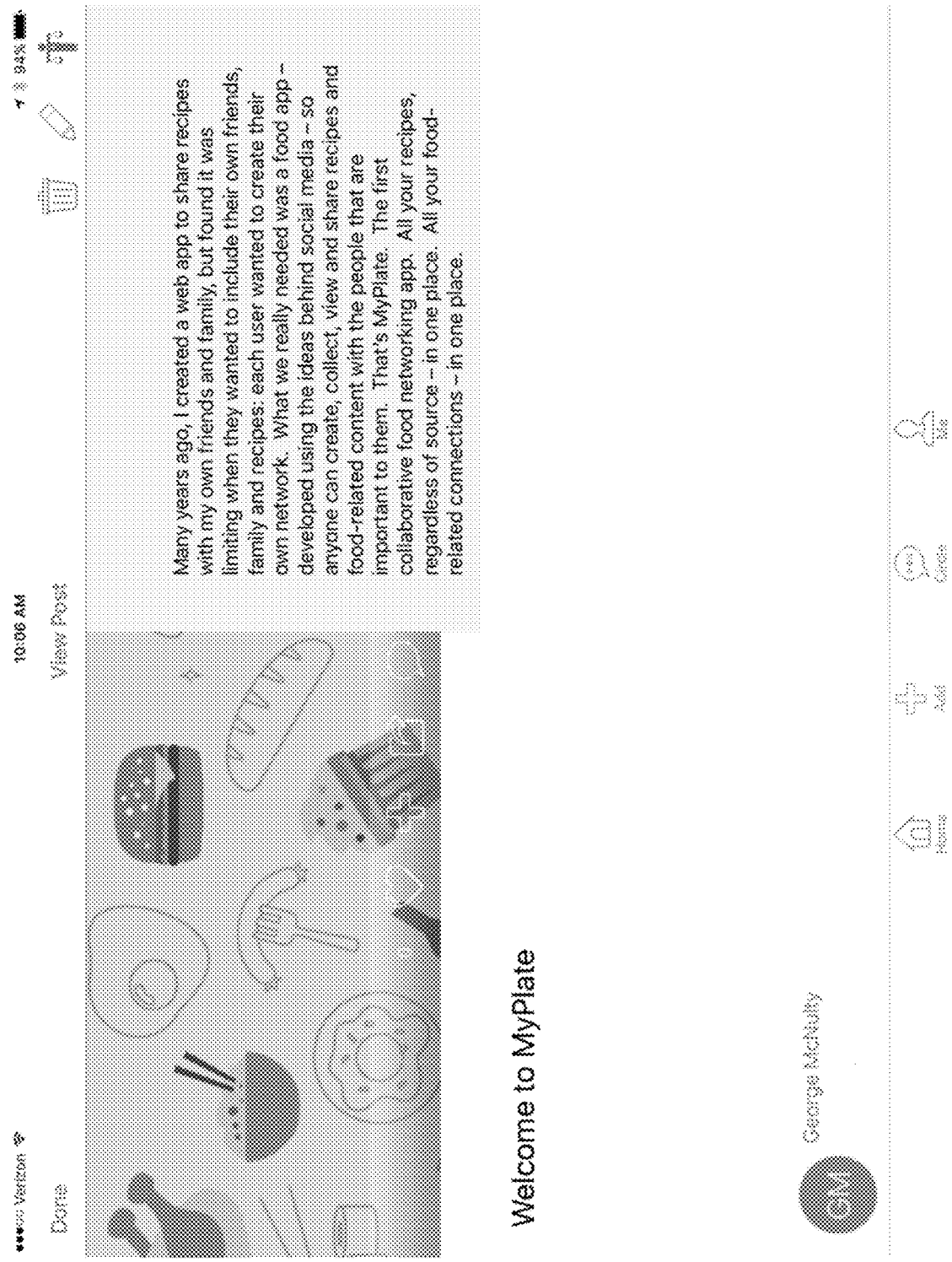
FIG. 30 is a post viewed on a user experience device on a social networking system, according to an embodiment.

At 422, the user is presented with the saved post. For example, referring to FIG. 30, a screenshot of a post viewed on a user experience device on a social networking system is depicted, according to an embodiment.

When viewing or publishing a recipe or post, a user can direct the recipe or post at another user for pushing to that user (such as via the user's personalized activity stream). In embodiments, a user can delete his previous posts, as well. In an embodiment, when a user edits a recipe or post, he is presented the option to re-share or re-push that data so other users can be re-notified that something in the recipe or post has been updated.

In embodiments, a user can accumulate points or status indication markers to reflect the level of activity of the user. In an embodiment, a user can receive special gifts or additional functionality for reaching specific milestones.

Figure 31:
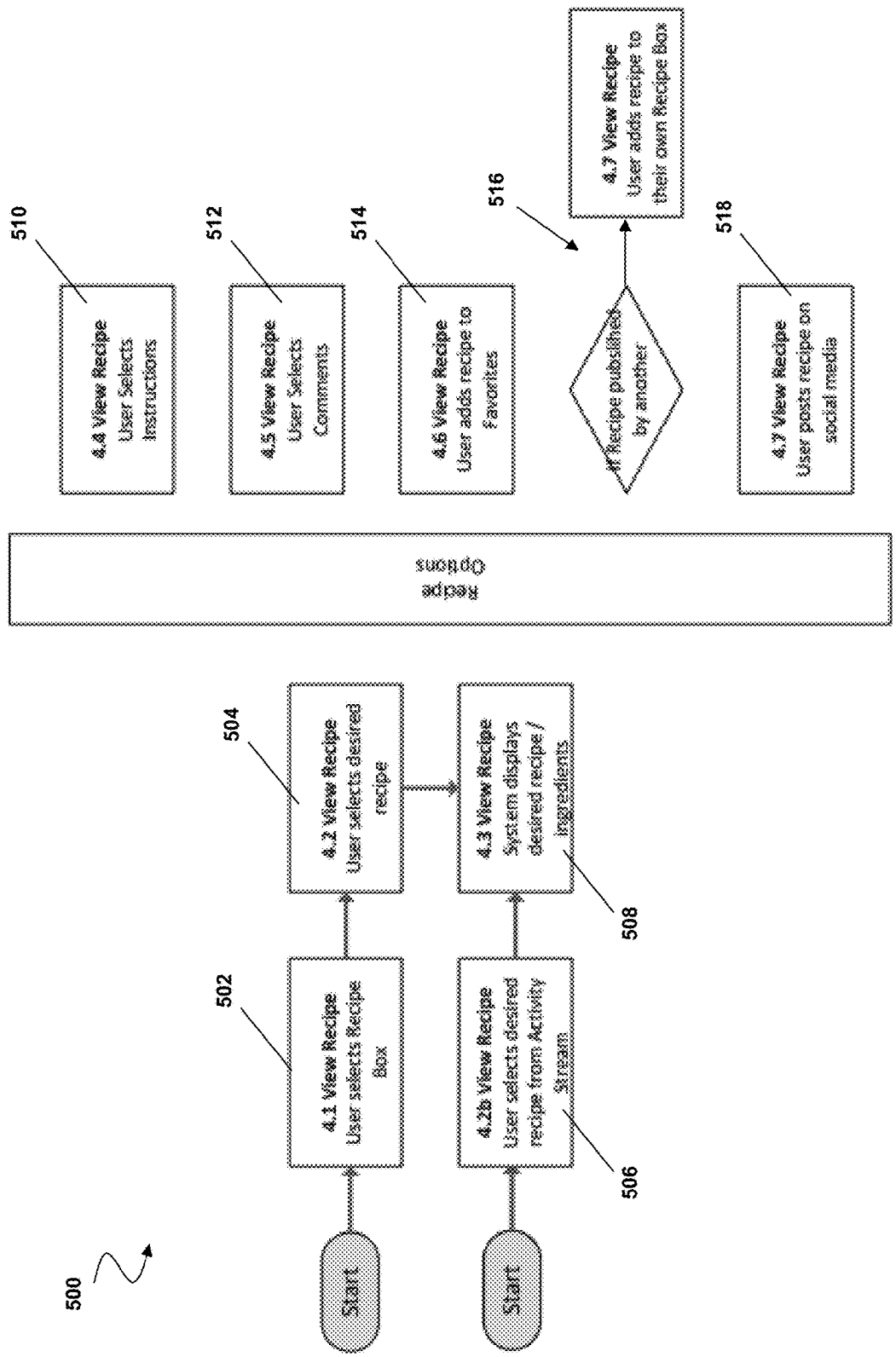
FIG. 31 is a flowchart of a method for viewing a recipe on a user experience device on a social networking system, according to an embodiment.

Referring to FIG. 31, a flowchart of a method 500 for viewing a recipe on a social networking system is depicted, according to an embodiment. Method 500 can be implemented by, for example, content engine 122.

Figure 32:
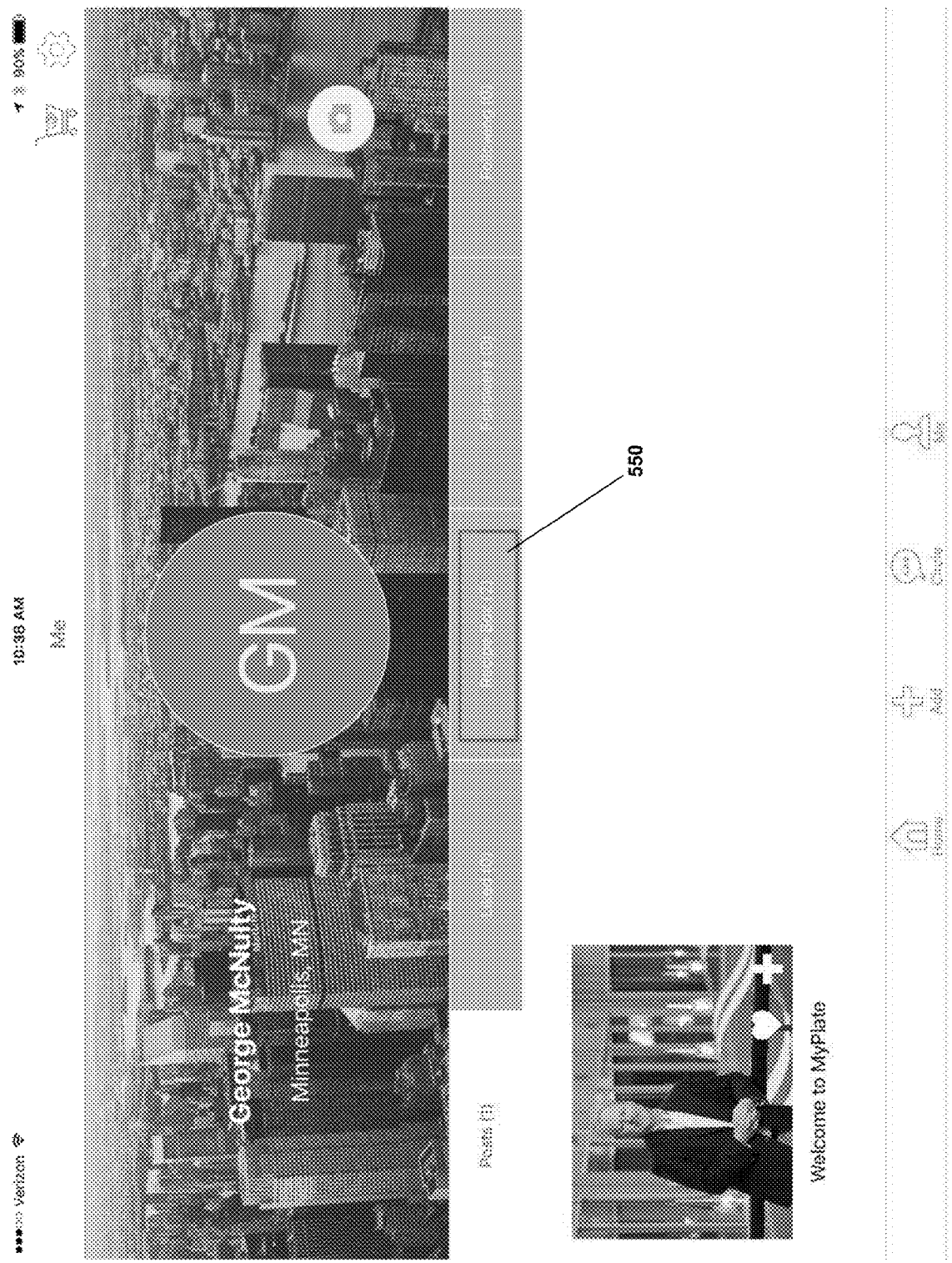
FIG. 32 is a screenshot of a personalized interface for a user on a user experience device on a social networking system, according to an embodiment.
Figure 33:
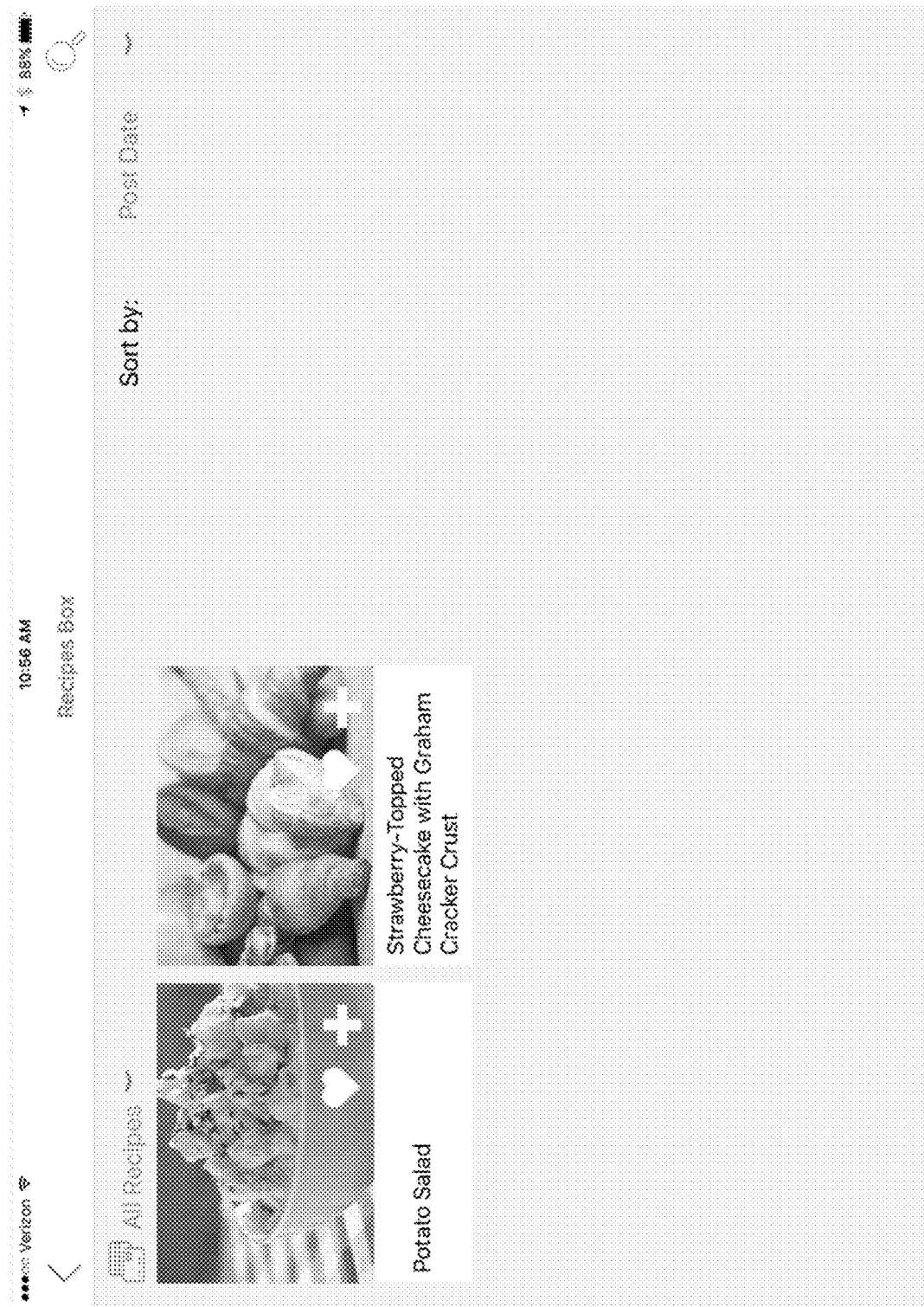
FIG. 33 is a screenshot of a recipe box on a user experience device on a social networking system, according to an embodiment.

At 502, a user is presented with an interface to navigate to his personalized recipe box. For example, referring to FIG. 32, a screenshot of a personalized interface for a user on a user experience device on a social networking system is depicted, according to an embodiment. The personalized interface allows a user to select his recipe box 550. The recipe box comprises an interface "holding" all of a user's recipes. Effectively, the recipe box acts as a repository for storing recipe objects. On server 104, the recipe box comprises storage particular to the individual user. For example, database 114 can be partitioned with segments for every user. In other embodiments, recipe box storage is distributed among several storage devices, wherein the storage unique to a particular user is referenced by a user ID or other unique user identifier. In embodiments, recipe box data can be transferred to local storage at log-off so recipe data is viewable offline from the social networking system At 504, once the user has accessed the recipe box interface, he is presented with an interactive interface of all of his saved recipes. For example, referring to FIG. 33, a screenshot of a recipe box on a user experience device on a social networking system is depicted, according to an embodiment. On server 104, storage unique to the particular user is accessed to populate the saved recipes.

Figure 34:
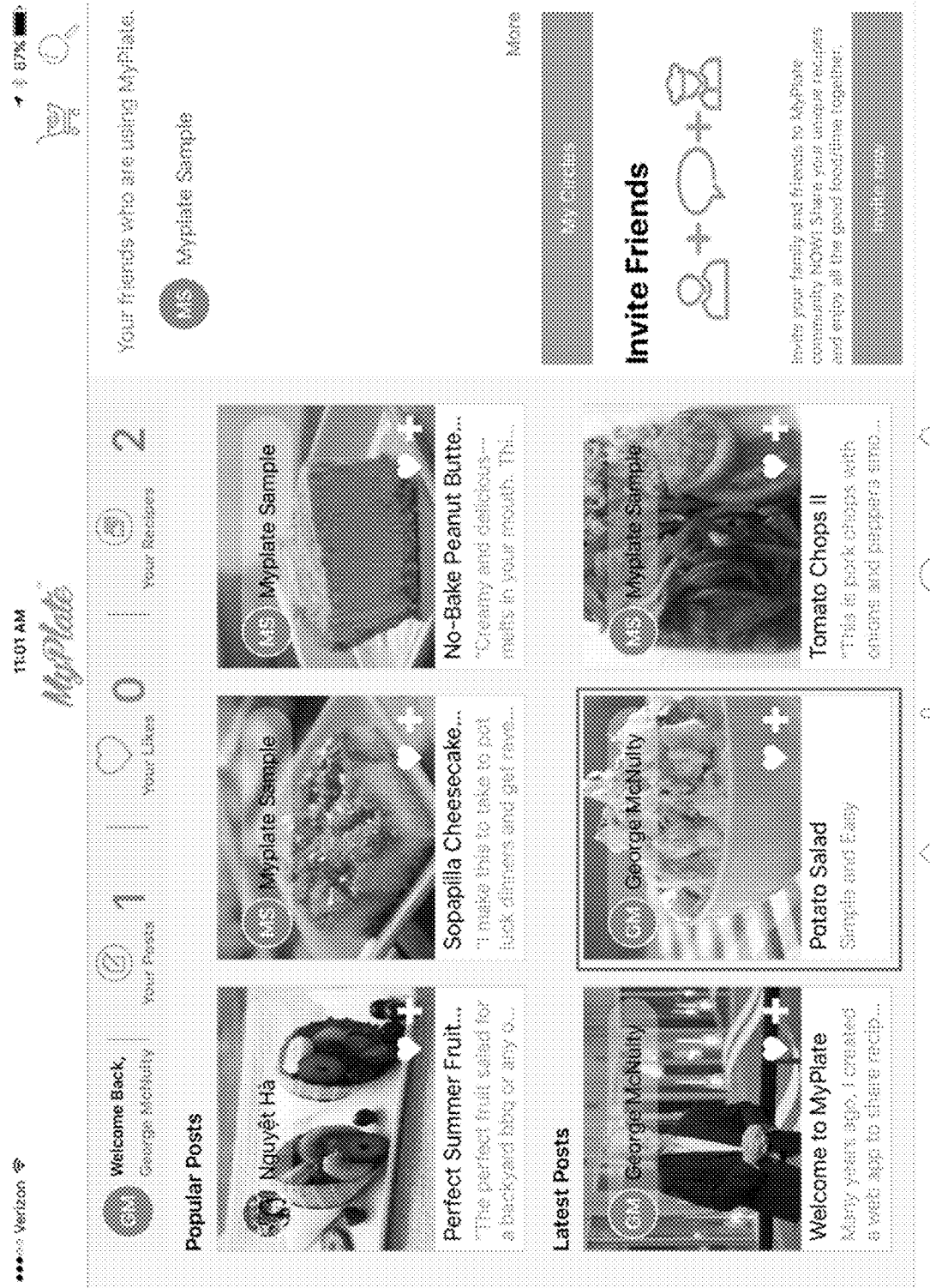
FIG. 34 is a screenshot of a personalized activity stream interface for a user for selecting a recipe on a user experience device on a social networking system, according to an embodiment.

At 506, a user can similarly be presented with recipe options to view. Instead of viewing via the recipe box, a user can be presented a personalized interface. For example, referring to FIG. 34, a screenshot of a personalized interface for a user for selecting a recipe on a user experience device on a social networking system is depicted, according to an embodiment. In embodiments, the personalized interface comprises an activity stream with popular posts on the social network system or the latest posts from within his circle. In an embodiment, recipe box 550 can further comprise a search function to search that user's recipe box storage for particular recipes, ingredients, cooking methods, etc. In an embodiment, the recipe box can be further organized by category, publishing date, publisher title, or title. Custom collections of recipes can be organized and given individual sub-groupings within a user's recipe box.

Figure 35:
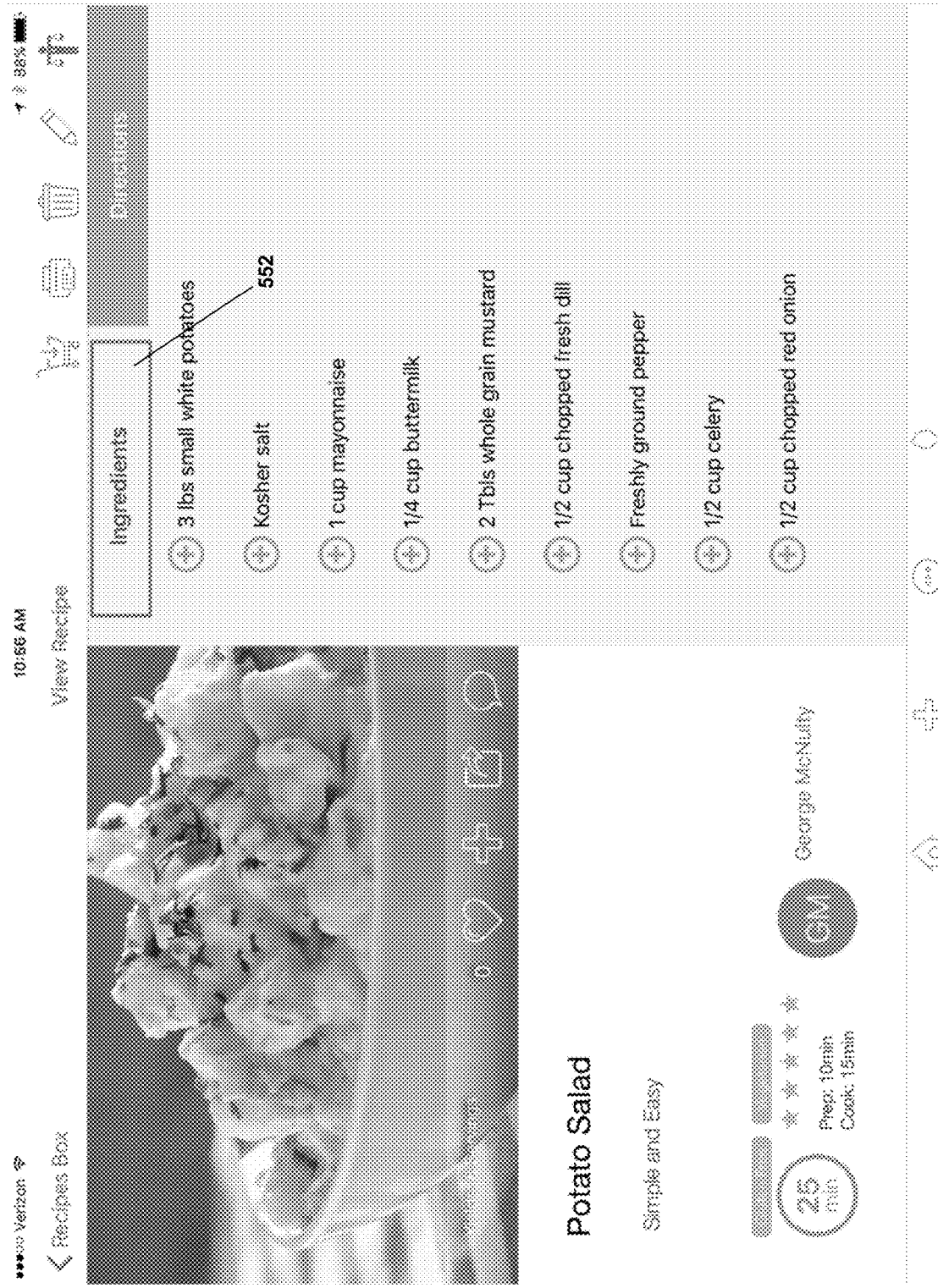
FIG. 35 is a screenshot of a recipe with recipe ingredients on a user experience device on a social networking system, according to an embodiment.

At 508, from either 504 or 506, a user can view recipe details after having selected a particular recipe. For example, referring to FIG. 35, a screenshot of a recipe with recipe ingredients on a user experience device on a social networking system is depicted, according to an embodiment. In embodiments, the "recipe ingredients" tab 554 is the default tab shown.

A number of recipe details or options can then be presented to the user via the graphical user interface. At 510, the user is presented with recipe detail selection options. For example, referring to FIG. 36, a screenshot of a recipe with recipe directions on a user experience device on a social networking system is depicted, according to an embodiment. The user can navigate to a "recipe directions" tab 556 to view the particular recipe directions.

Figure 37:
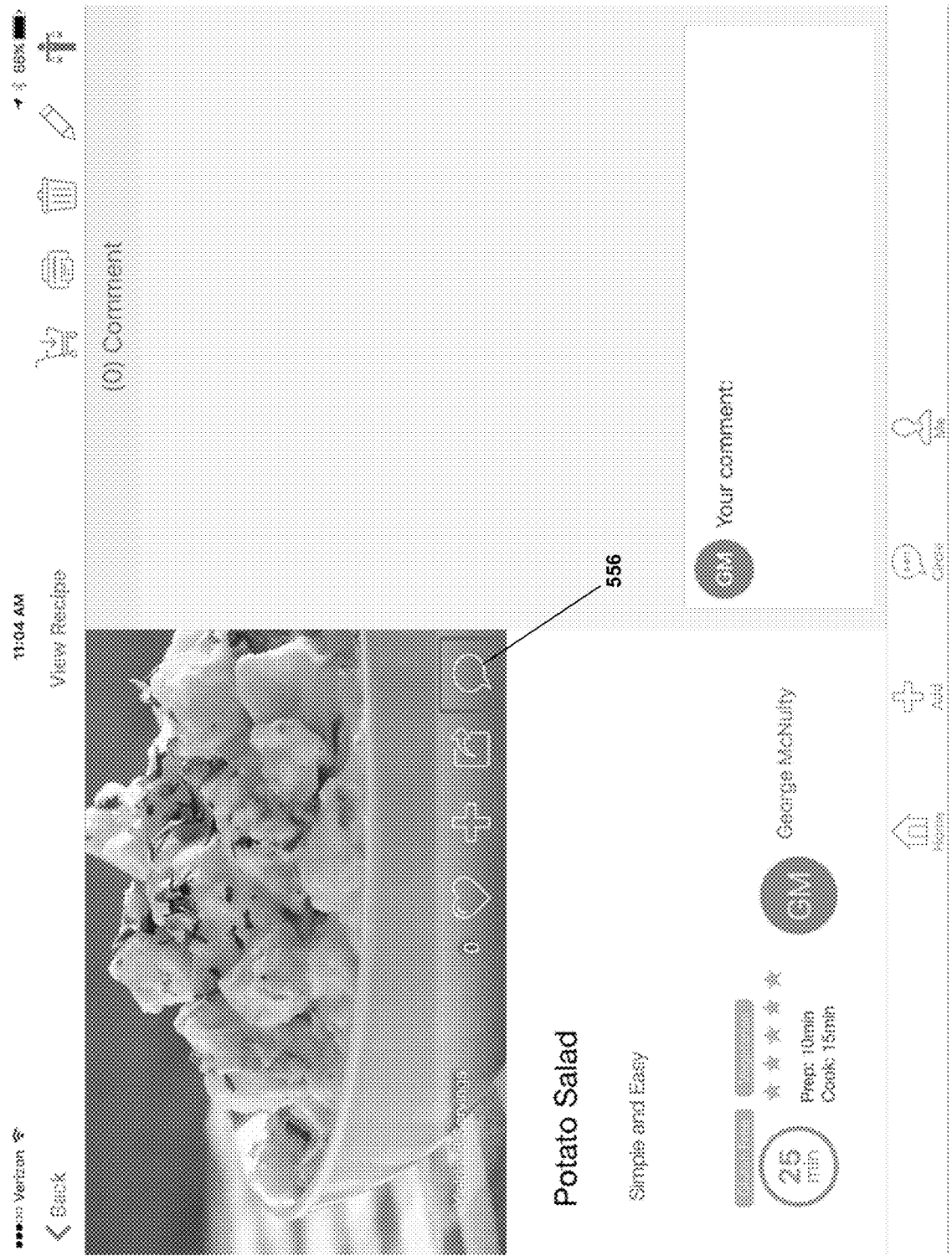
FIG. 37 is a screenshot of a recipe with recipe comments on a user experience device on a social networking system, according to an embodiment.

At 512, the user is presented with recipe comments. For example, referring to FIG. 37, a screenshot of a recipe with recipe comments on a user experience device on a social networking system is depicted, according to an embodiment. The user can select comments icon 552 to view comments made by other users on the particular recipe. In embodiments, users can delete comments so they are no longer viewed with the recipe.

Figure 38:
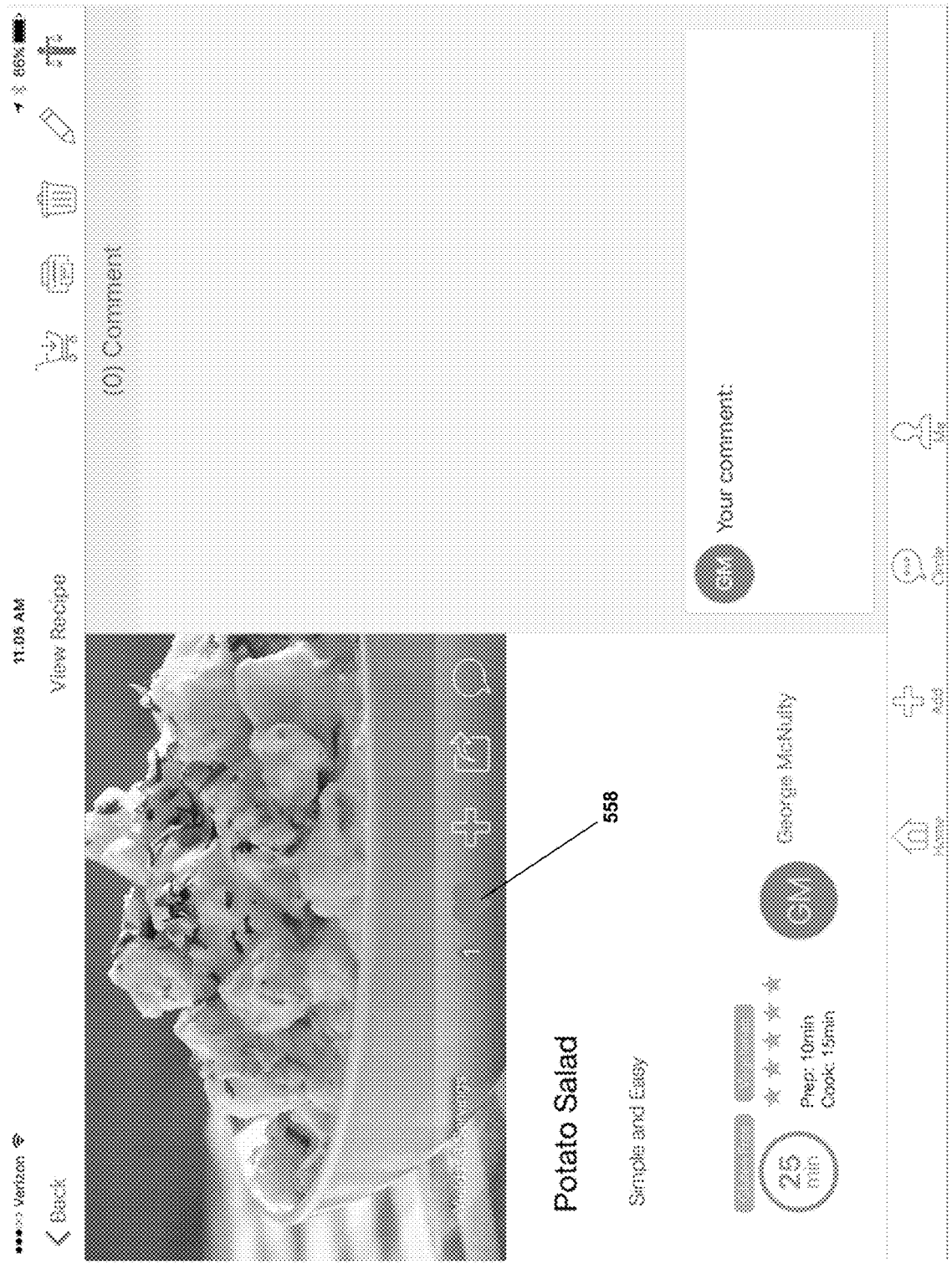
FIG. 38 is a screenshot of a recipe favorite option on a user experience device on a social networking system, according to an embodiment.

At 514, the user is presented other options, including the ability to add the recipe to his favorites. For example, referring to FIG. 38, a screenshot of a recipe with recipe favorite option on a user experience device on a social networking system is depicted, according to an embodiment. The user can choose to "favorite" the recipe by selecting favorites icon 558. The user can later filter by "favorited" content. In other embodiments, a user can rate a recipe based on a 1-5 star or other suitable rating. The system can aggregate the favorited and ratings data to adjust content displays (such as to the personalized activity stream).

Figure 39:
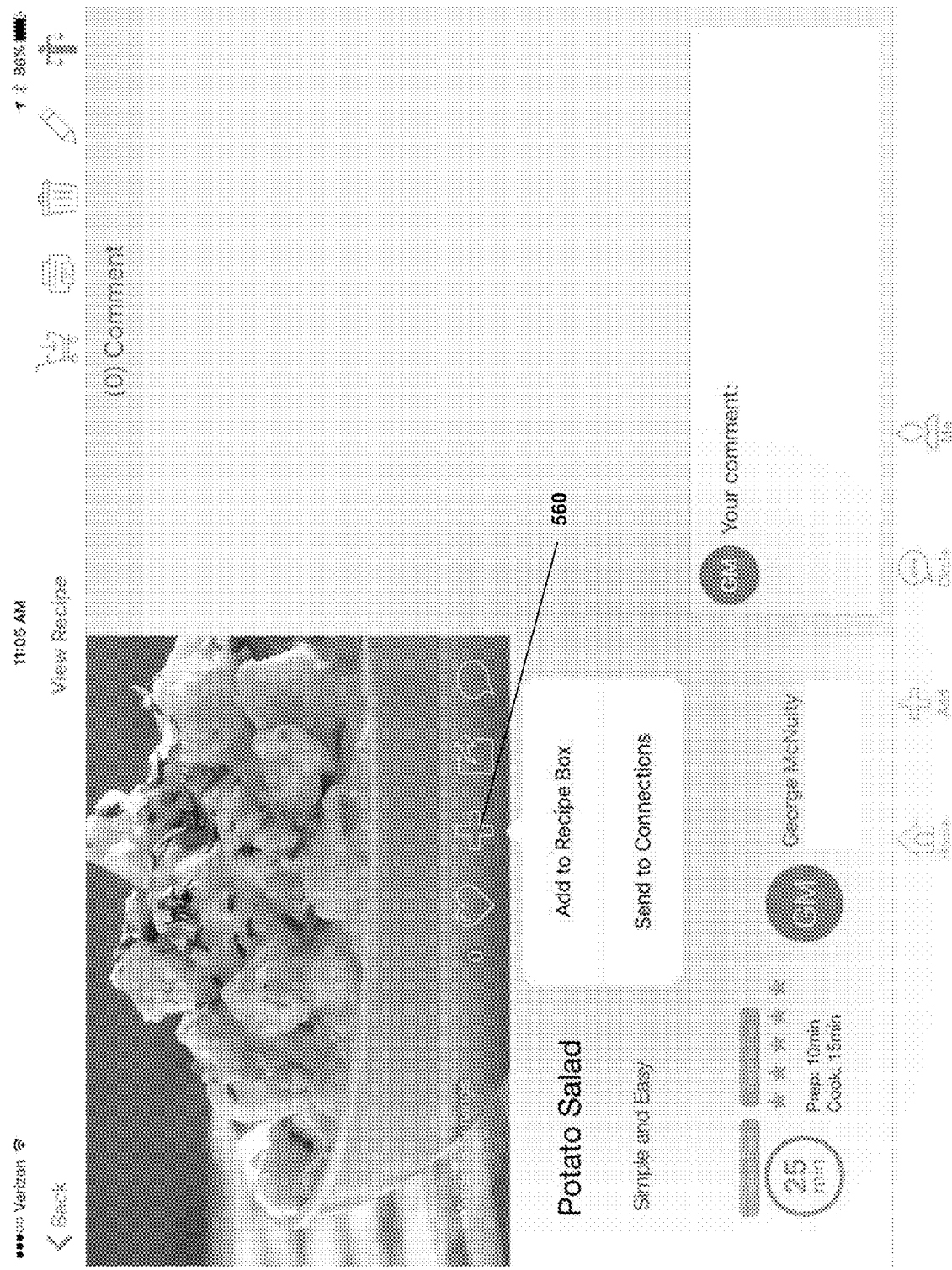
FIG. 39 is a screenshot of a recipe with sharing options presented on a user experience device on a social networking system, according to an embodiment.

At 516, if the recipe has been published by another user, the user can choose to add the recipe to his personalized recipe box. For example, referring to FIG. 39, a screenshot of a recipe with sharing options presented on a user experience device on a social networking system is depicted, according to an embodiment. By selecting "Add to Recipe Box," the user can choose to add the recipe to his personalized storage. In an embodiment, the recipe is tagged in database storage 114 with the user identifier to recall the recipe for that user. In another embodiment, a pointer to the recipe is saved in the storage partitioned for that individual user. In still other embodiments, the recipe data is copied to the storage for that individual user. In an embodiment, recipe data can be copied to network storage and local storage so recipes can be accessed by the user without a network connection.

Figure 40:
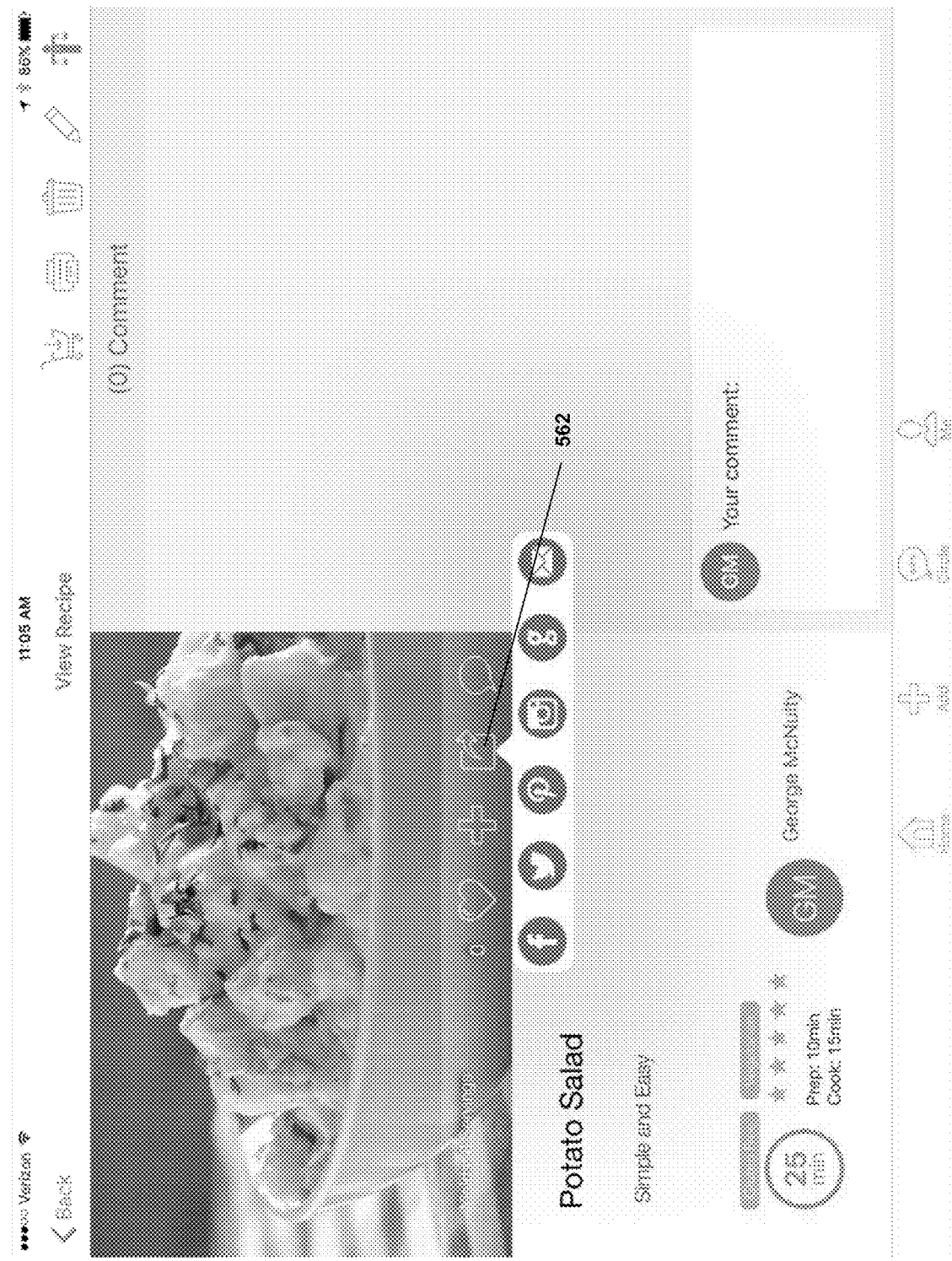
FIG. 40 is a screenshot of a recipe with external posting options presented on a user experience device on a social networking system, according to an embodiment.

At 518, the user is presented with external publishing options. For example, referring to FIG. 40, a screenshot of a recipe with external posting options presented on a user experience device on a social networking system is depicted, according to an embodiment. The user can select external posting options icon 562 to be presented options such as post to FACEBOOK, TWITTER, PINTEREST, INSTAGRAM, GOOGLE+, or email.

In certain embodiments, entire recipe boxes can be personalized for users other than the accessing user. For example, a user might create a recipe box existing entirely of "User A's Grandma's Recipes" that he can keep private or share with other users. This manner of partitioning allows users to memorialize certain collections of recipe objects. In other embodiments, recipes can be sorted by the source data of the recipe. For example if two recipes came from "User A's Grandma's Recipes" but were aggregated with other recipes collected by User B, the user can filter User A's Grandma's Recipes out by searching as described herein.

In an embodiment, once a recipe is selected, all of the ingredients (and amounts) for that recipe can be exported to a shopping list object, which can be saved centrally or locally, or sent to a user later access, such as by email or text message. A shopping list object data can be available offline from the social networking system. A shopping list object can further be edited, added to, or deleted prior to or after sending to a user.

In embodiments, administrative users can have publishing content permissions that is managed by content engine 122. For example, an administrative user can change the number and particular types of content that appears on users' landing pages or personalized activity streams. In another example, an administrative user can change the order in which public content appears on users' landing pages to ensure the content is relevant to particular users. In another example, an administrative user can add content to the users' landing pages.

Figure 41:
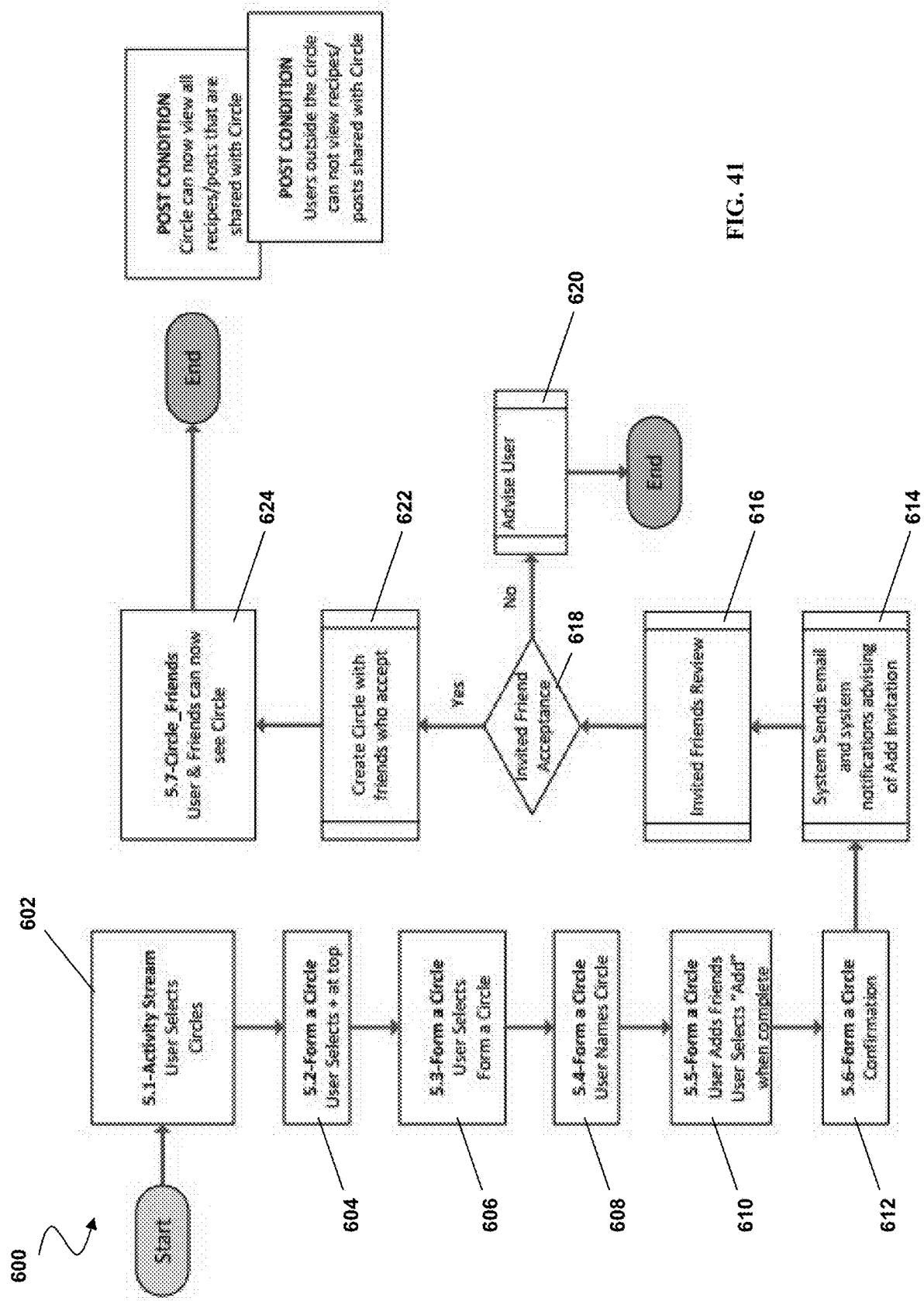
FIG. 41 is a flowchart of a method for forming a circle on a social networking system, according to an embodiment.

Referring again to FIG. 3, circles engine 124 is configured to manage the friends and circle group functions of logic subsystem 118; for example, the creation of circles, managing of friends within circles, and circle messaging. Referring to FIG. 41, a flowchart of a method 600 for forming a circle on a social networking system is depicted, according to an embodiment. Method 600 can be implemented by, for example, circles engine 124. Circles can be used to create multiple friends and communities for the varied sharing of content. In an embodiment, the personalized activity streams for individual users are filled based on community membership. For example, a user in Group A will have Group A content populated to his activity stream. A user in both Group A and Group B will have both Group A and Group B content populated to his activity stream.

Figure 42:
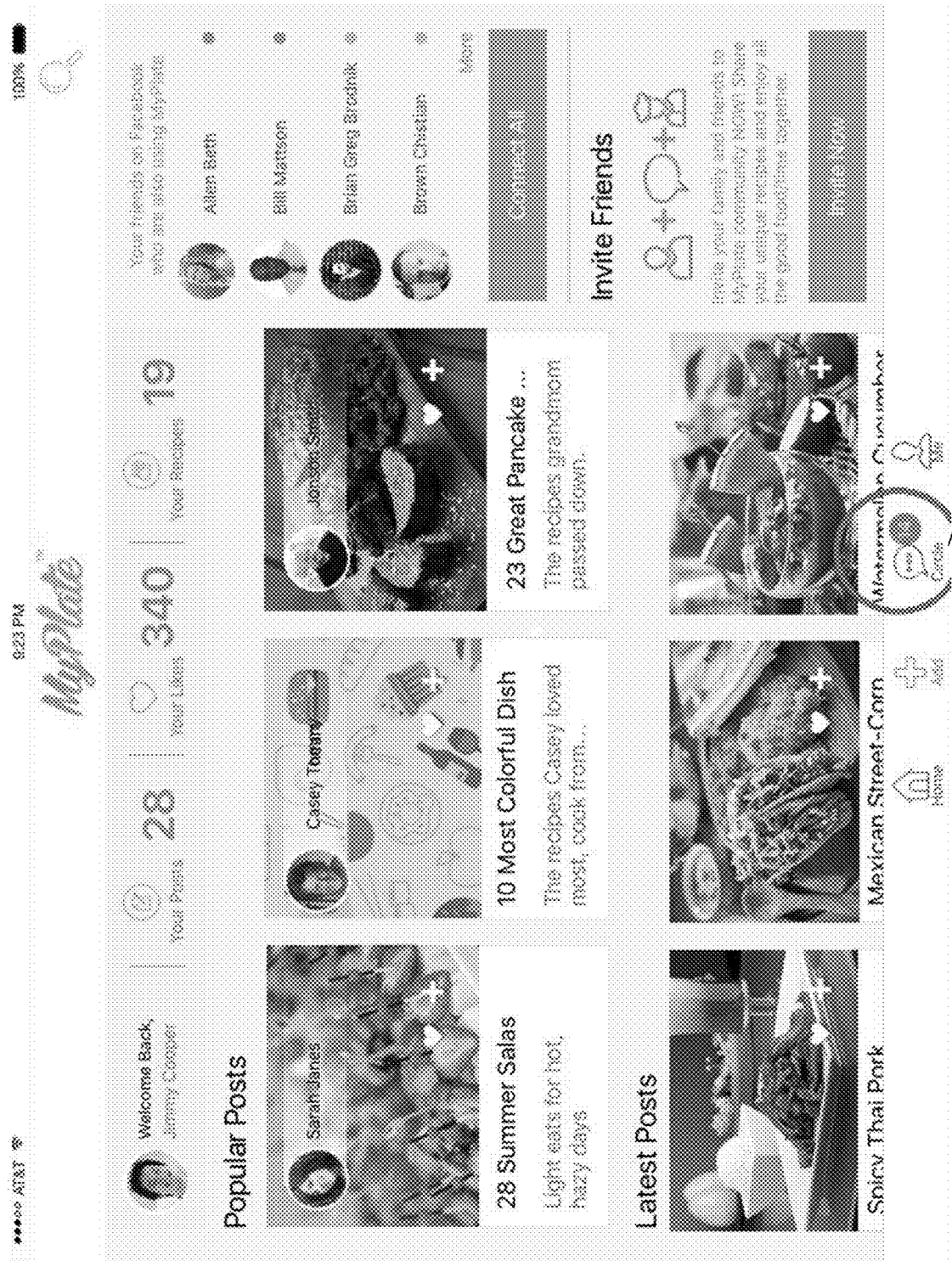
FIG. 42 is a screenshot of a personalized activity stream with a network circle selection for a user experience device on a social networking system, according to an embodiment.

At 602, a user interfaces with a user experience device, such as user experience device 102a, to select a "Circles" icon. For example, referring to FIG. 42, a screenshot of a personalized activity stream with a network circle selection icon 602 for a user experience device on a social networking system is depicted, according to an embodiment.

Figure 43:
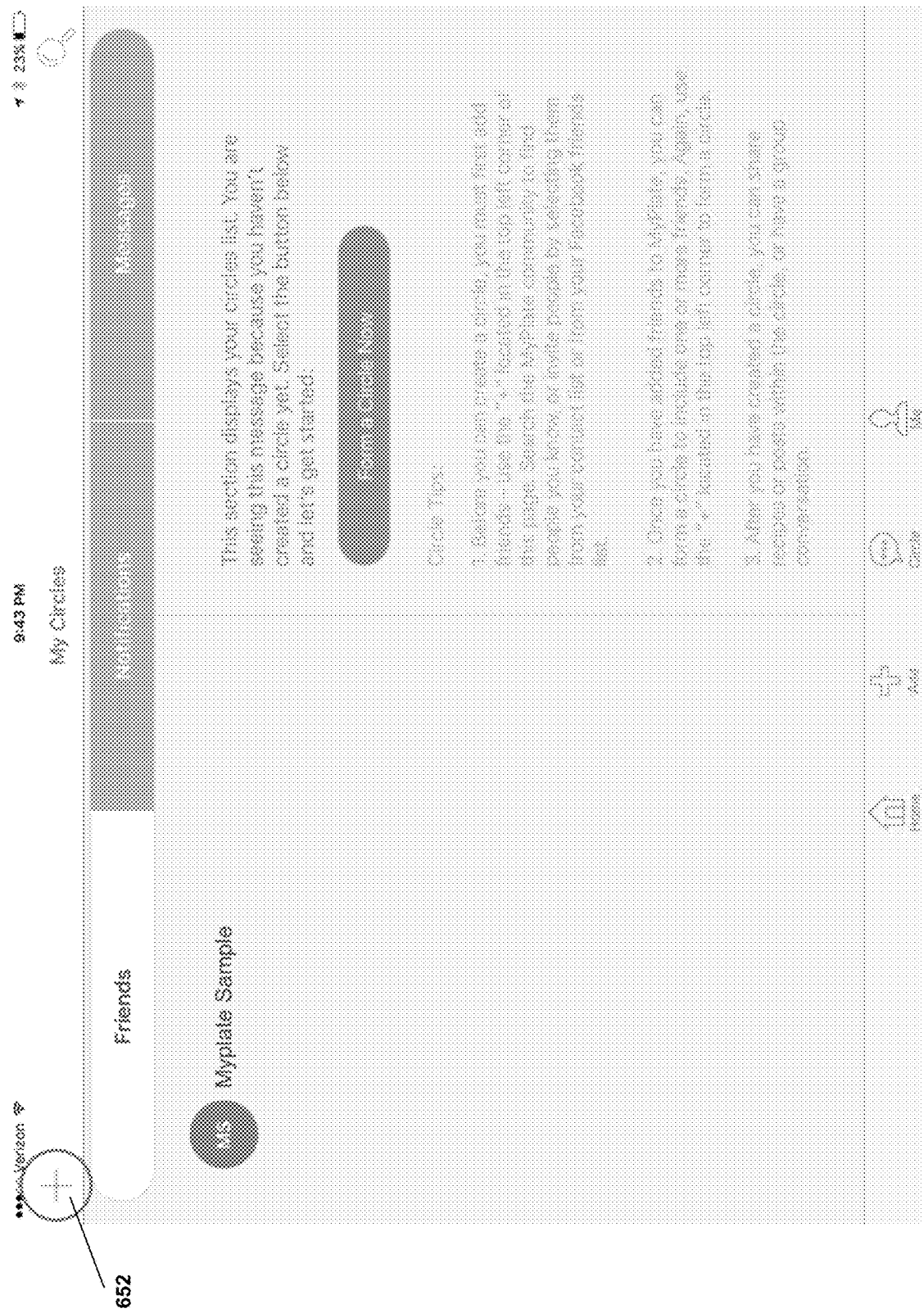
FIG. 43 is a screenshot of an initial circles interface for a user experience device on a social networking system, according to an embodiment.

At 604, the user is presented a "My Circles" interface. Referring to FIG. 43, a screenshot of an initial circles interface for a user experience device on a social networking system is depicted, according to an embodiment. In the interface of FIG. 43, the user is presented with three tabs—friends, notifications, and messages. As depicted, when no circles or friends have been added, the interface does not show any community content. Addition icon 652 can be selected by the user to add friends, a circle, or send a message.

Figure 44:
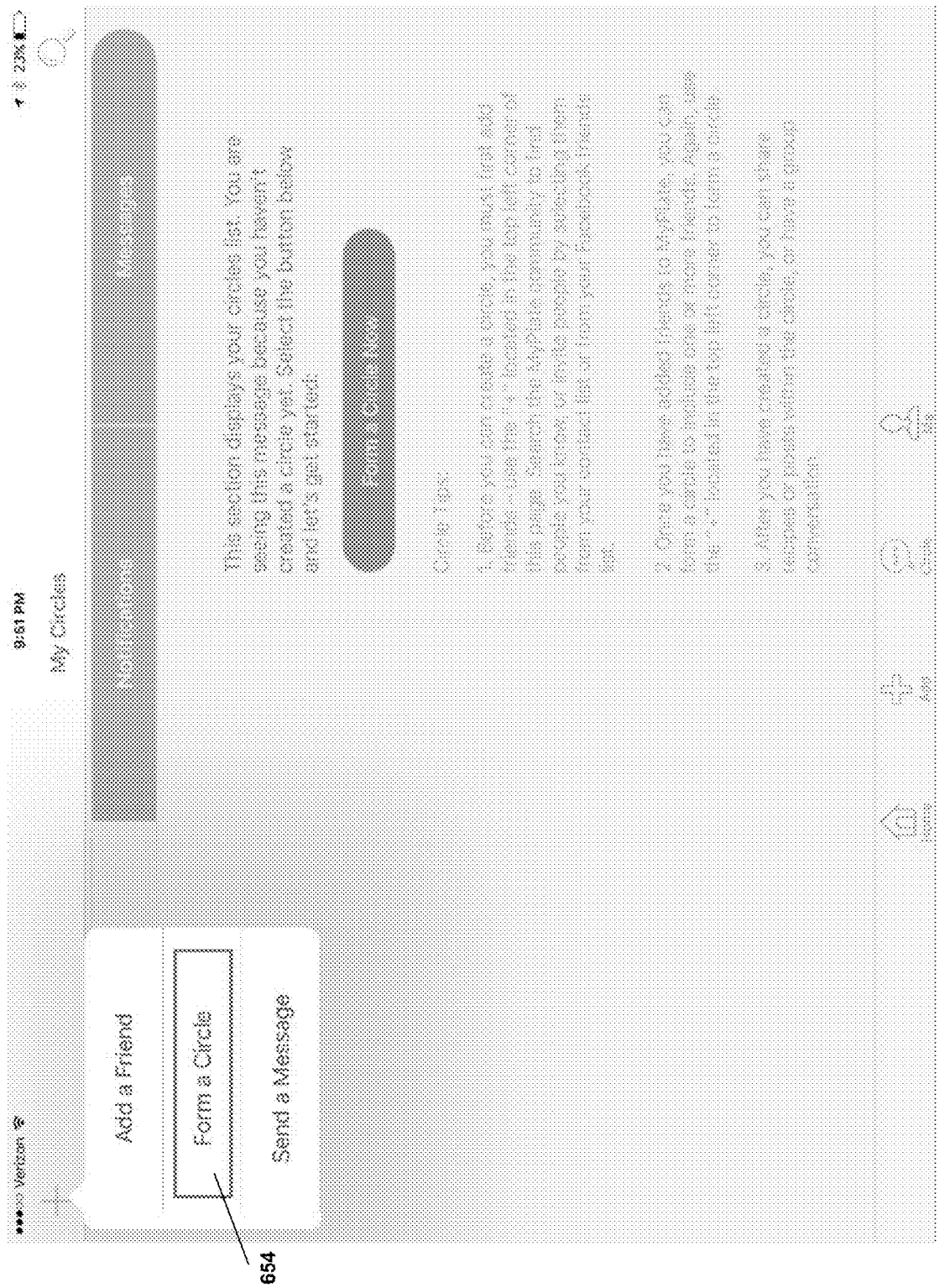
FIG. 44 is a screenshot of a circle forming interface for a user experience device on a social networking system, according to an embodiment.

At 606, the user is presented a drop down menu interface with the option to form a new circle. Referring to FIG. 44, a screenshot of a circle forming interface for a user experience device on a social networking system, according to an embodiment. The user can select a "Form a Circle" icon 654 to create a new circle.

Figure 45:
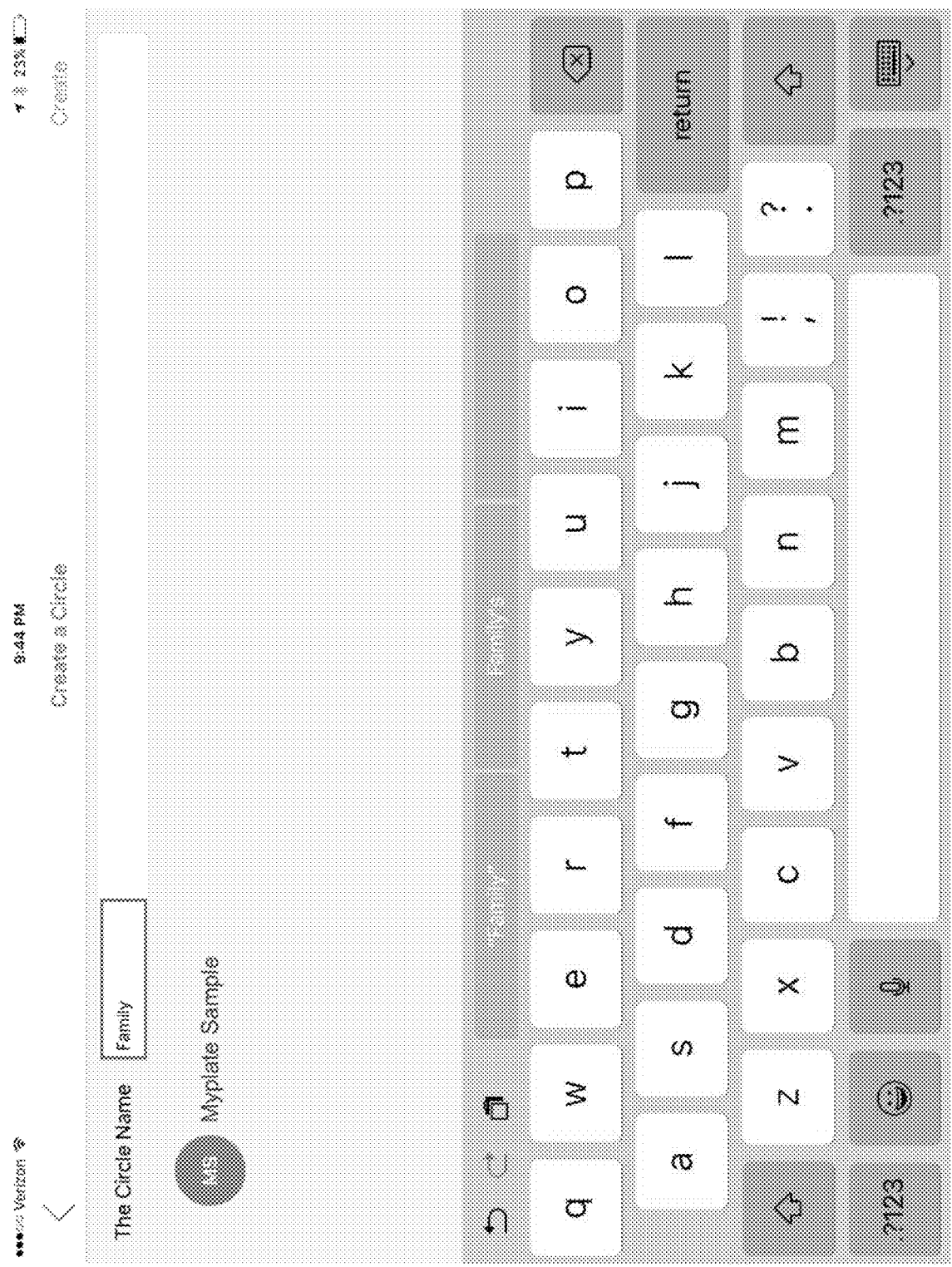
FIG. 45 is a screenshot of a circle title entry interface for a user experience device on a social networking system, according to an embodiment.

At 608, the user is presented an interface to name the circle. Referring to FIG. 45, a screenshot of a circle title entry interface for a user experience device on a social networking system is depicted, according to an embodiment. The circle name can be entered by the user operating a virtual keyboard.

Figure 46:
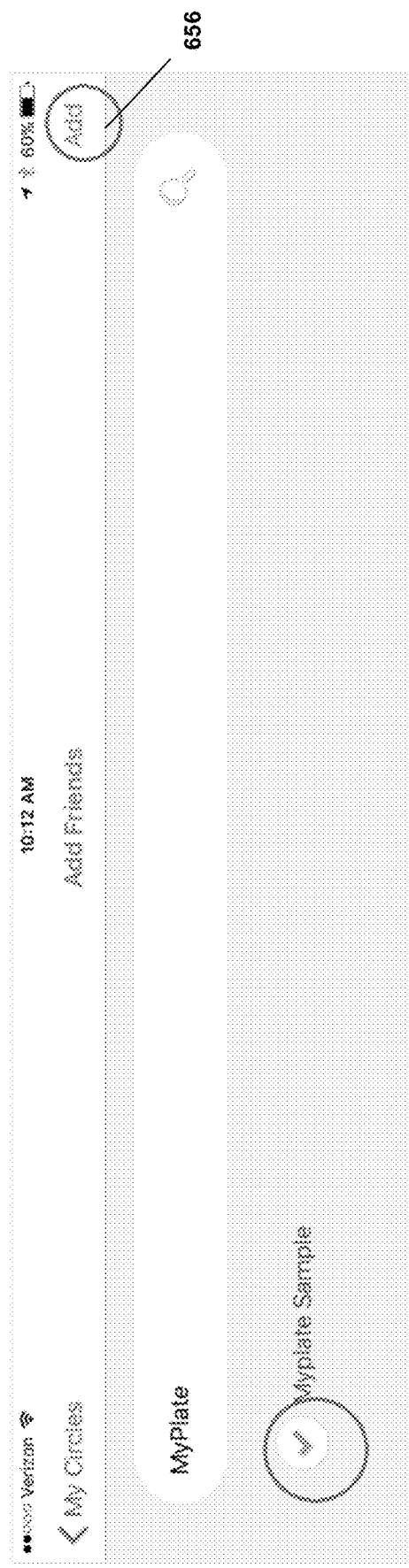
FIG. 46 is a screenshot of a circle friend addition interface for a user experience device on a social networking system, according to an embodiment.

At 610, the user is presented an interface to add friends to the circle. Referring to FIG. 46, a screenshot of a friend addition interface for a user experience device on a social networking system is depicted, according to an embodiment. The user can select Add icon 656 to add (invite) particular friends to this circle. In embodiments, the user can select any number of friends to add to the new circle. When inviting users to the circle or the system generally, the inviting user can be prompted to manually enter one or more email addresses for the invited user. In another embodiment, friends can be invited via FACEBOOK, a user device contact list, or other third party contact lists. In an embodiment, the social networking system alerts the inviting user if the invited user is already a member of the social networking system or the particular circle. In an embodiment, the user is further presented with family members or household members that can be linked in database 114. Shopping lists can then further be shared between those types of members, as described herein.

In embodiments, the user can also add another circle to have a "circle within a circle" for efficient distribution of content. For example, in an embodiment where Circle A includes Circle B, all content shared to Circle A is sent also to Circle B. However, content shared with Circle B is not sent to Circle A.

Figure 47:
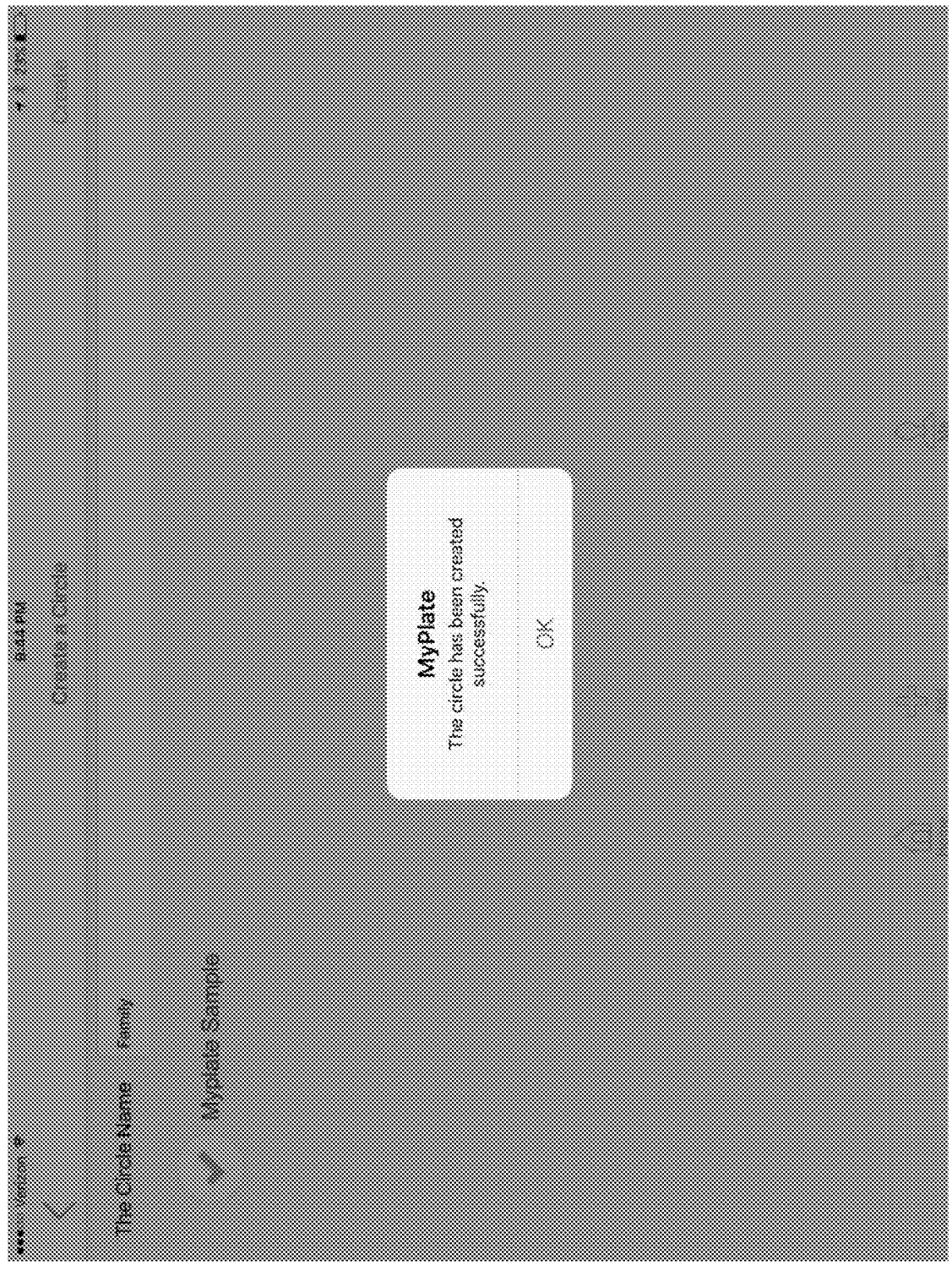
FIG. 47 is a screenshot of a circle confirmation prompt for a user experience device on a social networking system, according to an embodiment.

At 612, a confirmation prompt that the circle has been successfully created is presented to the user. Referring to FIG. 47, a screenshot of a circle confirmation prompt for a user experience device on a social networking system is depicted, according to an embodiment. The circle is now in a "pending" state as system 100 contacts the users who have been added.

At 614, system 100 sends a notification to each user advising the user of their addition to the circle. In an embodiment, the notification can comprise an email message comprising a link to begin the download and registration process. In an embodiment, the notification can comprise a system-level synchronous or asynchronous message.

At 616, each user invited to the circle is presented the opportunity to review the circle. For example, the user can be presented with the inviting user, as well as all users who have been invited to the circle.

At 618, if an invited user declines the circle invitation, the inviting user is notified of the decline indication at 620.

If at least one user accepts, at 622, a circle is created with the accepting users. Once the new circle has been generated, and for each user friend who has accepted, a circle object is stored in database 114 with links to each user who has accepted contained within the circle object. In another embodiment, links are generated at each user entry in the database pointing to the circle group. In an embodiment, user-level ad-hoc grouping is made by linking a unique user ID, network ID, or computer hardware ID where appropriate to the unique circle identifier. Accordingly, the circle can view all recipes and posts that are shared with the circle. And further, users outside the circle are unable to view the recipes and posts shared with the circle.

In an embodiment, the logic of which users are in which circle and what content is shared within the circle is stored in, for example, central database 114 until circle modifications or shared content is modified by a circle member. Then, in embodiments, the circle data can be transitioned to user experience device 102 storage and freed from central database 114. In an embodiment, communication data by "friends" is likewise stored temporarily in the central database 114 until the communication data can be pushed to user experience device 102 storage and freed from central database 114.

Figure 48:
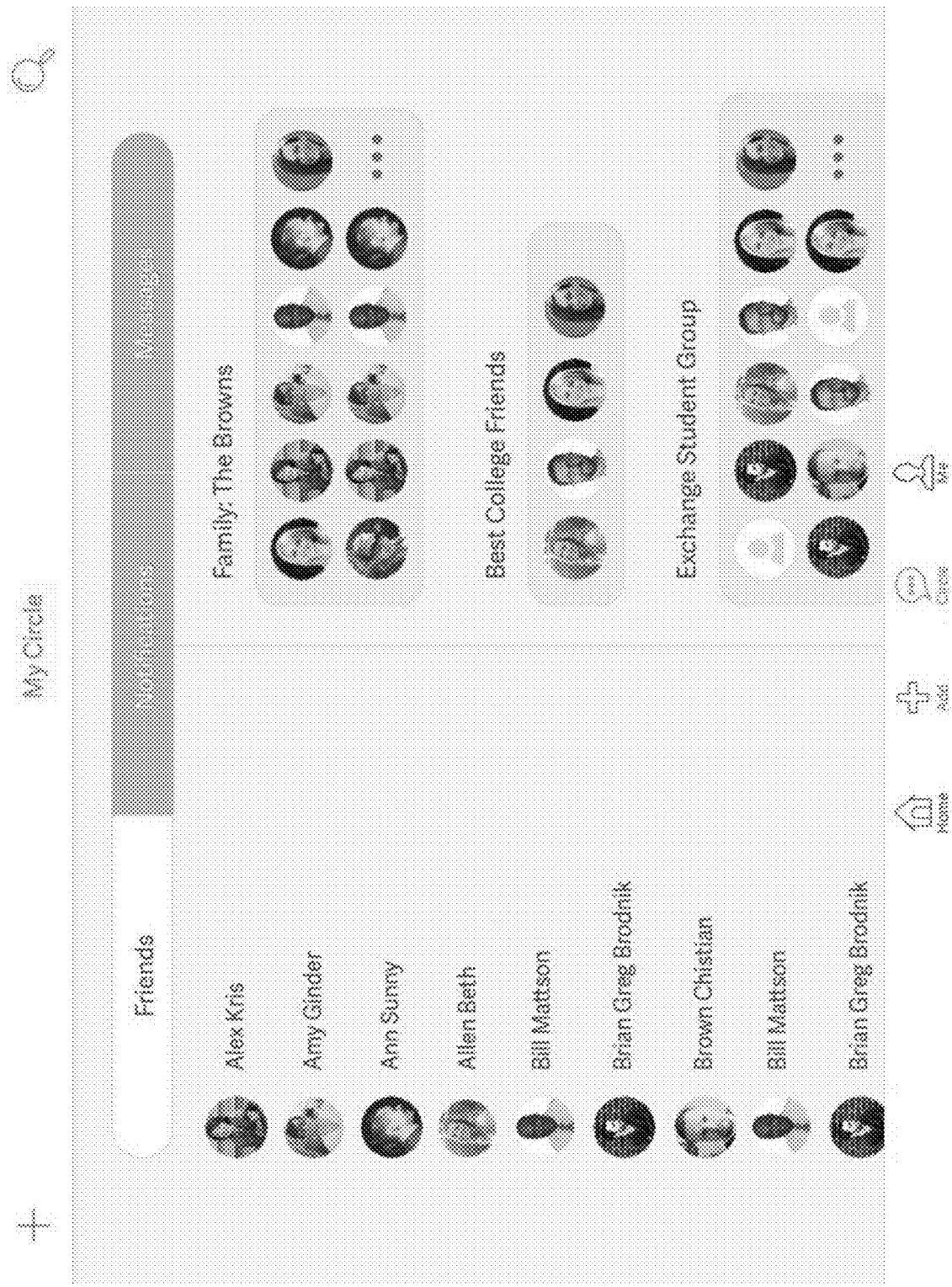
FIG. 48 is a screenshot of a populated friends list for a user experience device on a social networking system, according to an embodiment.
Figure 49:
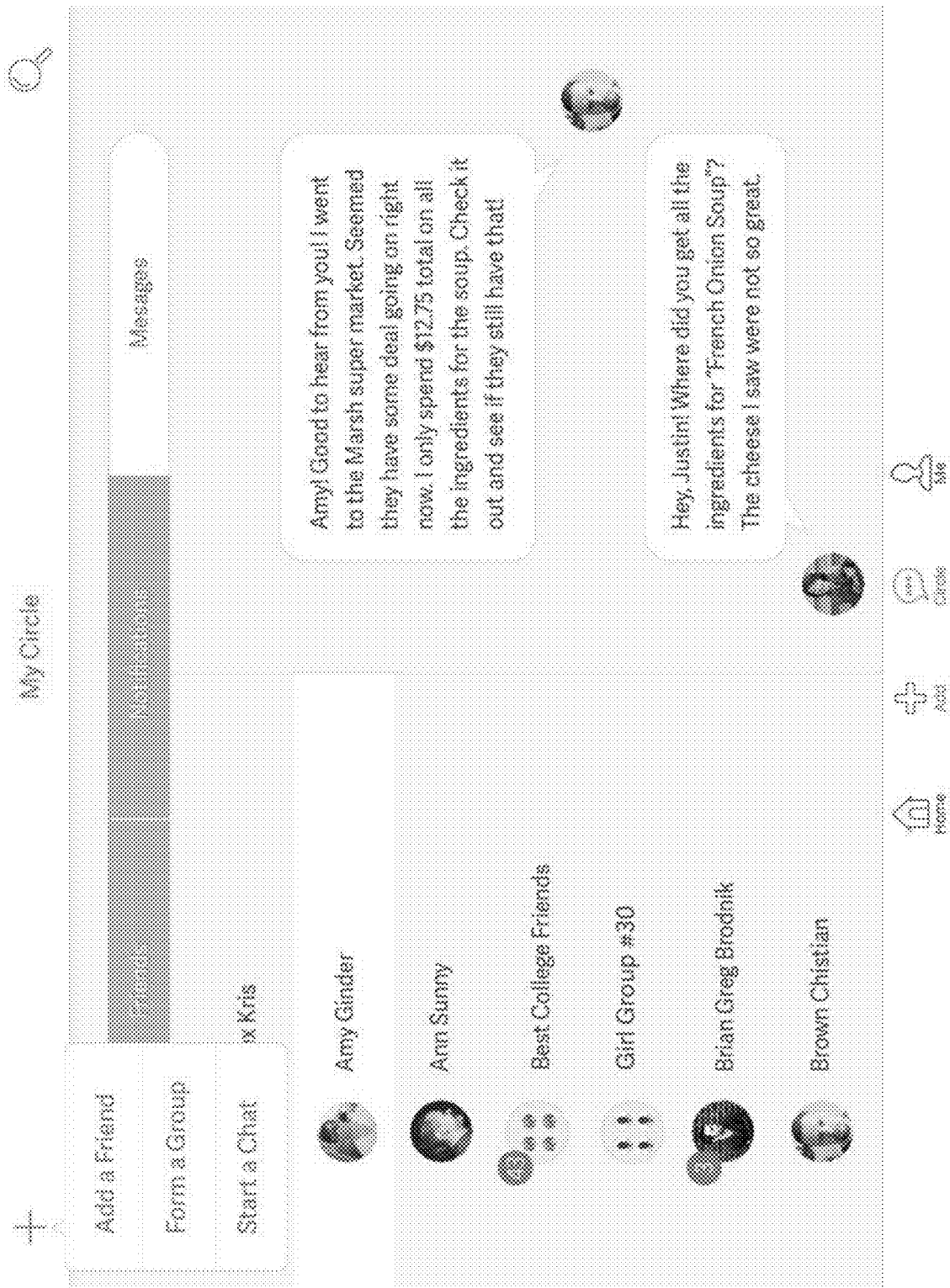
FIG. 49 is a screenshot of a populated message list for a user experience device on a social networking system, according to an embodiment.
Figure 50:
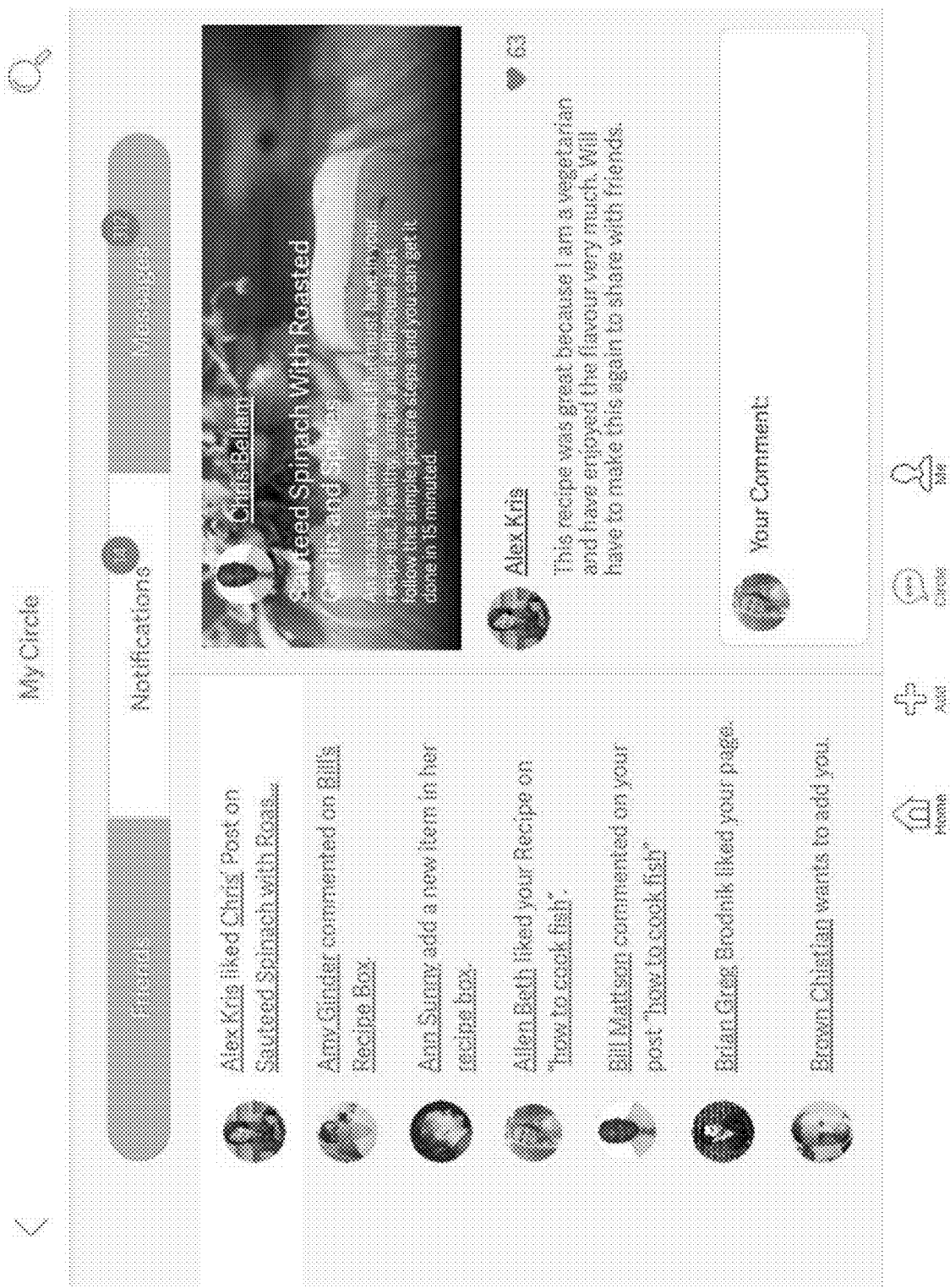
FIG. 50 is a screenshot of a populated notifications list for a user experience device on a social networking system, according to an embodiment.
Figure 51:
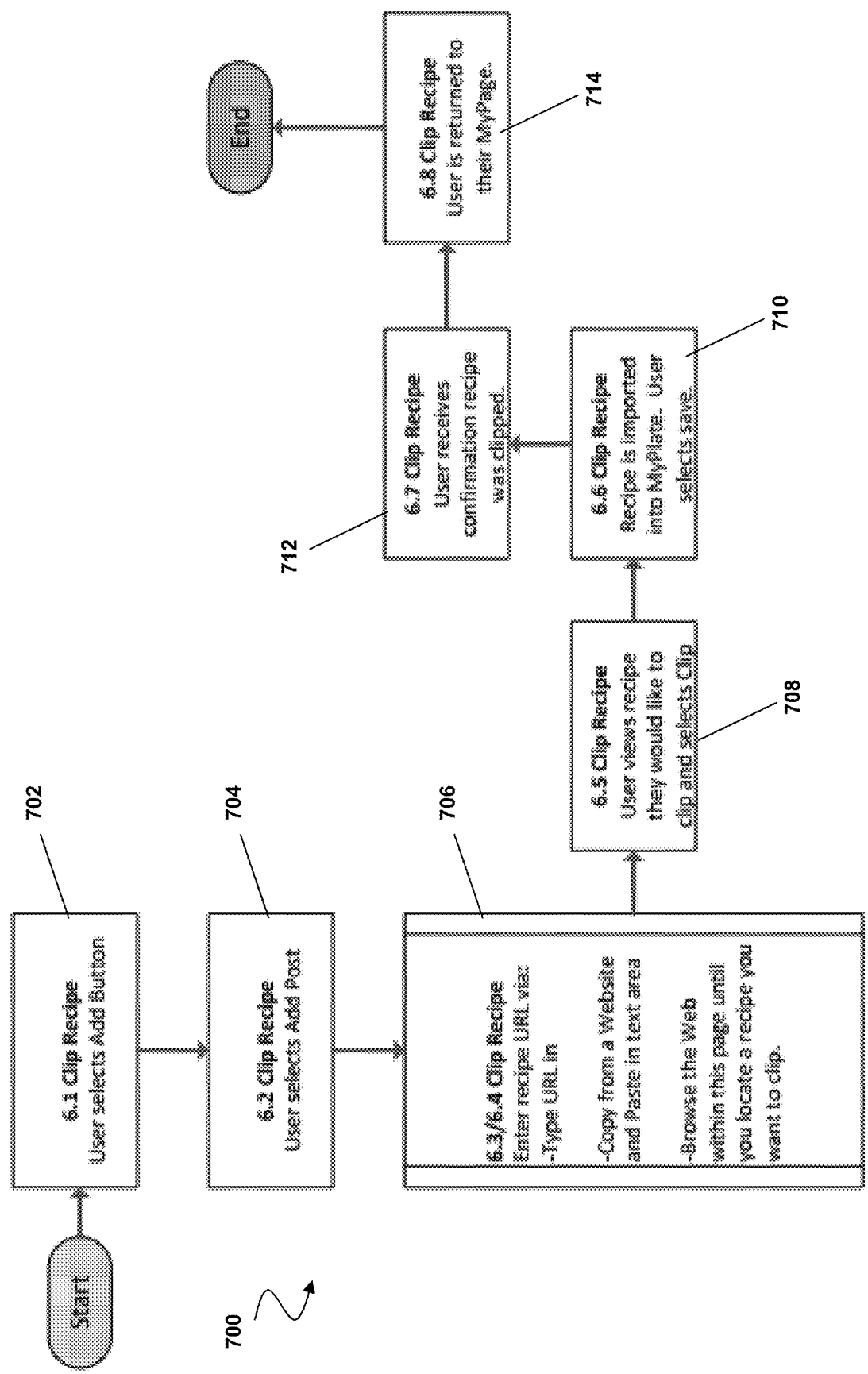
FIG. 51 is a flowchart of a method for clipping a recipe for a user experience device on a social networking system, according to an embodiment.

Once a user's community has been populated, friends, notifications, and messages are pushed to the user. Referring to FIG. 48, a screenshot of a populated friends list for a user experience device on a social networking system is depicted, according to an embodiment. Referring to FIG. 49, a screenshot of a populated message list for a user experience device on a social networking system is depicted, according to an embodiment. Referring to FIG. 50, a screenshot of a populated notifications list for a user experience device on a social networking system is depicted, according to an embodiment. Further, users are able to view all of the circles in which they are a member. In an embodiment, a user in a circle is able to change the display name of the circle for that user. The circle name remains unchanged for the rest of the circle members.

Data permanence solutions are further provided in the circle context. For example, once a circle is established and a recipe is shared, a single instance of that recipe exists on the social networking system. Comments by any of the users within the circle about the shared recipe are linked with that single instance of the recipe and can be viewed by the users of the circle. In an embodiment, the moment the recipe data is modified or saved to a user's recipe box, a second instance of the recipe is created and linked to that modifying or saving user. Modifications or comments on the second instance are linked only with that second instance and not the first instance. For example, the saving user might delete an ingredient and save the recipe. The data field for that deleted ingredient is modified for only the second instance.

In embodiments, until the saving user shares the second instance, the second instance of the recipe is private to the saving user and inaccessible to any other users of the circle. Comments on the first instance can be imported with the second instance, but any further comments on the first instance are not transferred to the second instance after instantiation of the second instance. Accordingly, if the first instance is modified in some way (editing, deleting, etc.), the second instance remains unchanged, existing in memory as of the time the second user saved it. Content instances are therefore selectively instantiated based on user interaction with the system.

In embodiments, unique security data permanence solutions are provided at both the user layer and content layer. For example, at original log-on by a user, security exists at the user level. A user is granted access to the system by entering user-level credentials. However, once a user begins sharing recipes, security is further implemented at the data content layer. Every user-shared recipe or saved recipe has its own permissions at the content layer level. System embodiments therefore manage user-layer security and content-layer security. User and content-layer security differ in that user-level control is managed by application access controls. Content-level control, while governed by the overarching application, is controlled by the end user. Logic implemented by, for example, logic subsystem 118 can implement content-level controls by having permissions attached to each content object.

In an embodiment, user posts and clipped recipes are treated the same as recipe objects and can be private, shared to circle connections, or public. Thus, content-level control is affected by the social networking system.

Figure 52:
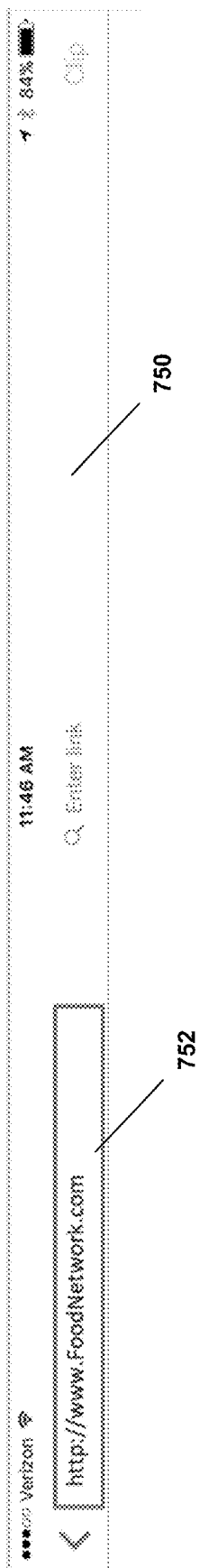
FIG. 52 is a screenshot of a URL address entry interface for a recipe clipping engine on a user experience device on a social networking system, according to an embodiment.

Referring again to FIG. 3, clipping engine 126 is configured to clip a recipe and import the recipe into server storage. Referring to FIG. 52, a flowchart of a method 700 for clipping a recipe for a user experience device on a social networking system is depicted, according to an embodiment. Method 700 can be implemented by, for example, clipping engine 126 and portions of content engine 122.

At 702, referring again to FIG. 14, a user is presented a personalized activity stream having an Add selection icon 350.

From the Add selection at 304, the user can select recipe clipping at 704. For example, referring to FIG. 15, content engine 122 can receive a selection of clipping recipe content by a user tapping, clicking, or otherwise selecting clip recipe content icon 356.

At 706, a user is presented with at least three options for clipping a recipe. For example, a user can enter a URL via a keyboard or virtual input, copy a URL from a web browser, or browse the Internet within the system to locate a recipe to clip. All three options utilize the same XML import of the recipe data on the server side. Further, once imported, the user can edit the recipe and change any fields to personalize the recipe.

In an embodiment, a mini-browser is presented to the user. For example, referring to FIG. 52 is a screenshot of a URL address entry interface for a recipe clipping engine on a user experience device on a social networking system is depicted, according to an embodiment. A mini-browser 750 can be utilized to navigate to third party websites. A third party URL can be entered at entry 752 and mini-browser 750 can navigate to the address. In embodiments, mini-browser 750 can accommodate shortened domain entry such as "www.domain.com" (in addition to http://www.domain.com).

Figure 53:
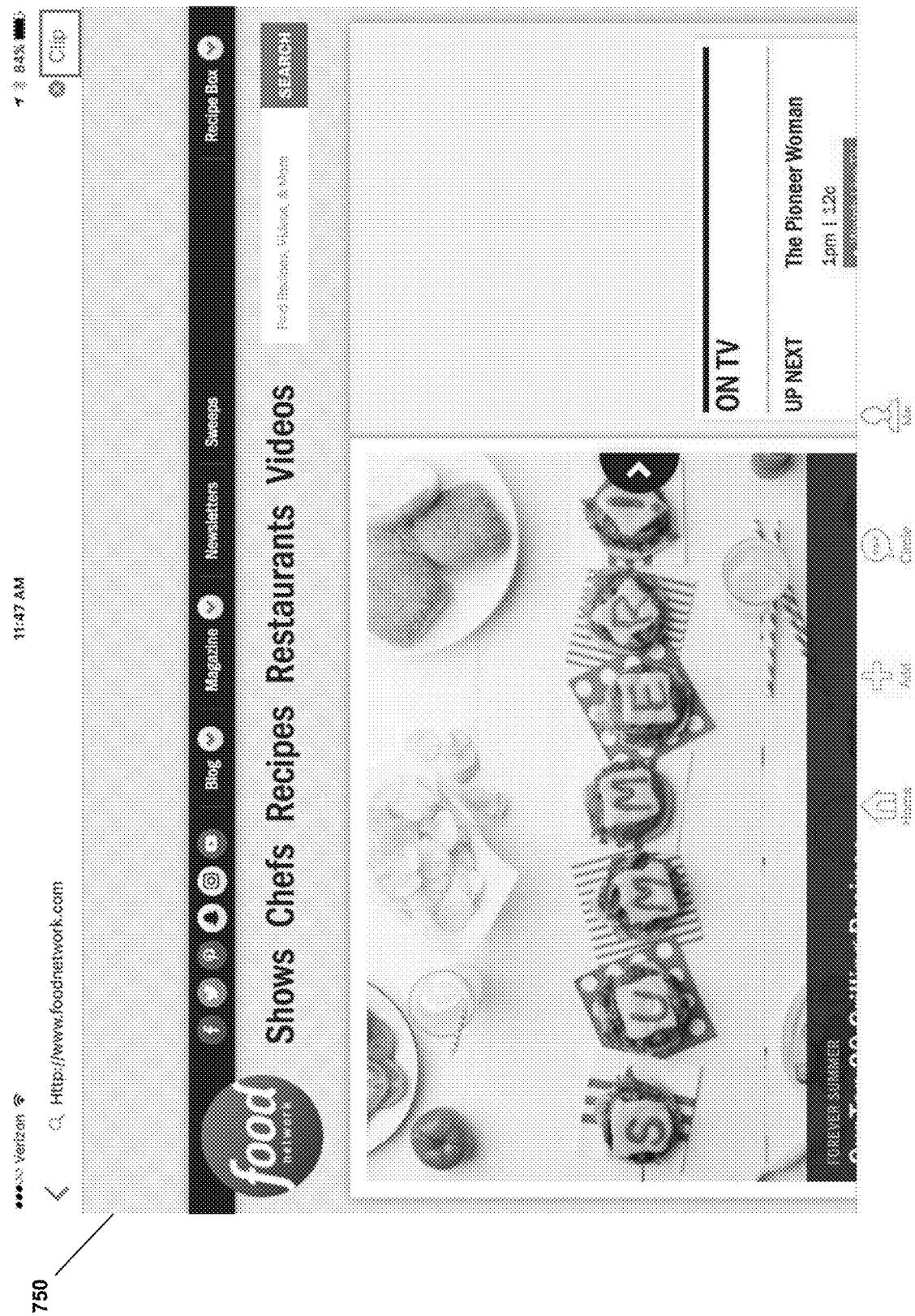
FIGS. 53-54 are screenshots of a mini browser for a recipe clipping engine on a user experience device on a social networking system, according to an embodiment.
Figure 54:
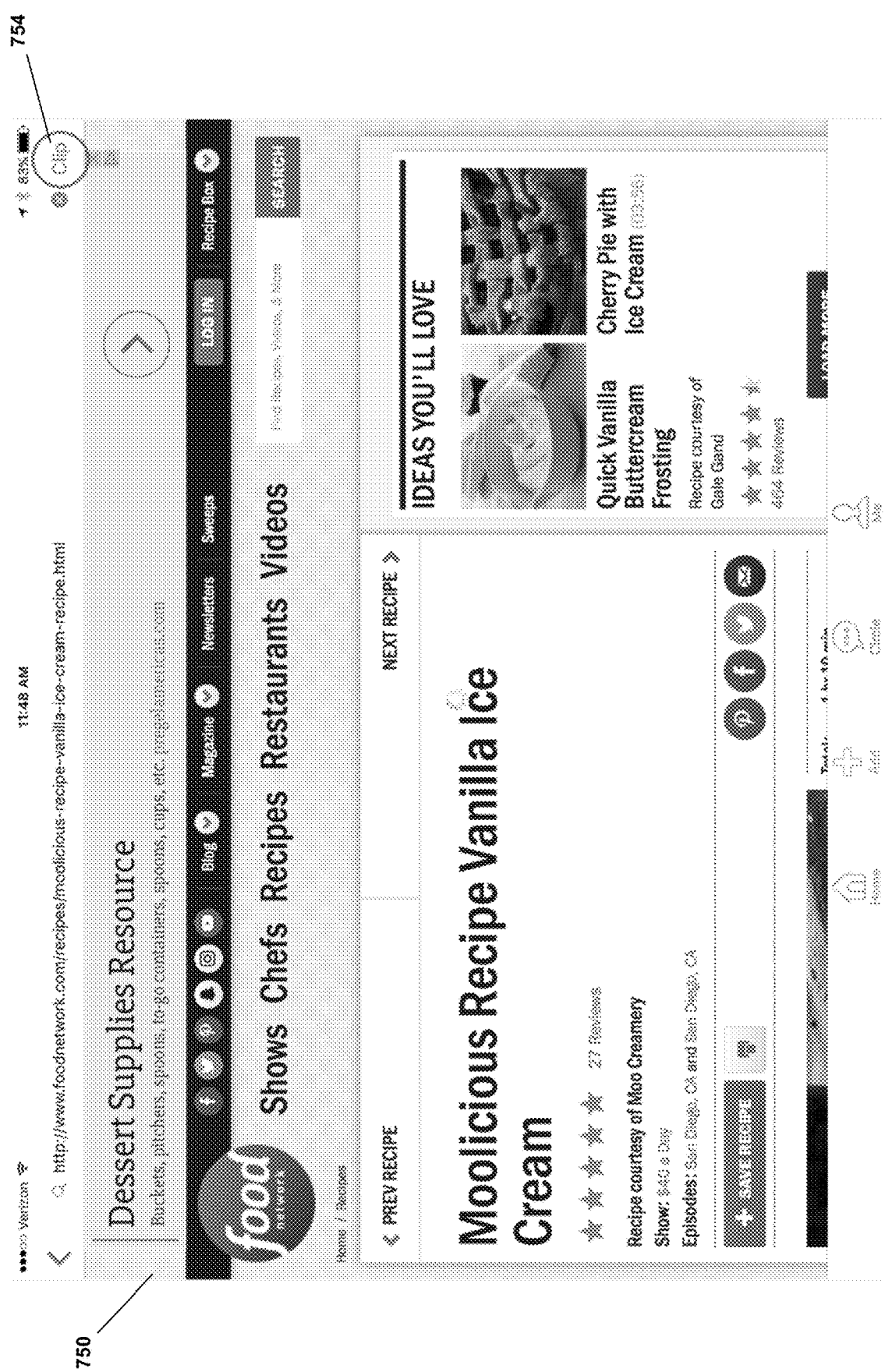

At 708, a user is presented the website for the address he has entered. Referring to FIGS. 53-54, screenshots of mini browser 750 for a recipe clipping engine on user experience device on a social networking system are depicted, according to an embodiment. In FIG. 53, a user can navigate further within the mini browser to select a particular recipe. In FIG. 54, the user can select a clip icon 754 to select the recipe.

At 710 the recipe is imported into the system. In embodiments, various third party sites structure recipe data differently. Embodiments described herein account for the variations in formatting. First, a check is made to determine if the third party site uses one of the known XML standards by associating the XML schema to one of the known schemas. If the third party site does use a standardized format, the XML is imported by the recipe clipping engine. If the third party site does not use a standardized format, the recipe clipping engine utilizes a database of expected data to parse through the website. In one embodiment, the recipe clipping engine reads a first item and assigns it to a known data field in the social networking system based on the first item's contents and the database of expected data. The recipe clipping engine then parses a second item and assigns it to a known data field in the social networking system, and so on, until all data items have been assigned. If an unexpected or unknown data item is encountered, an algorithm determines a "best guess" at the type of data based on the contents and its closeness to the items in the database of expected data.

Figure 55:
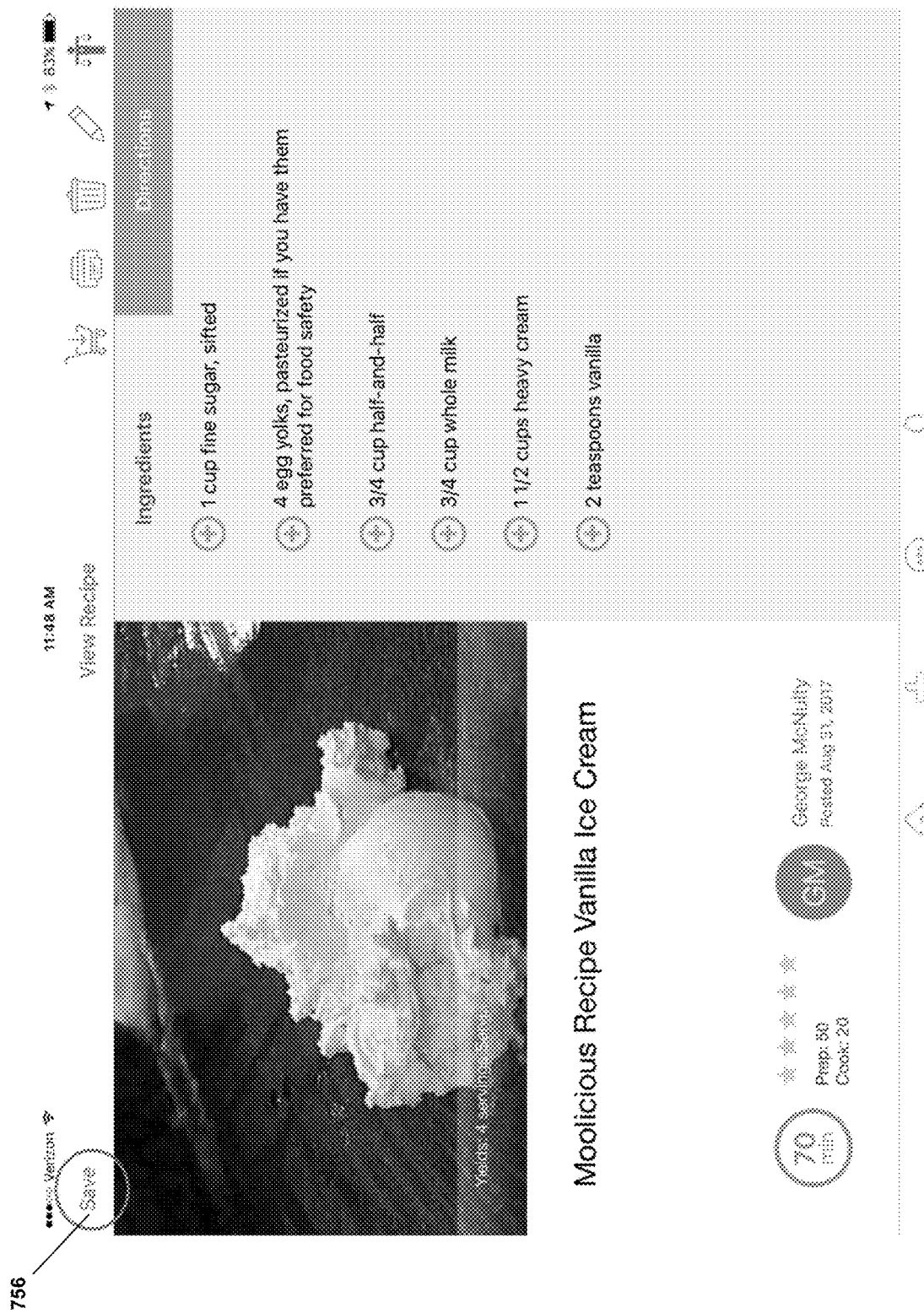
FIG. 55 is a screenshot of an imported recipe by a recipe clipping engine on a user experience device on a social networking system, according to an embodiment.

Referring to FIG. 55, a screenshot of an imported recipe by a recipe clipping engine on a user experience device on a social networking system is depicted, according to an embodiment. The user is presented the option to save the recipe to the system using a save icon 756.

Figure 56:
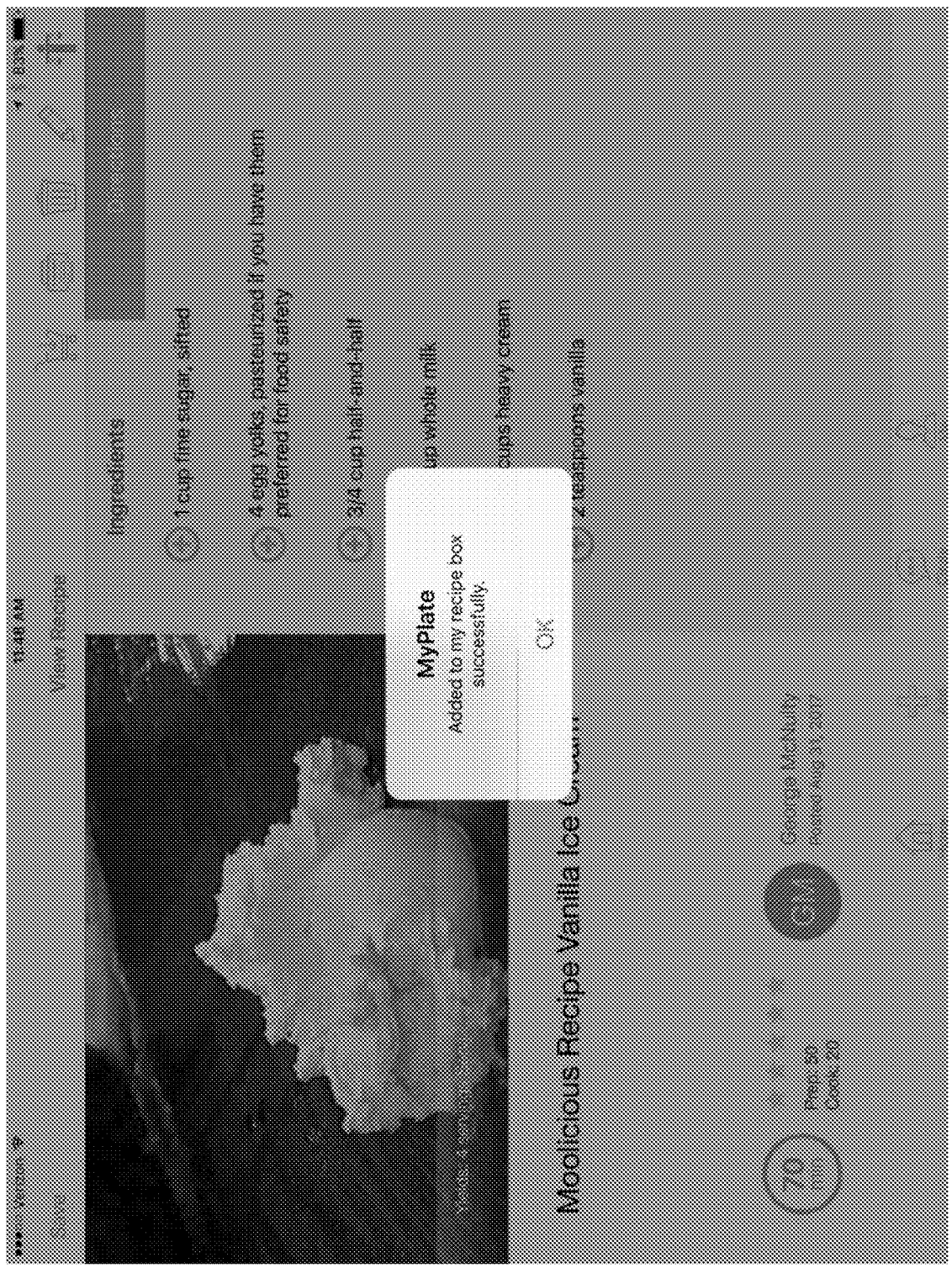
FIG. 56 is a screenshot of a recipe clipping confirmation prompt for a user experience device on a social networking system, according to an embodiment.

At 712, the user is presented a confirmation that the recipe was successfully imported. For example, referring to FIG. 56, a screenshot of a recipe clipping confirmation prompt for a user experience device on a social networking system is depicted, according to an embodiment.

Figure 57:
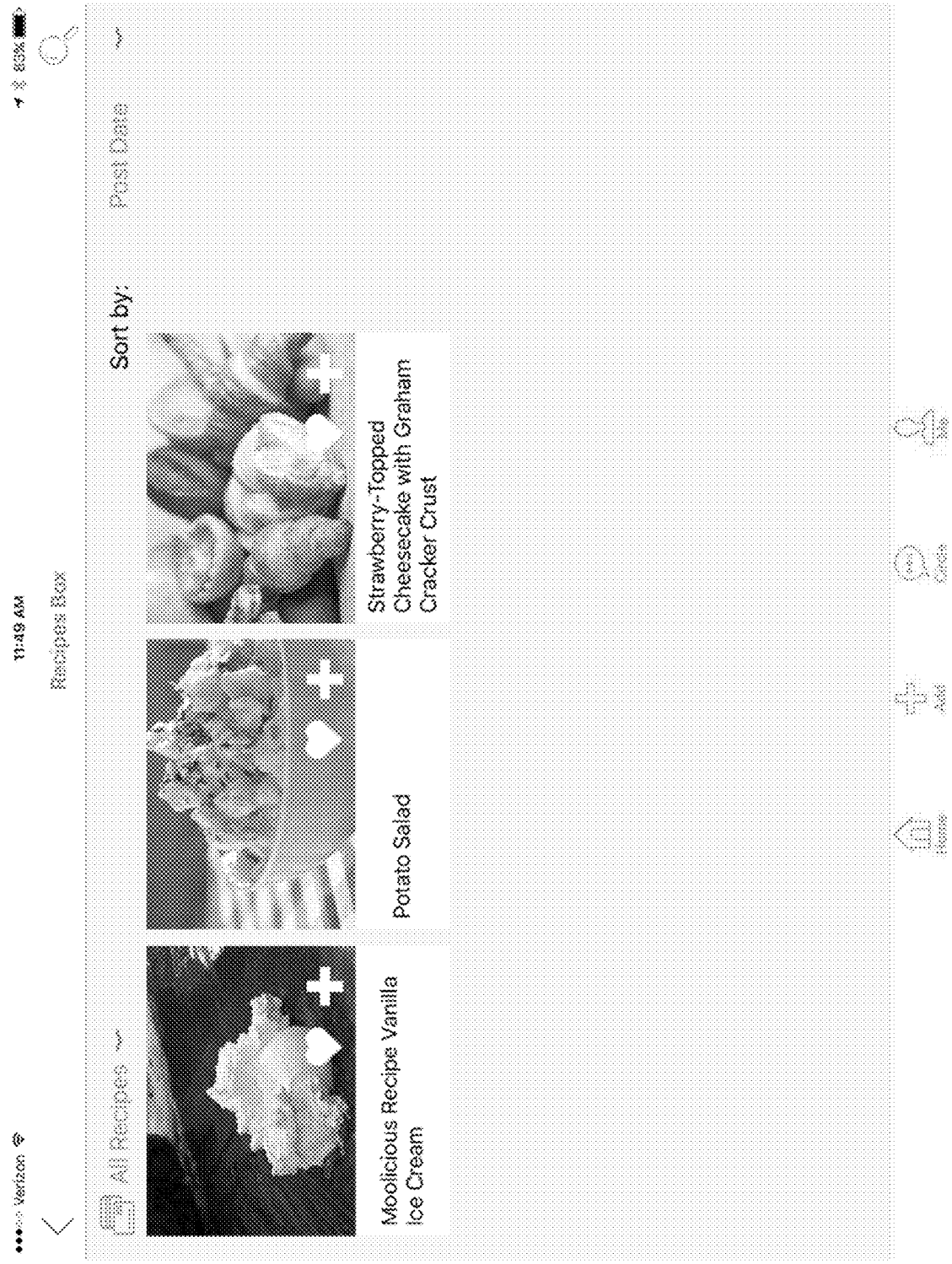
FIG. 57 is a screenshot of a recipe box with a clipped recipe on a user experience device on a social networking system, according to an embodiment.

At 714, the user is returned to a system homepage, such as their personalized recipe box. For example, referring to FIG. 57, a screenshot of a recipe box with a clipped recipe on a user experience device on a social networking system is depicted, according to an embodiment. Accordingly, clipping engine 126 acts as a personalized aggregator for multiple third party websites. Once clipped and imported into the social networking system, content for the credit is presented to the user and stored as a separate field in, for example, database 114.

Figure 58:
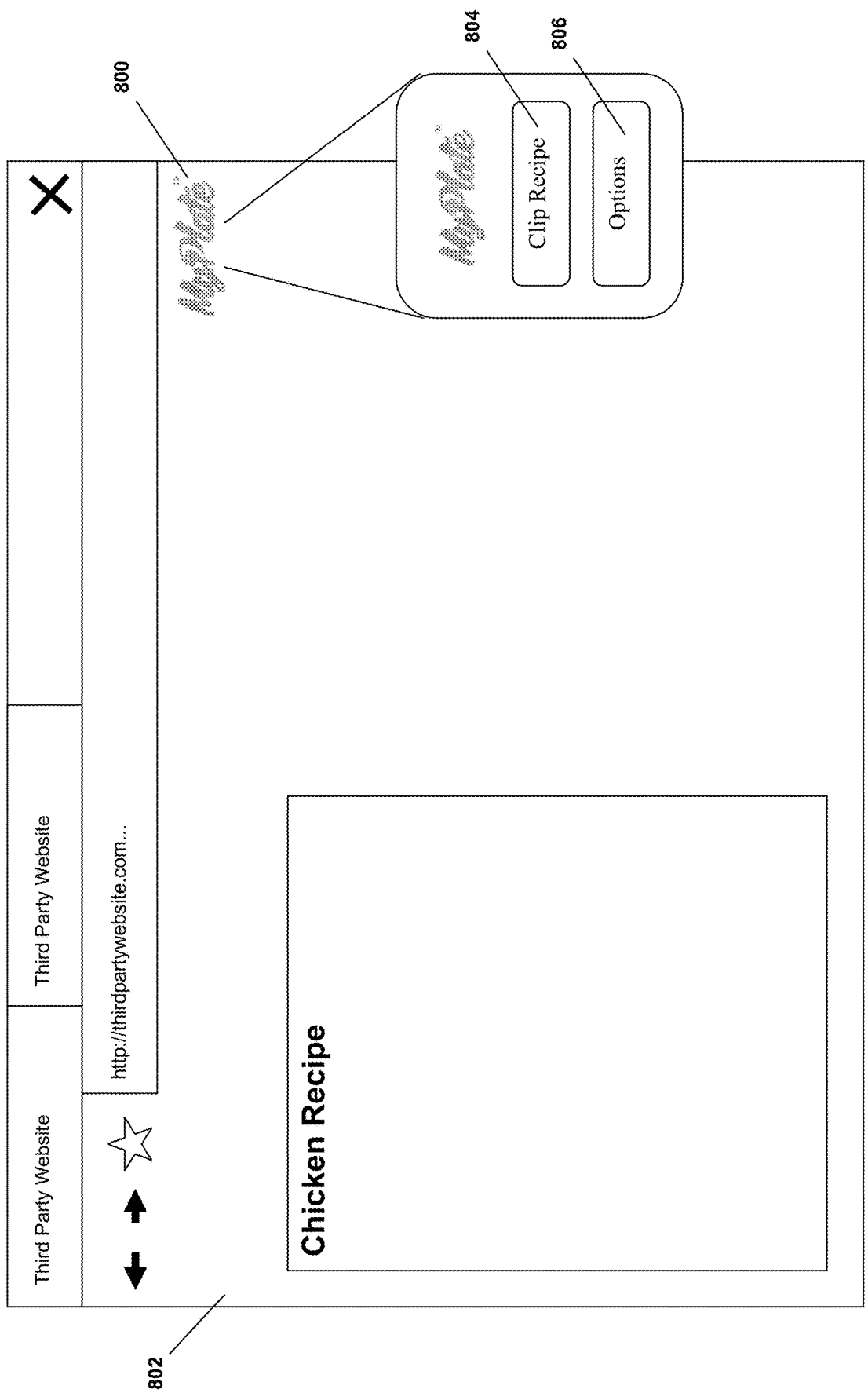
FIG. 58 is a diagram of an integrated clipping engine on a web browser, according to an embodiment.

In another embodiment, a clipping engine can be integrated to a third party web browser. For example, referring to FIG. 58, a diagram of a clipping engine 800 integrated into a web browser 802 is depicted, according to an embodiment. Integrated clipping engine 800 can be embedded into web browser 802 using, for example, ActiveX controls, JavaBeans, Component Object Model (COM) technologies, or Object Linking and Embedding (OLE) technologies.

Clipping engine 800 can appear as an interactive icon within web browser 802 while a user navigates third party websites on the Internet. When the user finds a recipe he wishes to import into the system, such as social networking system 100, he can select the interactive icon representing clipping engine 800. Once selected, clipping engine 800 can present a clip recipe 804 icon, as well as other options icon 806.

The user can select clip recipe 804 icon to utilize the same XML import of recipe data on server 104 as described above with respect to clipping engine 126. Options icon 806 provides selection, import preferences, and other suitable options related to recipe clipping to the user.

In another embodiment, in contrast to embodiments described above wherein a user selects recipe data to clip, recipe data can be clipped and pushed to a user or components of the system accessible to the user. For example, clipping engine 126 can further provide an application programming layer interface (API) for third party sites to push content to social networking system 100.

In an embodiment, the API provided by clipping engine 126 facilitates communications with, for example, server 104. Third party content providers can utilize the API to transfer recipe data to server 104 at the third party content provider's discretion. In another embodiment, a third party content provider can provide a button to "Push Content to MyPlate," which when selected via logic at the third party website, engages the API to transfer recipe data to server 104.

Figure 59A:
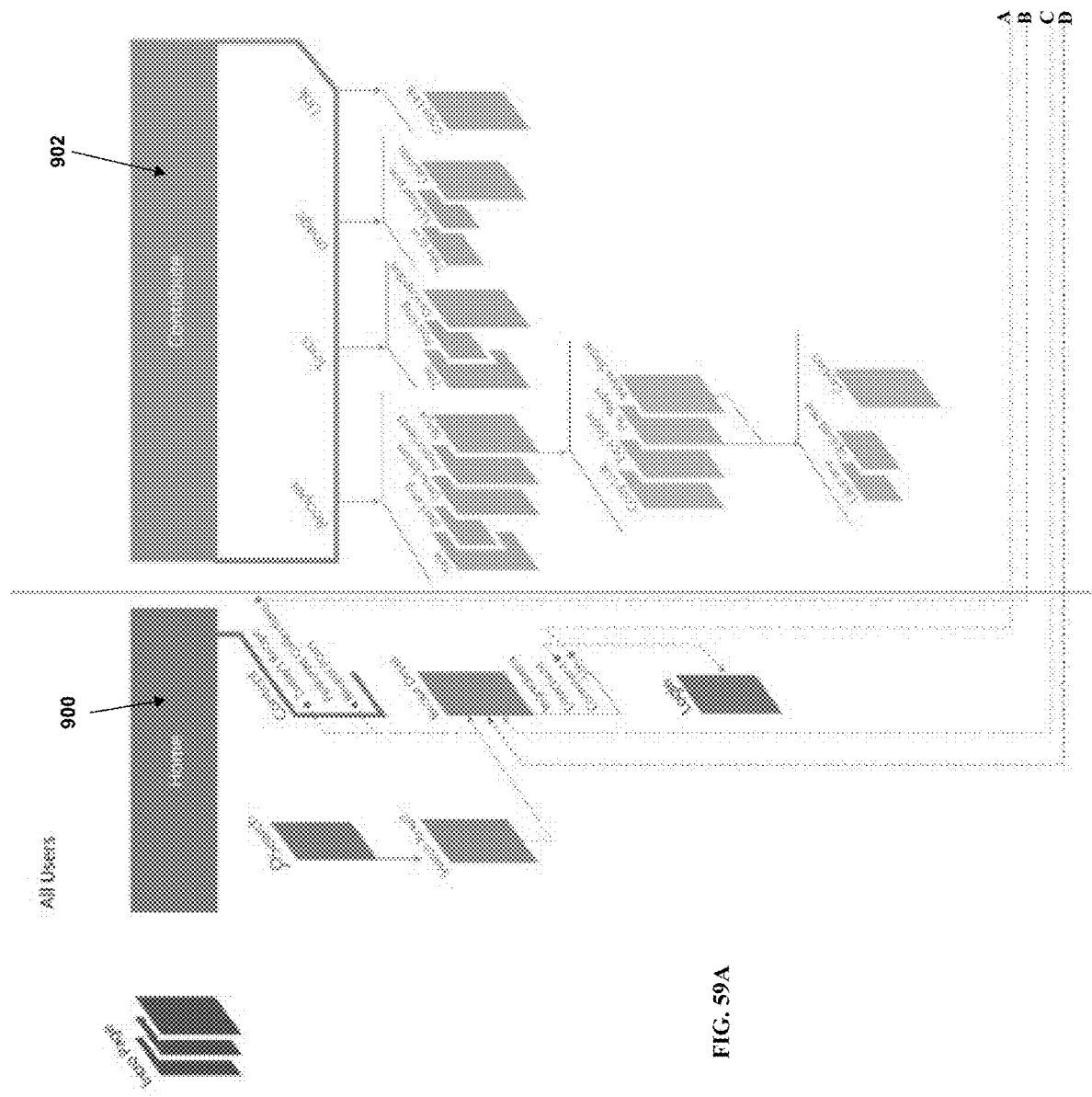
FIGS. 59A-59B are block diagrams of functionality workflows for a social networking system, according to an embodiment.
Figure 59B:
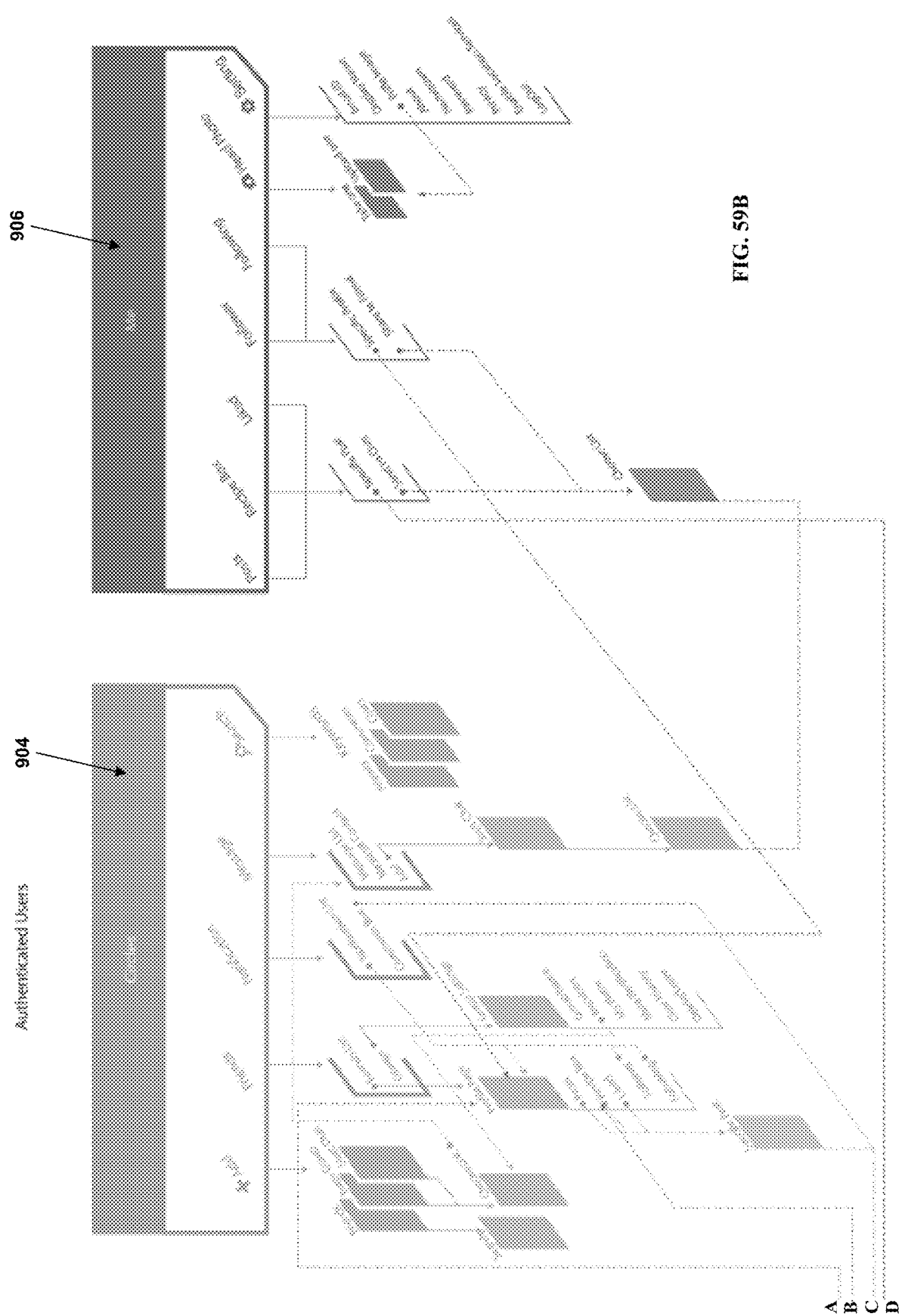

In embodiments, a plurality of distributed service components provide several user interfaces having various functionality to an experience client. Referring to FIGS. 59A-59B, block diagrams of functionality workflows for a social networking system are depicted, according to an embodiment. In an embodiment, functionality is broken into home component 900, contribute component 902, circles component 904, and personal "Me" component 906. Referring again to FIG. 1, home component 900, contribute component 902, circles component 904, and personal component 906 can be implemented by logic subsystem 118 and visual interface 116 with access to database 114 and communications engine 112 for presentation to a user operating one of the plurality of user experience devices 102. Each box or line in FIGS. 59A-59B corresponds to software and/or hardware functionality for the respective annotated functions.

All users are presented a home interface by home component 900. Home interface provides search functionality that result in recipe details to view, and content to view such as "today's recipe," featured collections, and recent posts.

In an embodiment, authorized users are presented a contribution interface by contribute component 902. In an embodiment, an authorized user can be presented contribution interfaces such as recipes, texts, images, or links to add content to the system.

In an embodiment, a recipe interface allows users to enter title, background image, recipe description, recipe ingredients, and steps. Recipe data can further be entered by copying a link, typing the steps, entering picture steps, or entering video steps, including by verbal dictation and speech recognition. In picture and video embodiments, a user is provided an interface by contribute component 902 to access camera hardware to take a picture or video, upload a picture or video, or caption a picture or video.

In an embodiment, a text interface allows a user to enter a recipe title, post an image, and add a recipe description. In an embodiment, an image interface allows a user to take a picture or video, upload a picture or video, or caption a picture or video. In an embodiment, a link interface allows a user to copy a recipe link. In embodiments, the social networking system provides a library of default pictures for recipes and content. For recipes, a library can include a unique picture for each recipe type (e.g. appetizer, breakfast, bakery, etc.).

Referring to FIG. 59B, authorized users are presented a circles interface by circles component 904. In an embodiment, circles component 904 allows an authorized user to add a new circle, interact with friends, receive notifications, message other users, and search his circles and friends.

As described herein, a user can add a new circle from existing friends, search for new friends, and start a chat. Interacting with friends can include viewing a friends list, viewing groups of friends, and viewing friends' profile pages (each having posts, their public recipe box, liked recipes, and following/follower notations). A user can further update group settings including the group name, members, user name, mute notification, clear history options, and delete/leave settings. A notification interface can provide list notifications from the various friends and group interactions. A comments box can further be provided. In embodiments, messaging can include a message list interface, message content, and add or start chatting functions. A search interface can provide keyword searching for friends, comments, chats, etc.

Authorized users are further presented a personalized interface by personal component 906. In an embodiment, personalized component 906 allows an authorized user to view posts, view his personalized recipe box, view liked recipes, follow users and receive notifications of following users, and add configuration data such as head photo and settings.

For example, posts, recipe box recipes, and liked recipes can be posted to a particular group or subgroup, or sent to a chat. Particular users or groups of users can be selected. A user can interact as a follower user or have following users. In an embodiment, a user can "report" other users to administrator users of the system for inappropriate use. In embodiments, a user can "block" one or more users to hide any of those users' content, messages, or notifications. In further embodiments, a user can send a message to one or more users, or a circle comprising a plurality of users.

Settings functionality allows for user adjustment of his photos, as well system settings adjustment including email ID, display name, profile image, about, hometown, password, privacy, location services, and logout data. In embodiments, a user who has not uploaded a profile image is identified by his initials or default picture instead of the user's actual profile image. In embodiments, a user can utilize a user experience device to edit his photos or profile image, including replacement, cropping, rotating, and zooming in and out. In an embodiment, data content is location-specific and the user can change his location to receive location-based specialized content. In an embodiment, a user can set notification preferences (type of content) to be notified about, as well as profile preferences (what parts of the profile other users can see).

Figure 60:
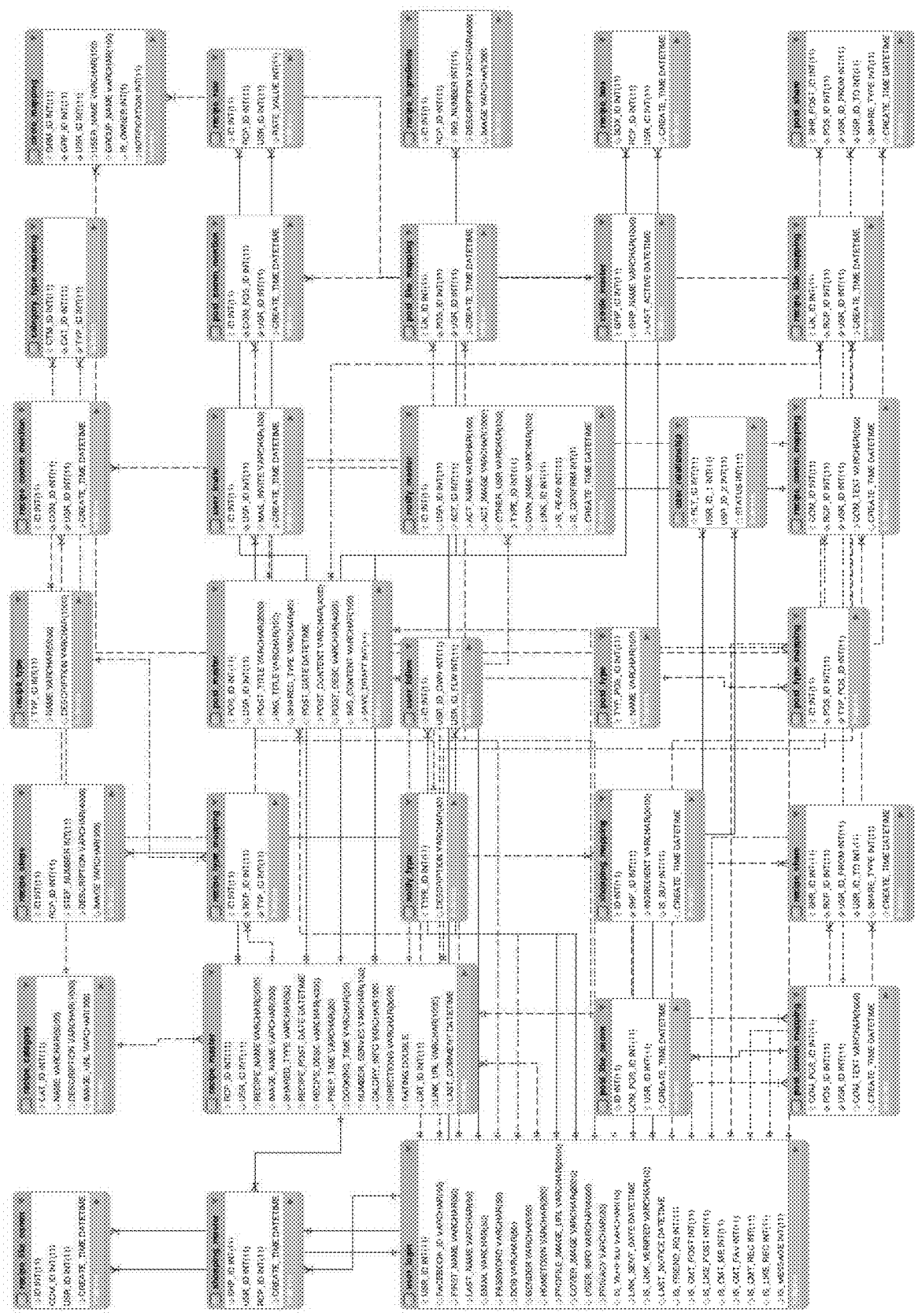
FIG. 60 is a data model for a social networking system, according to an embodiment.

Referring to FIG. 60, a data model for a social networking system is depicted, according to an embodiment. The entity relationship diagram illustrates one example data model, and is further described in the tables that follow.

1. Table "user_login"

| Column | Datatype | Primary Key | Not NULL | Description |
|---|---|---|---|---|
| USR_ID | INT(11) | Yes | Yes | Id of user (Auto Increment) |
| FACEBOOK_ID | INT(11) | No | No | FACEBOOK id of user |
| FIRST_NAME | VARCHAR(50) | No | No | First name of user |
| LAST_NAME | VARCHAR(50) | No | No | Last name of user |
| EMAIL | VARCHAR(50) | No | No | Email of user |
| PASSWORD | VARCHAR(50) | No | No | Password of user |
| DOB | VARCHAR(50) | No | No | Date of birth of user |
| GENDER | VARCHAR(50) | No | No | Gender of user |
| HOMETOWN | VARCHAR(200) | No | No | Address of user |
| PROFILE_IMAGE_URL | VARCHAR(2000) | No | No | Image name of user |
| COVER_IMAGE | VARCHAR(2000) | No | No | Cover name of user |
| USER_INFO | VARCHAR(4000) | No | No | User information |
| PRIVACY | VARCHAR(20) | No | No | Privacy of user |
| IS_VERIFIED | VARCHAR(10) | No | No | Check user is active |
| LINK_SENT_DATE | DATETIME | No | No | Times for created user(2) (1) |
| IS_LINK_VERIFIED | VARCHAR(10) | No | No | Check link signup is active |
| LAST_NOTICE | DATETIME | No | No | Check notification of system |
| IS_FRIEND_RQ | INT(11) | No | No | Check setting allow send request friend (2) |
| IS_CMT_POST | INT(11) | No | No | Check setting allow comment on a post (2) |
| IS_LIKE_POST | INT(11) | No | No | Check setting allow like a post (2) |
| IS_CMT_ME | INT(11) | No | No | Check setting allow comment me (2) |
| IS_CMT_FAV | INT(11) | No | No | Check setting allow comment favorite (2) |

-continued

| 1. Table "user_login" | | | | |
|---|---|---|---|---|
| Column | Datatype | Primary Key | Not NULL | Description |
| IS_CMT_REC | INT(11) | No | No | Check setting allow comment recipe(2) |
| IS_LIKE_REC | INT(11) | No | No | Check setting allow like recipe (2) |
| IS_MESSAGE | INT(11) | No | No | Check setting allow mess (2) |

(1): Default value is CURRENT_TIMESTAMP when comment on a recipe.
(2): Default value is "1".

| 2. Table "user_follow" | | | | |
|---|---|---|---|---|
| Column | Datatype | Primary Key | Not NULL | Description |
| ID | INT(11) | No | Yes | Id (Auto Increment, Unique) |
| USR_ID_OWN | INT(11) | Yes | Yes | Id of who has been followed |
| USR_ID_FLW | INT(11) | Yes | Yes | Id of who is follower |

USR_ID_OWN, USR_ID_FLW: A foreign key referenced table "user_master".

| 3. Table "user_invite" | | | | |
|---|---|---|---|---|
| Column | Datatype | Primary Key | Not NULL | Description |
| ID | INT(11) | Yes | Yes | Id (Auto Increment) |
| USR_ID | INT(11) | No | Yes | Id of user |
| MAIL_INVITE | VARCHAR(100) | No | Yes | Mail of the invitee |
| CREATE_TIME | DATETIME | No | Yes | Times for send |

USR_ID: A foreign key referenced table "user_login".

| 4. Table "user_relationship" | | | | |
|---|---|---|---|---|
| Column | Datatype | Primary Key | Not NULL | Description |
| RLT_ID | INT(11) | No | Yes | Id (Auto Increment) |
| USR_ID_1 | INT(11) | Yes | Yes | Id of user |
| USR_ID_2 | INT(11) | Yes | Yes | Mail of the invitee |
| STATUS | INT(11) | No | Yes | Status |

STATUS: Value is 1-Friend, 2-Block
USR_ID_1, USR_ID_2: A foreign key referenced table "user_master".

| 5. Table "circle_master" | | | | |
|---|---|---|---|---|
| Column | Datatype | Primary Key | Not NULL | Description |
| GRP_ID | INT(11) | Yes | Yes | Id of group (Auto Increment) |
| GRP_NAME | VARCHAR(1000) | No | No | Name of group |
| LAST_ACTIVE | DATETIME | No | No | Times for last active |

6. Table "circle_mapping"

| Column | Datatype | Primary Key | Not NULL | Description |
|---|---|---|---|---|
| GRM_ID | INT(11) | Yes | Yes | Id (Auto Increment) |
| GRP_ID | INT(11) | No | Yes | Id of group |
| USR_ID | INT(11) | No | Yes | Id of user |
| USER_NAME | VARCHAR(100) | No | No | Name of owner group |
| GROUP_NAME | VARCHAR(100) | No | No | Name of group |
| IS_OWNER | INT(1) | No | No | Is owner of group? |
| NOTIFICATION | INT(11) | No | No | Notification of group |

GRP_ID: A foreign key referenced table "circle_master".

USR_ID: A foreign key referenced table "user_master".

7. Table "notify_type"

| Column | Datatype | Primary Key | Not NULL | Description |
|---|---|---|---|---|
| TYPE_ID | INT(11) | Yes | Yes | Id of notify type (Auto Increment) |
| DESCRIPTION | VARCHAR(45) | No | No | Description notify type |

8. Table "notify_master"

| Column | Datatype | Primary Key | Not NULL | Description |
|---|---|---|---|---|
| ID | INT(11) | Yes | Yes | Id (Auto Increment) |
| USR_ID | INT(11) | No | No | Id of user who has notification |
| ACT_ID | INT(11) | No | No | Id of user who make notification to other user |
| ACT_NAME | VARCHAR(100) | No | No | Name of user |
| ACT_IMAGE | VARCHAR(1000) | No | No | Image name of user make notification |
| OTHER_USR | VARCHAR(100) | No | No | List other user make notification |
| TYPE_ID | INT(11) | No | No | Type of notification |
| OWN_NAME | VARCHAR(100) | No | No | Name of owner recipe/post/group |
| LINK_ID | INT(11) | No | No | Id of recipe/post/group |
| IS_READ | INT(11) | No | No | Check read yes/no |
| IS_CONFIRM | INT(1) | No | No | Confirm yes/no for add circle |
| CREATE_TIME | DATETIME | No | No | Times for created notification |

USR_ID: A foreign key referenced table "user_master".

ACT_ID: A foreign key referenced table "user_master".

9. Table "recipe_category"

| Column | Datatype | Primary Key | Not NULL | Description |
|---|---|---|---|---|
| CAT_ID | INT(11) | Yes | Yes | Id of category (Auto Increment) |
| NAME | INT(11) | No | No | Id of category |
| DESCRIPTION | VARCHAR(1000) | No | No | Description |
| IMAGE_URL | VARCHAR(100) | No | No | Image name of category |

10. Table "recipe_type"

| Column | Datatype | Primary Key | Not NULL | Description |
|---|---|---|---|---|
| TYP_ID | INT(11) | Yes | Yes | Id of recipe type (Auto Increment) |
| NAME | VARCHAR(1000) | No | No | Name of recipe type |
| DESCRIPTION | VARCHAR(1000) | No | No | Description |

11. Table "category_type_mapping"

| Column | Datatype | Primary Key | Not NULL | Description |
|---|---|---|---|---|
| CTM_ID | INT(11) | Yes | Yes | Id (Auto Increment) |
| CAT_ID | INT(11) | No | Yes | Id of recipe category |
| TYP_ID | INT(11) | No | Yes | Id of recipe type |

CAT_ID: A Foreign Key referenced table "recipe_category".
TYP_ID: A Foreign Key referenced table "recipe_type".

12. Table "recipe_master"

| Column | Datatype | Primary Key | Not NULL | Description |
|---|---|---|---|---|
| RCP_ID | INT(11) | Yes | Yes | Id of recipe |
| USR_ID | INT(11) | No | No | Name of user |
| RECIPE_NAME | VARCHAR(2000) | No | No | Name of recipe |
| IMAGE_NAME | VARCHAR(200) | No | No | Name of image |
| SHARED_TYPE | VARCHAR(50) | No | No | Type of recipe |
| RECIPE_POST_DATE | DATETIME | No | No | Times for created/updated recipe |
| RECIPE_DESC | VARCHAR(4000) | No | No | Descriptions of recipe |
| PREP_TIME | VARCHAR(20) | No | No | Times for prepare of recipe |
| COOKING_TIME | VARCHAR(20) | No | No | Times for cook of recipe |
| NUMBER_SERVES | VARCHAR(100) | No | No | Number of people serving |
| CALORY_INFO | VARCHAR(100) | No | No | Calories Information of recipe |
| DIRECTIONS | VARCHAR(3000) | No | No | Directions of recipe |
| RATING | DOUBLE | No | No | Ratings for a recipe |
| CAT_ID | INT(11) | No | No | Category of recipe |
| LINK_URL | VARCHAR(1000) | No | No | Link url when clip a url |
| LAST_COMMENT | DATETIME | No | No | Times for last comment (1) |

USR_ID: A foreign key referenced table "user_login".
CAT_ID: A Foreign Key referenced table "recipe_category".
(1): Default value is CURRENT_TIMESTAMP when comment on a recipe.

13. Table "recipe_type_mapping"

| Column | Datatype | Primary Key | Not NULL | Description |
|---|---|---|---|---|
| ID | INT(11) | Yes | Yes | Id (Auto Increment) |
| RCP_ID | INT(11) | No | Yes | Id of recipe |
| TYP_ID | INT(11) | No | Yes | Id of recipe type |

RCP_ID: A Foreign Key referenced table "recipe_master".
TYP_ID: A Foreign Key referenced table "recipe_type".

14. Table "recipe_ingredients"

| Column | Datatype | Primary Key | Not NULL | Description |
|---|---|---|---|---|
| ID | INT(11) | No | Yes | Id (Auto Increment, Unique) |
| RCP_ID | INT(11) | Yes | Yes | Id of recipe |

-continued

14. Table "recipe_ingredients"

| Column | Datatype | Primary Key | Not NULL | Description |
|---|---|---|---|---|
| ING_NUMBER | INT(11) | Yes | Yes | Number of ingredients |
| DESCRIPTION | VARCHAR(4000) | No | No | description |
| IMAGE | VARCHAR(300) | No | No | Image name for ingredient |

RCP_ID: A Foreign Key referenced table "recipe_master".

15. Table "recipe_steps"

| Column | Datatype | Primary Key | Not NULL | Description |
|---|---|---|---|---|
| ID | INT(11) | No | Yes | Id (Auto Increment, Unique) |
| RCP_ID | INT(11) | Yes | Yes | Id of recipe |
| STEP_NUMBER | INT(11) | Yes | Yes | Number of steps |
| DESCRIPTION | VARCHAR(4000) | No | No | description |
| IMAGE | VARCHAR(300) | No | No | Image name for step |

RCP_ID: A Foreign Key referenced table "recipe_master".

16. Table "recipe_rate"

| Column | Datatype | Primary Key | Not NULL | Description |
|---|---|---|---|---|
| ID | INT(11) | No | Yes | Id (Auto Increment, Unique) |
| RCP_ID | INT(11) | Yes | Yes | Id of recipe |
| USR_ID | INT(11) | Yes | Yes | Id of user |
| RATE_VALUE | INT(11) | No | Yes | Value of rating for a recipe |

RCP_ID: A Foreign Key referenced table "recipe_master".
USR_ID: A Foreign Key referenced table "user_login".

17. Table "recipe_share"

| Column | Datatype | Primary Key | Not NULL | Description |
|---|---|---|---|---|
| SHR_ID | INT(11) | Yes | Yes | Id (Auto Increment) |
| RCP_ID | INT(11) | No | Yes | Id of recipe |
| USR_ID_FROM | INT(11) | No | Yes | Id of user want to share something |
| USR_ID_TO | VARCHAR(100) | No | Yes | Id of user has been shared |
| SHARE_TYPE | VARCHAR(100) | No | Yes | Type of share (1) |
| CREATE_TIME | DATETIME | No | No | Times for share (2) |

RCP_ID: A Foreign Key referenced table "recipe_master".
USR_ID_FROM, USR_ID_TO: A Foreign Key referenced table "user_login".
(1): Have 2 type share is Owner shared and not Owner shared
(2): Default value is CURRENT_TIMESTAMP when comment on a recipe.

18. Table "recipe_box"

| Column | Datatype | Primary Key | Not NULL | Description |
|---|---|---|---|---|
| BOX_ID | INT(11) | No | Yes | Id (Auto Increment, Unique) |
| RCP_ID | INT(11) | Yes | Yes | Id of recipe |
| USR_ID | INT(11) | Yes | Yes | Id of user |
| CREATE_TIME | DATETIME | No | Yes | Times for add recipe to box (1) |

RCP_ID: A Foreign Key referenced table "recipe_master".
USR_ID: A Foreign Key referenced table "user_login".
(1) Default value is CURRENT_TIMESTAMP when comment on a recipe.

19. Table "recipe_comm_mapping"

| Column | Datatype | Primary Key | Not NULL | Description |
|---|---|---|---|---|
| COM_ID | INT(11) | Yes | Yes | Id (Auto Increment) |
| RCP_ID | INT(11) | No | Yes | Id of recipe |
| USR_ID | INT(11) | No | Yes | Id of user |
| COM_TEXT | VARCHAR(500) | No | Yes | Content of comment |
| CREATE_TIME | DATETIME | No | Yes | Times for new comment (1) |

RCP ID: A Foreign Key referenced table "recipe_master".
USR_ID: A Foreign Key referenced table "user_login".
(1) Default value is CURRENT_TIMESTAMP when comment on a recipe.

20. Table "recipe_comm_mention"

| Column | Datatype | Primary Key | Not NULL | Description |
|---|---|---|---|---|
| ID | INT(11) | Yes | Yes | Id (Auto Increment) |
| COM_ID | INT(11) | No | Yes | Id of recipe |
| USR_ID | INT(11) | No | Yes | Id of user |
| CREATE_TIME | DATETIME | No | Yes | Times of mention comment (1) |

COM_ID: A Foreign Key referenced table "recipe_comm_mapping".
USR_ID: A Foreign Key referenced table "user_login".
(1) Default value is CURRENT_TIMESTAMP when comment on a recipe.

21. Table "recipe_like_mapping"

| Column | Datatype | Primary Key | Not NULL | Description |
|---|---|---|---|---|
| LIK_ID | INT(11) | Yes | Yes | Id (Auto Increment) |
| RCP_ID | INT(11) | No | Yes | Id of recipe |
| USR_ID | INT(11) | No | Yes | Id of user |
| CREATE_TIME | DATETIME | No | Yes | Times for new comment (1) |

RCP_ID: A Foreign Key referenced table "recipe_master".
USR_ID: A Foreign Key referenced table "user_login".
(1) Default value is CURRENT_TIMESTAMP when comment on a recipe.

22. Table "recipe_like_comm"

| Column | Datatype | Primary Key | Not NULL | Description |
|---|---|---|---|---|
| ID | INT(11) | No | Yes | Id (Auto Increment) |
| COM_ID | INT(11) | Yes | Yes | Id of comment |
| USR_ID | INT(11) | Yes | Yes | Id of user |
| CREATE_TIME | DATETIME | No | Yes | Times of mention comment (1) |

COM_ID: A Foreign Key referenced table "recipe_com_mapping".
USR_ID: A Foreign Key referenced table "user_login".
(1) Default value is CURRENT_TIMESTAMP when comment on a recipe.

23. Table "post_master"

| Column | Datatype | Primary Key | Not NULL | Description |
|---|---|---|---|---|
| POS_ID | INT(11) | Yes | Yes | Id of post |
| USR_ID | INT(11) | No | No | Id of user |
| POST_TITLE | VARCHAR(2000) | No | No | Title of post |
| IMG_TITLE | VARCHAR(100) | No | No | Image name of title |
| SHARED_TYPE | VARCHAR(50) | No | No | Type of share post |
| POST_DATE | DATETIME | No | No | Times for created/updated post |
| POST_CONTENT | VARCHAR(4000) | No | No | Content of post |
| POST_DESC | VARCHAR(4000) | No | No | Description |
| IMG_CONTENT | VARCHAR(100) | No | No | Image name of content post |
| SAVE_DRAFT | INT(11) | No | No | Check draft |

USR_ID: A Foreign Key referenced table "user_login".

24. Table "post_type"

| Column | Datatype | Primary Key | Not NULL | Description |
|---|---|---|---|---|
| TYP_POS_ID | INT(11) | Yes | Yes | Id of post type (Auto Increment) |
| NAME | VARCHAR(100) | No | No | Name of post type |

25. Table "post_type_mapping"

| Column | Datatype | Primary Key | Not NULL | Description |
|---|---|---|---|---|
| ID | INT(11) | Yes | Yes | Id (Auto Increment) |
| POS_ID | INT(11) | No | Yes | Id of post |
| TYP_POS_ID | INT(11) | No | Yes | Id of post type |

POS_ID: A Foreign Key referenced table "recipe_master".
TYP_POS_ID: A Foreign Key referenced table "recipe_type".

26. Table "post_share"

| Column | Datatype | Primary Key | Not NULL | Description |
|---|---|---|---|---|
| SHR_POST_ID | INT(11) | Yes | Yes | Id (Auto Increment) |
| POS_ID | INT(11) | No | Yes | Id of post |
| USR_ID_FROM | INT(11) | No | Yes | Id of user want to share something |
| USR_ID_TO | VARCHAR(100) | No | Yes | Id of user has been shared |

26. Table "post_share"

| Column | Datatype | Primary Key | Not NULL | Description |
|---|---|---|---|---|
| SHARE_TYPE | VARCHAR(100) | No | Yes | Type of share (1) |
| CREATE_TIME | DATETIME | No | No | Times for share (2) |

RCP_ID: A Foreign Key referenced table "recipe_master".
USR_ID_FROM, USR_ID_TO: A Foreign Key referenced table "user_login".
(1) Have 2 type share is Owner shared and not Owner shared
(2) Default value is CURRENT_TIMESTAMP when comment on a post.

27. Table "post_comm_mapping"

| Column | Datatype | Primary Key | Not NULL | Description |
|---|---|---|---|---|
| COM_POS_ID | INT(11) | Yes | Yes | Id (Auto Increment) |
| POS_ID | INT(11) | No | Yes | Id of post |
| USR_ID | INT(11) | No | Yes | Id of user |
| COM_TEXT | VARCHAR(3000) | No | Yes | Content of comment |
| CREATE_TIME | DATETIME | No | Yes | Times for new comment (1) |

POS_ID: A Foreign Key referenced table "post_master".
USR_ID: A Foreign Key referenced table "user_login".
(1) Default value is CURRENT_TIMESTAMP when comment on a post.

28. Table "post_comm_mention"

| Column | Datatype | Primary Key | Not NULL | Description |
|---|---|---|---|---|
| ID | INT(11) | Yes | Yes | Id (Auto Increment) |
| COM_POS_ID | INT(11) | No | Yes | Id of post |
| USR_ID | INT(11) | No | Yes | Id of user |
| CREATE_TIME | DATETIME | No | Yes | Times of mention comment (1) |

COM_ID: A Foreign Key referenced table "post_comm_mapping".
USR_ID: A Foreign Key referenced table "user_login".
(1) Default value is CURRENT_TIMESTAMP when comment on a recipe.

29. Table "post_like_mapping"

| Column | Datatype | Primary Key | Not NULL | Description |
|---|---|---|---|---|
| LIK_ID | INT(11) | Yes | Yes | Id (Auto Increment, Unique) |
| POS_ID | INT(11) | No | Yes | Id of post |
| USR_ID | INT(11) | No | Yes | Id of user |
| CREATE_TIME | DATETIME | No | Yes | Times for new comment (1) |

POS_ID: A Foreign Key referenced table "post_master".
USR_ID: A Foreign Key referenced table "user_login".
(1) Default value is CURRENT_TIMESTAMP when comment on a recipe.

30. Table "post_like_comm"

| Column | Datatype | Primary Key | Not NULL | Description |
|---|---|---|---|---|
| ID | INT(11) | No | Yes | Id (Auto Increment) |
| COM_POS_ID | INT(11) | Yes | Yes | Id of comment |
| USR_ID | INT(11) | Yes | Yes | Id of user on post |
| CREATE_TIME | DATETIME | No | Yes | Times of mention comment (1) |

COM_ID: A Foreign Key referenced table "post_comm_mapping".
USR_ID: A Foreign Key referenced table "user_login".
(1) Default value is CURRENT_TIMESTAMP when comment on a recipe.

31. Table "shopping_master"

| Column | Datatype | Primary Key | Not NULL | Description |
|---|---|---|---|---|
| SHP_ID | INT(11) | No | Yes | Id (Auto Increment, Unique) |
| USR_ID | INT(11) | Yes | Yes | Id of user |
| RCP_ID | INT(11) | Yes | Yes | Id of recipe |
| CREATE_TIME | DATETIME | No | Yes | Times of mention comment (1) |

RCP_ID: A Foreign Key referenced table "recipe_master".
USR_ID: A Foreign Key referenced table "user_login".
(1) Default value is CURRENT_TIMESTAMP when comment on a recipe.

32. Table "shopping_mapping"

| Column | Datatype | Primary Key | Not NULL | Description |
|---|---|---|---|---|
| ID | INT(11) | Yes | Yes | Id (Auto Increment) |
| SHP_ID | INT(11) | No | Yes | Id of post |
| INGREDIENT | INT(11) | No | Yes | Id of user |
| IS_BUY | VARCHAR(3000) | No | Yes | Content of comment |
| CREATE_TIME | DATETIME | No | Yes | Times for new comment (1) |

SHP_ID: A Foreign Key referenced table "shopping_master".
(1) Default value is CURRENT_TIMESTAMP when comment on a recipe.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art.

Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A digital recipe clipping engine comprising:
   at least one processor and a memory operably coupled to the at least one processor and configured to store instructions invoked by the at least one processor;
   instructions that, when executed, cause the at least one processor to implement:
      an input interface configured to receive digital recipe data comprising a plurality of data items,
      an importer configured to:
         parse the digital recipe data,
         determine if the digital recipe data is in a structured format by associating an XML schema of the digital recipe data with a known schema of one or more known schemas, and
         in response to the digital recipe data being determined to be in a structured format, import content of the structured digital recipe data according to the structured format, and
         in response to the digital recipe data being determined to be in a non-structured format, convert content of the unstructured digital recipe data to a structured format by:
            identifying an item of the plurality of data items;
            for each item of the plurality of data items identified, determining the data item is one of expected and unexpected:
            for each data item determined to be expected, assigning the data item to a known data field using a content of the data item and a database of expected data; and
            for each data item determined to be unexpected, conducting a best guess assignment, wherein the best guess assignment comprises assigning the data item to a known data field based on the contents of the data item and a closeness of the data item to items in the database of expected data.

2. The digital recipe clipping engine of claim 1, wherein the importer is further configured to save the digital recipe to a database.

3. The digital recipe clipping engine of claim 1, wherein the structured format is a known XML schema.

4. The digital recipe clipping engine of claim 3, wherein the importer is further configured to save the digital recipe to a database wherein each data item of the digital recipe data corresponds to a separate XML element.

5. The digital recipe clipping engine of claim 1, wherein the input interface is a mini-browser configured to retrieve digital recipe data from a third-party website specified by a URL input.

6. The digital recipe clipping engine of claim 5, wherein the mini-browser is further configured to present website navigation controls, and wherein the instructions cause the at least one processor to further receive navigation control input to a second third-party website having digital recipe data.

7. The digital recipe clipping engine of claim 5, wherein the input interface further comprises a clip icon and wherein selection of the clip icon activates the importer.

8. The digital recipe clipping engine of claim 1, wherein the input interface is embedded into a web browser and configured to retrieve digital recipe data from a third-party website specified by a URL input.

9. The digital recipe clipping engine of claim 8, wherein the input interface further comprises a clip icon and wherein selection of the clip icon activates the importer.

10. The digital recipe clipping engine of claim 1, wherein the input interface is configured to receive digital recipe data as a paste action from a user.

11. A method of importing digital recipe data, comprising:
    receiving digital recipe data comprising a plurality of data items;
    parsing the digital recipe data;
    determining if the digital recipe data is in a structured format by associating an XML schema of the digital recipe data with a known schema of one or more known schemas; and
    in response to the digital recipe data being determined to be in a structured format, import content of the structured digital recipe data according to the structured format, and
    in response to the digital recipe data being determined to be in a non-structured format, convert content of the unstructured digital recipe data to a structured format by:
       identifying an item of the plurality of data items;
       for each item of the plurality of data items identified, determining the data item is one of expected and unexpected;
       for each data item determined to be expected, assigning the data item to a known data field using a content of the data item and a database of expected data; and
       for each data item determined to be unexpected, conducting a best guess assignment, wherein the best guess assignment comprises assigning the data item to a known data field based on the contents of the data item and a proximity of the data item to items in the database of expected data; and
    storing each data item as a separate element in a database.

12. The method of claim 11, wherein the standardized format is a known XML schema.

13. The method of claim 12, wherein each data item of the digital recipe data corresponds to a separate XML element.

14. The method of claim 11, wherein receiving the digital recipe data is activated by selection of a clip icon.

15. The method of claim 11, wherein the digital recipe data is received from a third-party website specified by a URL input to a mini-browser.

16. The method of claim 11, wherein receiving the digital recipe data comprises a paste action by a user.

* * * * *